US008929831B2

(12) United States Patent
Kasslin et al.

(10) Patent No.: US 8,929,831 B2
(45) Date of Patent: Jan. 6, 2015

(54) METHOD, APPARATUS, AND COMPUTER PROGRAM PRODUCT FOR WIRELESS NETWORK DISCOVERY BASED ON GEOGRAPHICAL LOCATION

(75) Inventors: Mika Kasslin, Espoo (FI); Jari Junell, Espoo (FI); Miika Laaksonen, Espoo (FI)

(73) Assignee: Nokia Corporation, Espoo (FI)

( * ) Notice: Subject to any disclaimer, the term of this patent is extended or adjusted under 35 U.S.C. 154(b) by 732 days.

(21) Appl. No.: 13/184,643

(22) Filed: Jul. 18, 2011

(65) Prior Publication Data
US 2013/0023295 A1 Jan. 24, 2013

(51) Int. Cl.
*H04B 17/00* (2006.01)
*H04W 48/14* (2009.01)
*H04W 16/14* (2009.01)

(52) U.S. Cl.
CPC .............. *H04W 48/14* (2013.01); *H04W 16/14* (2013.01)
USPC ...................................... 455/67.11; 455/63.1

(58) Field of Classification Search
CPC ............. H04B 17/0042; H04B 17/007; H04B 17/0072; H04W 72/00; H04W 72/0413; H04W 72/0453; H04W 48/14; H04W 16/14
USPC ............................................. 455/63.1, 67.11
See application file for complete search history.

(56) References Cited

U.S. PATENT DOCUMENTS

| | | | |
|---|---|---|---|
| 7,826,459 | B2 | 11/2010 | Xhafa et al. |
| 7,830,907 | B1 | 11/2010 | Petranovich et al. |
| 7,856,008 | B2 | 12/2010 | Ayyagari et al. |
| 7,915,867 | B1 | 3/2011 | Bulthaup et al. |
| 7,953,412 | B2 | 5/2011 | Lee et al. |
| 7,983,216 | B2 | 7/2011 | Iyer et al. |

(Continued)

FOREIGN PATENT DOCUMENTS

| | | |
|---|---|---|
| EP | 1863303 A1 | 12/2007 |
| EP | 1 883 258 | 1/2008 |

(Continued)

OTHER PUBLICATIONS

"Part 15.2: Coexistence of Wireless Personal Area Networks with Other Wireless Devices Operating in Unlicensed Frequency Bands" Mar. 24, 2003, IEEE, Inc.

(Continued)

*Primary Examiner* — Lewis West
(74) *Attorney, Agent, or Firm* — Locke Lord LLP

(57) ABSTRACT

Method, apparatus, and computer program product embodiments are disclosed for wireless resource sharing between heterogeneous wireless networks to enable coexistence of secondary networks. An example embodiment of the invention includes a method, comprising: receiving, at an apparatus or entity, information associated with a wireless network; determining, by the apparatus or entity, a geographic communication area and one or more geographic interference areas associated with the wireless network based on the received information; transmitting, by the apparatus or entity, a message to a destination to register the wireless network and the determined geographic communication area and one or more geographic interference areas associated with the wireless network; and receiving, by the apparatus or entity, confirmation of the registering of the wireless network at the destination and information associated with zero or more wireless networks that at least one of potentially interfere with the determined geographic communication area associated with the wireless network, or potentially experience interference caused by the determined one or more interference areas associated with the wireless network.

23 Claims, 40 Drawing Sheets

(56) References Cited

U.S. PATENT DOCUMENTS

| | | | |
|---|---|---|---|
| 8,068,440 | B2 | 11/2011 | Stanwood et al. |
| 8,165,106 | B2 | 4/2012 | Yang et al. |
| 8,194,549 | B2 | 6/2012 | Huber et al. |
| 8,300,624 | B2 | 10/2012 | Zeller et al. |
| 8,363,579 | B2 | 1/2013 | Li et al. |
| 8,379,551 | B2 | 2/2013 | Wietfeldt et al. |
| 8,451,789 | B2 | 5/2013 | Junell et al. |
| 2003/0058829 | A1 | 3/2003 | Batra |
| 2005/0027871 | A1 | 2/2005 | Bradley et al. |
| 2006/0002326 | A1 | 1/2006 | Vesuna |
| 2006/0034217 | A1 | 2/2006 | Kwon et al. |
| 2006/0286986 | A1 | 12/2006 | Kim et al. |
| 2007/0086426 | A1 | 4/2007 | Bonta et al. |
| 2007/0135162 | A1 | 6/2007 | Banerjea et al. |
| 2007/0161364 | A1 | 7/2007 | Surineni et al. |
| 2007/0207800 | A1 | 9/2007 | Daley et al. |
| 2007/0254596 | A1 | 11/2007 | Corson et al. |
| 2007/0274273 | A1 | 11/2007 | Grushkevich et al. |
| 2008/0040452 | A1 | 2/2008 | Rao et al. |
| 2008/0043705 | A1 | 2/2008 | Desai et al. |
| 2008/0089279 | A1 | 4/2008 | Hu et al. |
| 2008/0108363 | A1 | 5/2008 | Yu et al. |
| 2008/0108365 | A1 | 5/2008 | Buddhikot et al. |
| 2008/0137627 | A1 | 6/2008 | Fischer et al. |
| 2008/0159258 | A1 | 7/2008 | Ji et al. |
| 2008/0192806 | A1 | 8/2008 | Wyper et al. |
| 2008/0228878 | A1 | 9/2008 | Wu et al. |
| 2008/0233875 | A1 | 9/2008 | Desai et al. |
| 2008/0253341 | A1 | 10/2008 | Cordeiro et al. |
| 2008/0261639 | A1 | 10/2008 | Sun et al. |
| 2008/0268892 | A1 | 10/2008 | Hamdi et al. |
| 2008/0285525 | A1 | 11/2008 | Hu |
| 2008/0298310 | A1 | 12/2008 | Hu |
| 2009/0040937 | A1 | 2/2009 | Xhafa et al. |
| 2009/0059856 | A1 | 3/2009 | Kermoal et al. |
| 2009/0122755 | A1 | 5/2009 | Seok et al. |
| 2009/0149208 | A1 | 6/2009 | Huttunen et al. |
| 2009/0161614 | A1 | 6/2009 | Grandblaise et al. |
| 2009/0196180 | A1 | 8/2009 | Bahl et al. |
| 2009/0197627 | A1 | 8/2009 | Kuffner et al. |
| 2009/0225717 | A1 | 9/2009 | Banerjea |
| 2009/0247201 | A1 | 10/2009 | Ye et al. |
| 2009/0279449 | A1 | 11/2009 | Kneckt et al. |
| 2009/0279491 | A1 | 11/2009 | Kim et al. |
| 2009/0298522 | A1 | 12/2009 | Chaudhri et al. |
| 2010/0002608 | A1 | 1/2010 | Goldhamer |
| 2010/0046440 | A1 | 2/2010 | Singh |
| 2010/0087216 | A1 | 4/2010 | Ko et al. |
| 2010/0091731 | A1 | 4/2010 | Kim et al. |
| 2010/0097950 | A1 | 4/2010 | Jeon |
| 2010/0097952 | A1 | 4/2010 | McHenry et al. |
| 2010/0142463 | A1 | 6/2010 | Hu |
| 2010/0142559 | A1 | 6/2010 | Hu |
| 2010/0220676 | A1 | 9/2010 | Grandblaise et al. |
| 2010/0220687 | A1 | 9/2010 | Reznik et al. |
| 2010/0232380 | A1 | 9/2010 | Choi et al. |
| 2010/0248631 | A1 | 9/2010 | Chaudhri et al. |
| 2010/0273426 | A1 | 10/2010 | Walley et al. |
| 2010/0304685 | A1 | 12/2010 | Wietfeldt et al. |
| 2010/0309317 | A1 | 12/2010 | Wu et al. |
| 2010/0309806 | A1 | 12/2010 | Wu et al. |
| 2010/0331029 | A1 | 12/2010 | Linsky et al. |
| 2011/0039554 | A1 | 2/2011 | Bims |
| 2011/0090887 | A1 | 4/2011 | Kim et al. |
| 2011/0090890 | A1 | 4/2011 | Seok et al. |
| 2011/0116488 | A1 | 5/2011 | Grandhi |
| 2011/0179174 | A1 | 7/2011 | Kasslin et al. |
| 2011/0199989 | A1 | 8/2011 | Wietfeldt et al. |
| 2011/0207411 | A1* | 8/2011 | Phillips ..................... 455/67.11 |
| 2011/0222493 | A1 | 9/2011 | Mangold et al. |
| 2011/0243094 | A1 | 10/2011 | Dayal et al. |
| 2011/0250857 | A1 | 10/2011 | Reial et al. |
| 2011/0250921 | A1 | 10/2011 | Reial |
| 2011/0287802 | A1 | 11/2011 | Ma et al. |
| 2011/0305206 | A1 | 12/2011 | Junell et al. |
| 2011/0310767 | A1 | 12/2011 | Hu |
| 2012/0057533 | A1 | 3/2012 | Junell et al. |
| 2012/0069746 | A1 | 3/2012 | Park |
| 2012/0077506 | A1 | 3/2012 | Wietfeldt et al. |
| 2012/0094681 | A1 | 4/2012 | Freda et al. |
| 2012/0106512 | A1 | 5/2012 | Banerjea et al. |
| 2012/0127011 | A1 | 5/2012 | Lee et al. |
| 2012/0134328 | A1 | 5/2012 | Gauvreau et al. |
| 2012/0182883 | A1* | 7/2012 | Junell et al. ................. 370/250 |
| 2012/0195269 | A1 | 8/2012 | Kang et al. |
| 2012/0201209 | A1 | 8/2012 | Lee et al. |
| 2012/0225662 | A1 | 9/2012 | Jo et al. |
| 2012/0329384 | A1 | 12/2012 | Boldyrev et al. |
| 2013/0155995 | A1 | 6/2013 | Jo et al. |

FOREIGN PATENT DOCUMENTS

| | | |
|---|---|---|
| EP | 2083591 A1 | 7/2009 |
| GB | 2461724 A | 1/2010 |
| JP | 2009153136 | 7/2009 |
| JP | 2012147256 | 8/2012 |
| JP | 201229177 | 9/2012 |
| WO | 03/001742 A1 | 1/2003 |
| WO | 2005/045689 A2 | 5/2005 |
| WO | 2006/132487 A1 | 12/2006 |
| WO | 2007/031958 A2 | 3/2007 |
| WO | 2010/027308 A1 | 3/2010 |
| WO | 2010/043270 A1 | 4/2010 |
| WO | WO2011022506 | 2/2011 |
| WO | WO 2012028769 | 3/2012 |
| WO | WO 2012030174 | 3/2012 |
| WO | WO 2012051303 | 4/2012 |

OTHER PUBLICATIONS

J. Zhu, et al., Multi-Radio Coexistence: Challenges and Opportunities; "Proceedings—16th International Conference on Computer Communications and Networks", Aug. 3, 2007; pp. 358-364.

Extended European Search Report for Application No. 13154998.2-1854, completed Jun. 5, 2013.

Extended European Search Report for Application No. 13155031.1-1854, completed Jun. 6, 2013.

M. Kasslin; IEEE 802.19-10/0055r02; Wireless Coexistence; System Design Document; Mar. 18, 2010, p. 1-12.

J. C. Zuniga, et al; IEEE 802-SG-WhiteSpace-09/0032r4; Media Independent Coexistence; Mar. 11, 2009, p. 1-10.

H. Wang, et al; IEEE 802.19-0910034r3; Media Independent Coexistence for Devices in TV White Spaces; Jul. 10, 2009, p. 1-12.

T. Baykas, et al; IEEE 802.19-1010055r3, "Wireless Coexistence"—System Design Document; Mar. 18, 2010, p. 1-15.

M. Rahman; IEEE 802.19-10-0010-00-tvws; "Possible Coexistence Cases in TVWS and Topics to be Considered in P802.19.1"; Jan. 18, 2009; pp. 1-12.

M. Sherman, sg-whitespace-09-0055-00-0000, IEEE 802 Executive Committee Study Group on TV White Spaces, "TV Whitespace Tutorial Intro"; Mar. 10, 2009, 197 pp.

Mark Cummings, "Perspectives on Architecture for IEEE 802.19.1", Nov. 11, 2010, pp. 1-15.

S. Filin et al., P802.19.1 General Architecture, IEEE 802.19-10/0007, Jan. 16, 2010, pp. 1-9.

Minnie Ingersoll, "White Spaces Database", IEEE 802.19-09-/0047r0, Jul. 16, 2009, pp. 1-23.

Paine et al., "WhiteSpace Coexistence Use Cases", IEEE P802.19 Wireless Coexistence, IEEE 802.19-09126r4, Jul. 16, 2009, pp. 1-14.

Chen Sun et al., "TVWS Coexistence Use Cases", IEEE 802.19 DCN 19-10-0008-01-0000, pp. 1-14.

European Search Report dated Jun. 27, 2012 for European Application No. 12155105.5-1525.

U.S. Appl. No. 13/417,457, filed Mar. 12, 2012, Kasslin, et al.

U.S. Appl. No. 13/417,653, filed Mar. 12, 2012, Kasslin, et al.

U.S. Appl. No. 13/585,051, filed Aug. 14, 2012, Kasslin, et al.

International Search Report and Written Opinion mailed Jul. 29, 2011 in International Application Serial No. PCT/FI2011/050266, 13pp.

(56) References Cited

OTHER PUBLICATIONS

J. Junell, et al.; IEEE P802.19, Wireless Coexistence, Proposal on coexistence system services and protocols; Nov. 7, 2010, XP002681996; pp. 1-46.

J. Junell, et al.; Coexistence for unlicensed spectrum users in white spaces; Applied Sciences in Biomedical and Communication Technologies (ISABEL); 3rd International Symposium on, IEEE; Nov. 7, 2010, pp. 1-5.

Extended European Search Report dated Aug. 30, 2012 for EP Application No. 12162039.7-1525.

International Search Report issued Oct. 11, 2011 in International Serial No. PCT/FI2011/050703, 13pp.

Baykas, T et al. Developing a standard for TV white space coexistence: technical challenges and solution approaches. IEEE Wireless Communications, Feb. 1, 2012, pp. 10-22, ISSN 1536-1284. the whole document.

International Search Report for International Application No: PCT/FI2013/050717 mailed Nov. 5, 2013.

IEEE P802.15.2 Draft No. 09; Coexistence of Wireless Personal Area Networks with Other Wireless Devices Operating in Unlicensed Frequency Bands; Mar. 24, 2003, IEEE Inc. Standards.

J. Zhu, et al.,: Multi-Radio Coexistence: Challenges and Opportunities; Proceedings 16th International Conference on Computer Communications and Networks; Aug. 3, 2007, pp. 358-364.

Karama Hamdi, et al., "Power Control in Cognitive Radio Systems Based on Spectrum Sensing Side Information", Proc. IEEE International Conference on Communications (ICC'07), pp. 5161-5165, Jun. 2007.

Ian F. Akyildiz, et al. "A Survey on Spectrum Management in Cognitive Radio Networks", IEEE Communications Magazine • Apr. 2008, pp. 40-48.

Dong In Kim, et al., "Joint Rate and Power Allocation for Cognitive Radios in Dynamic Spectrum Access Environment", IEEE Transactions on Wireless Communications, Vol. 7, No. 12, Dec. 2008, pp. 5517-5527.

Fabrizio Granelli, et al., "Standardization and Research in Cognitive and Dynamic Spectrum Access Networks: IEEE SCC41 Efforts and Other Activities", IEEE Communications Magazine • Jan. 2010, pp. 71-79.

Zander, "Can We Find (and Use) "Spectrum Holes"? Spectrum Sensing and Spatial Reuse Opportunities in "Cognitive" Radio Systems", Vehicular Technology Conference, 2009. VTC Spring 2009. IEEE 69th, Date: Apr. 26-29, 2009, pp. 1-5.

H. Harada, "Research and development on cognitive and software radio technologies—Devices and hardware platform-" General assembly of URSI, Aug. 2008., 4pp.

A. Mody et al., "A Survey of IEEE Standards Supporting Cognitive Radio and Dynamic Spectrum Access" IEEE, 978-1-4244-2677-5/08, pp. 1-7.

R. Venkatesha Prasad et al., "Cognitive Functionality in Next Generation Wireless Networks: Standardization Efforts", IEEE Communications Magazine, Apr. 2008, pp. 72-78.

International Search Report for International Application No. PCT/FI2012/050522 mailed Sep. 25, 2012.

Dong Heon Lee et al., "Self-coexistence techniques for cognitive radio LANs/PANs", 21st Annual IEEE International Symposium on Personal Indoor and Mobile Radio Communications (PIMRC), Sep. 26, 2010, IEEE, Piscataway, NJ, USA, pp. 1516-1520, Chapter III B.

Ashraf, I. et al., "Impact of Interfering Bluetooth Piconets on a Collocated p-Persistent CSMA-Based WLAN", IEEE Transactions on Vehicular Technology, vol. 58, No. 9, Nov. 1, 2009, pp. 4962-4975.

Asterjadhi, A. et al., "JENNA: A jamming Evasive Network-Coding Neighbor-Discovery Algorithm for Cognitive radio Networks", IEEE Wireless Communications, vol. 17, No. 4, Aug. 1, 2010, pp. 24-32.

Baykas, T., et al., "Overview of TV White Spaces: Current regulations, standards and coexistence between secondary users", 2010 IEEE 21st International Symposium on Personal, Indoor and Mobile Radio Communications Workshops (PIMRC Workshops), Sep. 26-30, 2010, Istanbul, Turkey, IEEE, Piscataway, NJ, USA, pp. 38-43.

Peha, J.M.: "Sharing Spectrum Through Spectrum Policy reform and Cognitive Radio", Proceedings of teh IEEE, vol. 97, No. 4, Apr. 1, 2009, pp. 708-719.

International Search Report mailed Nov. 29, 2011 in International Application Serial No. PCT/FI2011/050714, 13pp.

International Search Report and Written Opinion mailed Mar. 14, 2012 in International Application Serial No. PCT/FI2011/051128, 15pp.

International Search Report and Written Opinion mailed Apr. 2, 2012 in International Application Serial No. PCT/FI2011/051127, 15pp.

P. Camarda et al., "An Exclusive Self-Coexistence (ESC) Resource Sharing Algorithm for Cognitive 802.22 Networks," 2010 5th International Symposium on Wireless Pervasive Computing (ISWPC), pp. 128-133.

IEEE 802.15.2 (Part 15.2: Coexistence of Wireless Personal Area Networks with Other Wireless Devices Operating in Unlicensed Frequency Bands, dated Mar. 24, 2003; hereinafter IEEE 802.15.2.

Zhu et al (Proceedings-16th International Conference on Computer Communications and Networks, paper submitted "Multi-Radio Coexistence: Challenges and Opportunities" dated Aug. 13-16, 2007.

International Search Report for International Application No. PCT/FI2011/050591 dated Sep. 28, 2011.

U.S. Appl. No. 13/311,779, filed Dec. 6, 2011, Mika Rinne et al.
U.S. Appl. No. 13/006,857, filed Jan. 14, 2011, Junell et al.
U.S. Appl. No. 13/006,802, filed Jan. 14, 2011, Junell et al.
U.S. Appl. No. 12/875,187, filed Sep. 3, 2010, Junell et al.
U.S. Appl. No. 12/875,183, filed Sep. 3, 2010, Junell et al.
U.S. Appl. No. 13/041,613, filed Mar. 7, 2011, Kasslin et al.
U.S. Appl. No. 12/915,141, filed Oct. 29, 2010, Kasslin et al.
U.S. Appl. No. 12/915,154, filed Oct. 29, 2010, Kasslin et al.
U.S. Appl. No. 13/019,615, filed Feb. 2, 2011, Junell et al.
U.S. Appl. No. 12/815,620, filed Jun. 15, 2010, Junell et al.
U.S. Appl. No. 13/100,734, filed May 4, 2011, Jari Junell.

Cavalcanti et al, "IEEE 802.22-07/0121 r1 : Proposed text changes to Section 6.21.2 Self-coexistence in IEEE 802.22/D0.2 Draft Standard" published in Mar. 2007.

Cordeiro et al, "Cognitive PHY and MAC Layers for Dynamic Spectrum Access and Sharing of TV Bands", published by ACM on Aug. 5, 2006.

International Search Report for International Application No. PCT/FI2013/050717 mailed Nov. 5, 2013.

Ruuska P. et al. "P802.19 System Architecture", IEEE Mentor, IEEE Standards Association, doc.: IEEE 802.19-10/46r3, Mar. 17, 2010, [online], [retrieved on Dec. 1, 2011]. Retrieved from the Internet: <URL: https://mentor.ieee.org/802.19/documents>.

Harada et al., "Research, Development, and Standards Related Activities on Dynamic Spectrum Access and cognitive Radio", New Frontiers in Dynamic Spectrum, 2010 IEEE Symposium on 20100406, IEEE, Piscataway, NJ, USA.

Akyildiz I. et al., "Next Generation/Dynamic Spectrum Access/Cognitive Radio Wireless Networks: A survey", Sep. 15, 2006, Elsevier Science Publishers B.V., Amsterdam, NL, ISSN 1389-1286, pp. 2127-2159.

International Search Report and Written Opinion mailed Dec. 12, 2011 in International Application Serial No. PCT/FI2011/050777, 12pp.

Japanese Office Action dated Feb. 21, 2014 for Japanese Application No. 2013-038446.

\* cited by examiner

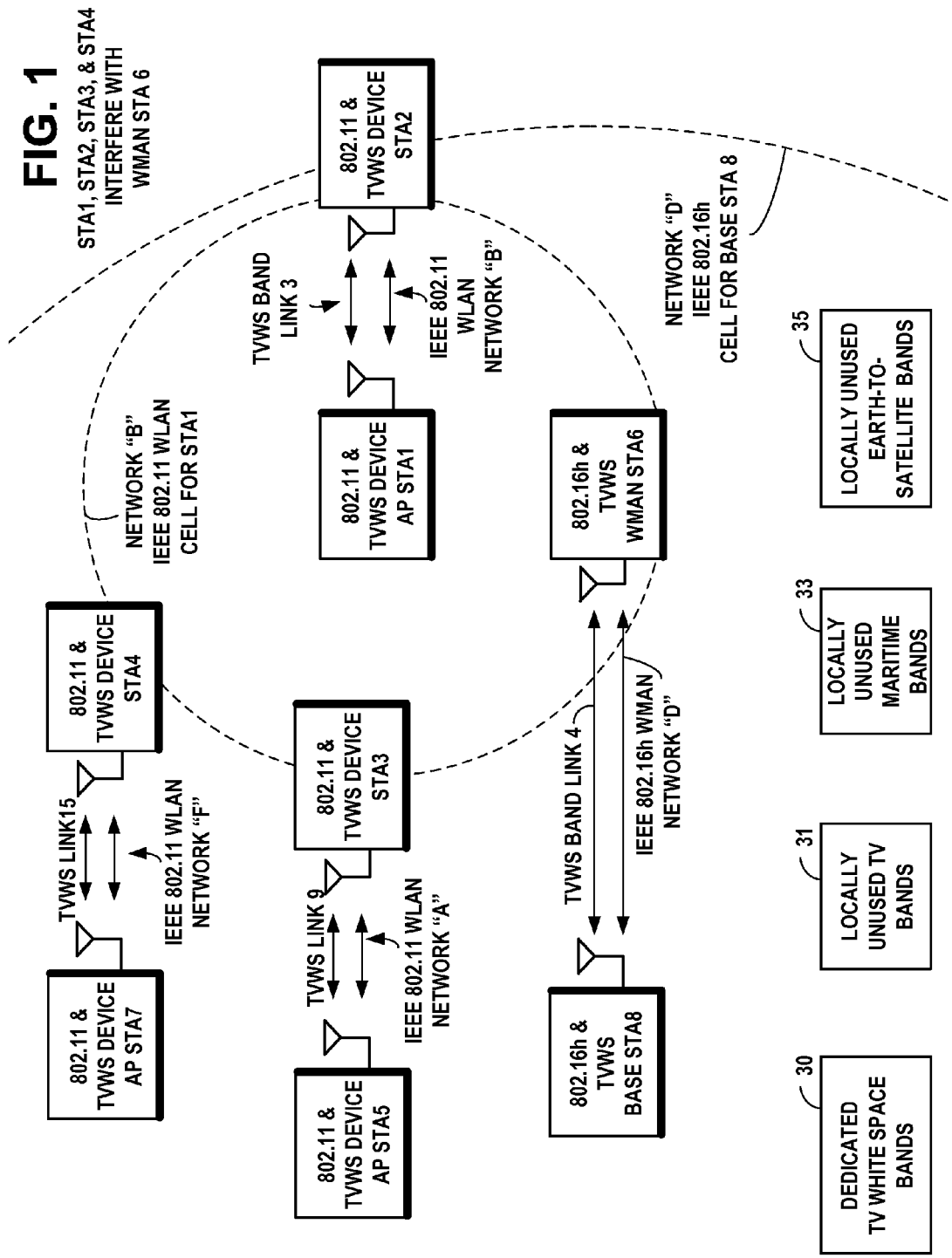

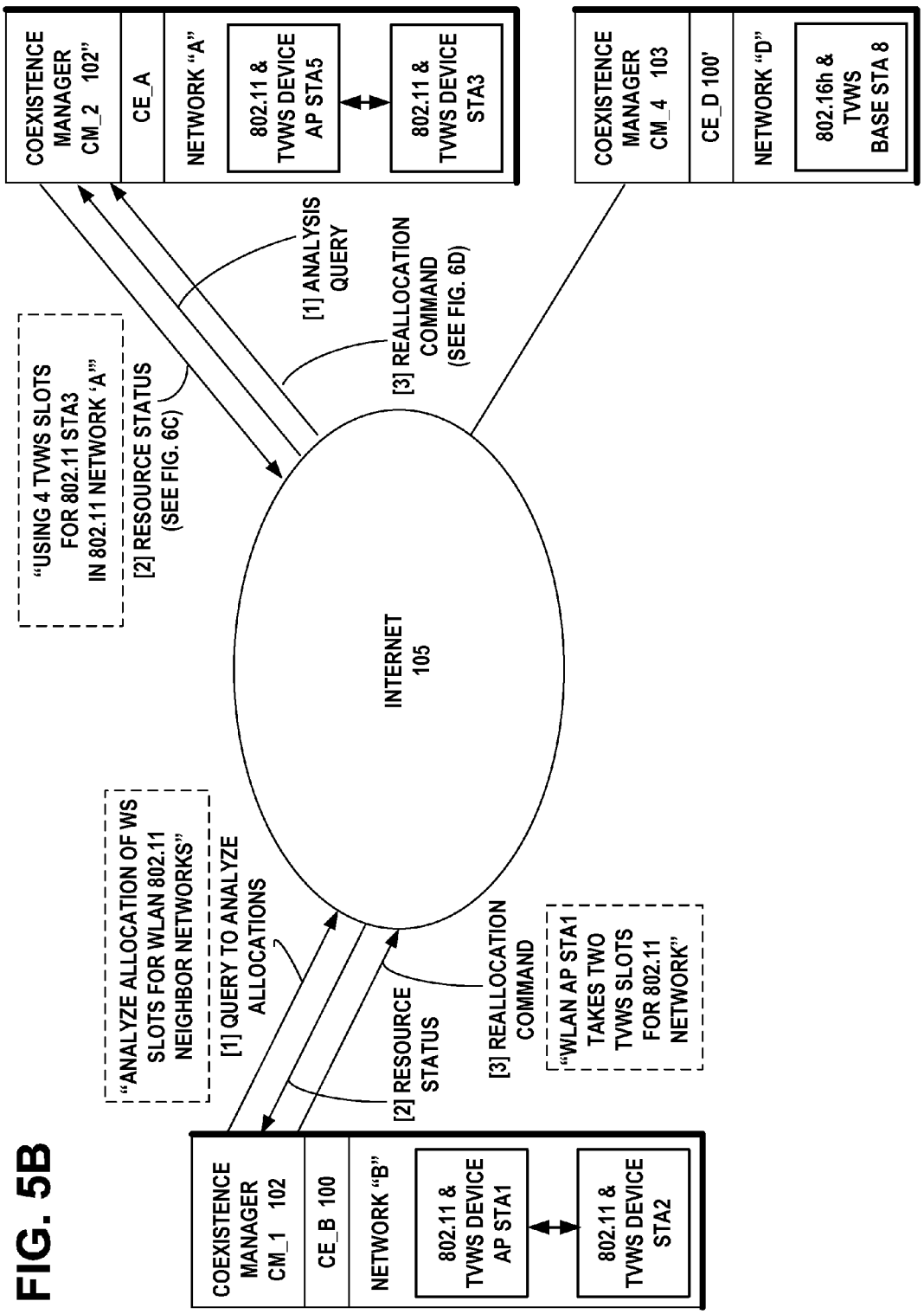

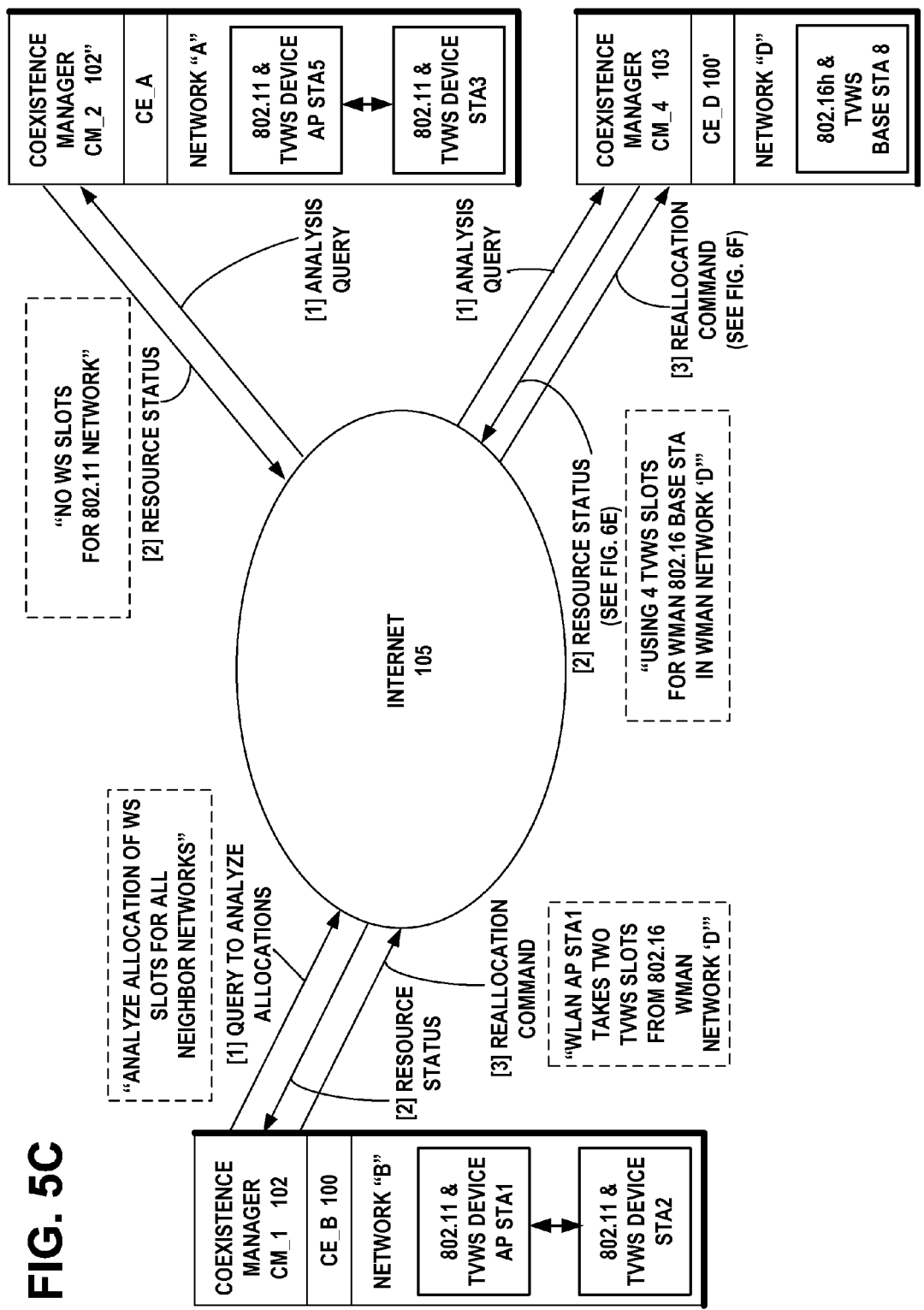

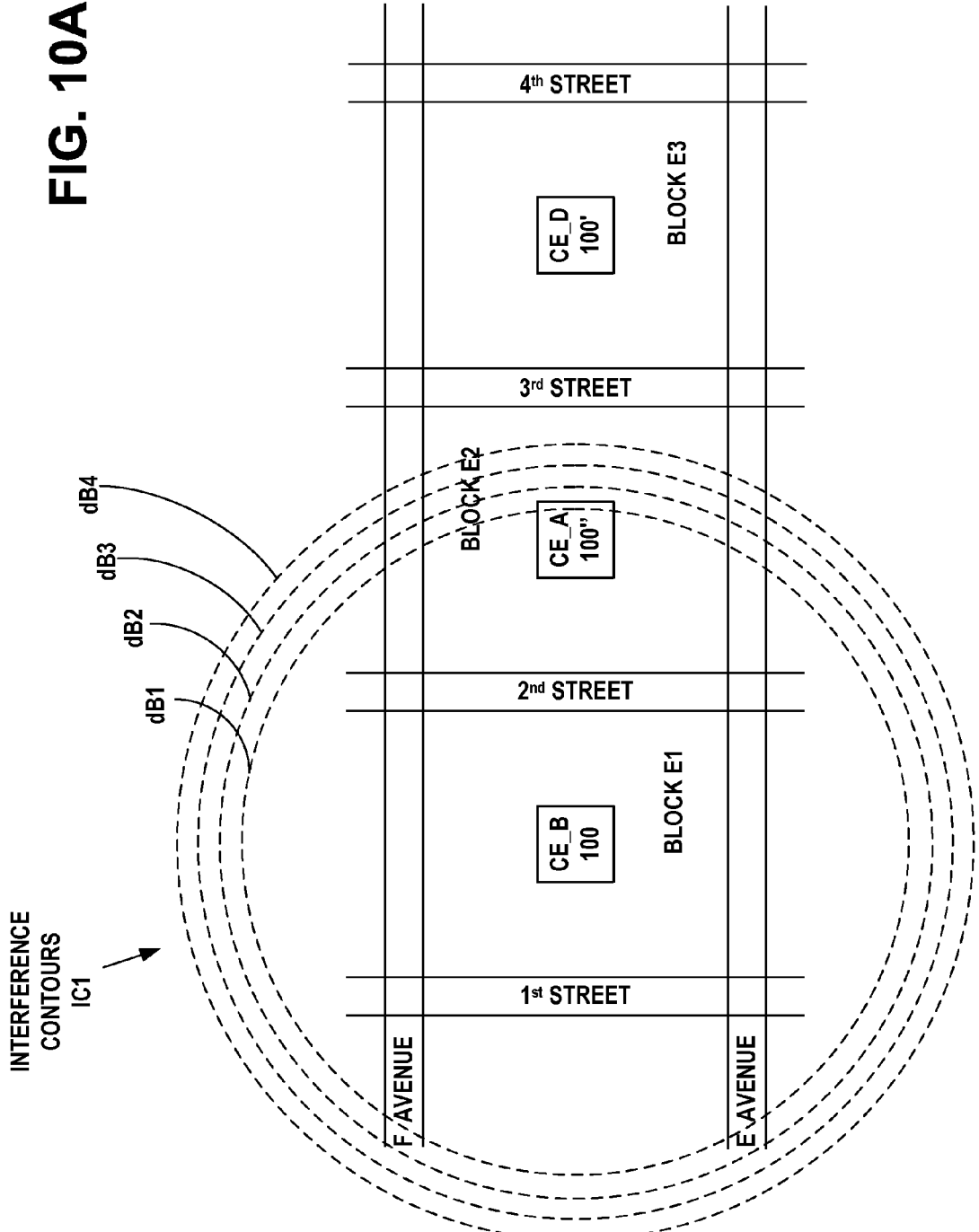

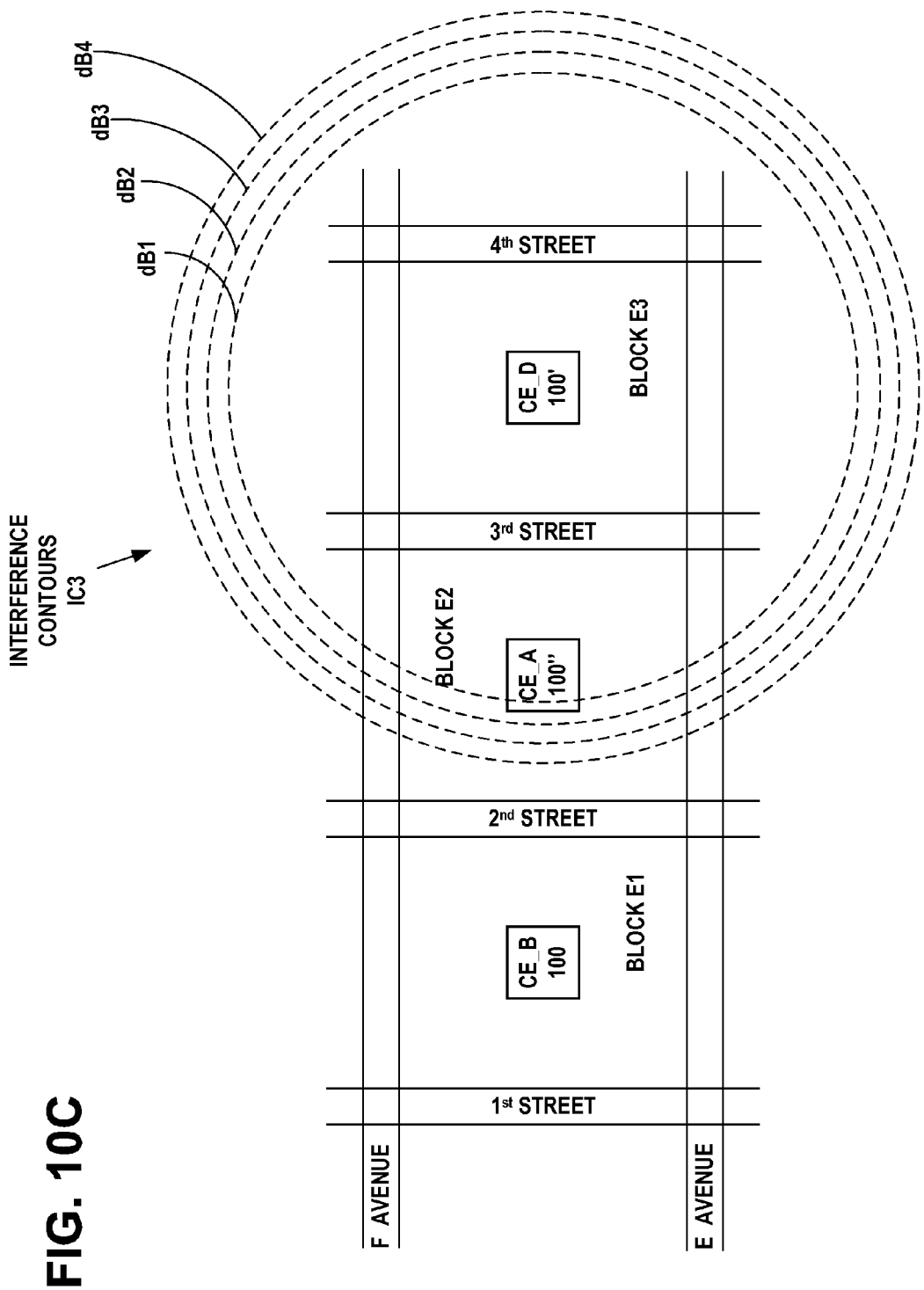

FIG. 11A

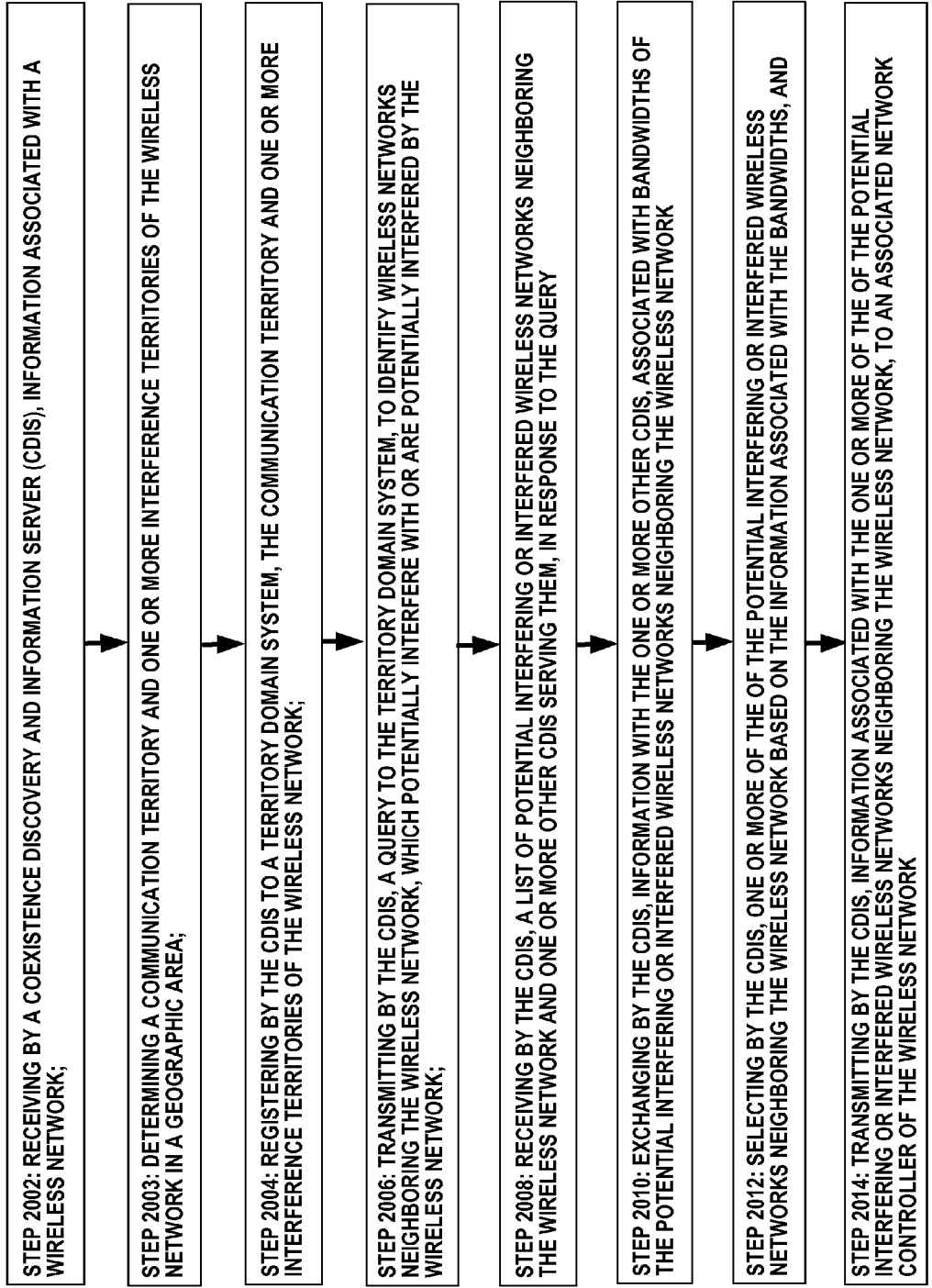

STEP 2002: RECEIVING BY A COEXISTENCE DISCOVERY AND INFORMATION SERVER (CDIS), INFORMATION ASSOCIATED WITH A WIRELESS NETWORK;

STEP 2003: DETERMINING A COMMUNICATION TERRITORY AND ONE OR MORE INTERFERENCE TERRITORIES OF THE WIRELESS NETWORK IN A GEOGRAPHIC AREA;

STEP 2004: REGISTERING BY THE CDIS TO A TERRITORY DOMAIN SYSTEM, THE COMMUNICATION TERRITORY AND ONE OR MORE INTERFERENCE TERRITORIES OF THE WIRELESS NETWORK;

STEP 2006: TRANSMITTING BY THE CDIS, A QUERY TO THE TERRITORY DOMAIN SYSTEM, TO IDENTIFY WIRELESS NETWORKS NEIGHBORING THE WIRELESS NETWORK, WHICH POTENTIALLY INTERFERE WITH OR ARE POTENTIALLY INTERFERED BY THE WIRELESS NETWORK;

STEP 2008: RECEIVING BY THE CDIS, A LIST OF POTENTIAL INTERFERING OR INTERFERED WIRELESS NETWORKS NEIGHBORING THE WIRELESS NETWORK AND ONE OR MORE OTHER CDIS SERVING THEM, IN RESPONSE TO THE QUERY

STEP 2010: EXCHANGING BY THE CDIS, INFORMATION WITH THE ONE OR MORE OTHER CDIS, ASSOCIATED WITH BANDWIDTHS OF THE POTENTIAL INTERFERING OR INTERFERED WIRELESS NETWORKS NEIGHBORING THE WIRELESS NETWORK

STEP 2012: SELECTING BY THE CDIS, ONE OR MORE OF THE OF THE POTENTIAL INTERFERING OR INTERFERED WIRELESS NETWORKS NEIGHBORING THE WIRELESS NETWORK BASED ON THE INFORMATION ASSOCIATED WITH THE BANDWIDTHS, AND

STEP 2014: TRANSMITTING BY THE CDIS, INFORMATION ASSOCIATED WITH THE ONE OR MORE OF THE OF THE POTENTIAL INTERFERING OR INTERFERED WIRELESS NETWORKS NEIGHBORING THE WIRELESS NETWORK, TO AN ASSOCIATED NETWORK CONTROLLER OF THE WIRELESS NETWORK

FIG. 11B

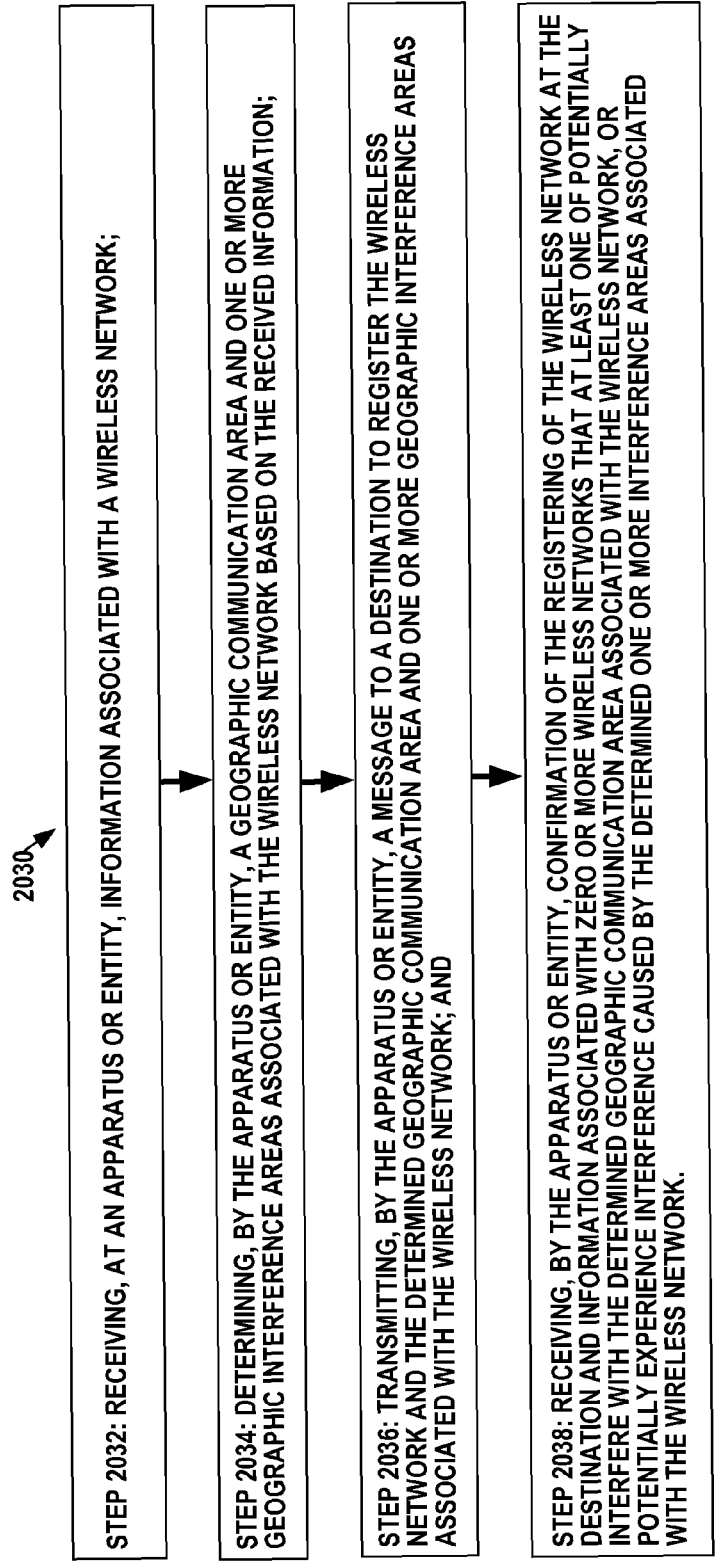

STEP 2032: RECEIVING, AT AN APPARATUS OR ENTITY, INFORMATION ASSOCIATED WITH A WIRELESS NETWORK;

STEP 2034: DETERMINING, BY THE APPARATUS OR ENTITY, A GEOGRAPHIC COMMUNICATION AREA AND ONE OR MORE GEOGRAPHIC INTERFERENCE AREAS ASSOCIATED WITH THE WIRELESS NETWORK BASED ON THE RECEIVED INFORMATION;

STEP 2036: TRANSMITTING, BY THE APPARATUS OR ENTITY, A MESSAGE TO A DESTINATION TO REGISTER THE WIRELESS NETWORK AND THE DETERMINED GEOGRAPHIC COMMUNICATION AREA AND ONE OR MORE GEOGRAPHIC INTERFERENCE AREAS ASSOCIATED WITH THE WIRELESS NETWORK; AND

STEP 2038: RECEIVING, BY THE APPARATUS OR ENTITY, CONFIRMATION OF THE REGISTERING OF THE WIRELESS NETWORK AT THE DESTINATION AND INFORMATION ASSOCIATED WITH ZERO OR MORE WIRELESS NETWORKS THAT AT LEAST ONE OF POTENTIALLY INTERFERE WITH THE DETERMINED GEOGRAPHIC COMMUNICATION AREA ASSOCIATED WITH THE WIRELESS NETWORK, OR POTENTIALLY EXPERIENCE INTERFERENCE CAUSED BY THE DETERMINED ONE OR MORE INTERFERENCE AREAS ASSOCIATED WITH THE WIRELESS NETWORK.

FIG. 11C

STEP 2052: TRANSMITTING, BY AN APPARATUS OR ENTITY, A QUERY TO A DESTINATION TO REQUEST INFORMATION ASSOCIATED WITH WIRELESS NETWORKS THAT AT LEAST ONE OF POTENTIALLY INTERFERE WITH A GEOGRAPHIC COMMUNICATION AREA ASSOCIATED WITH A WIRELESS NETWORK SERVED BY THE APPARATUS OR ENTITY, OR POTENTIALLY EXPERIENCE INTERFERENCE CAUSED BY ONE OR MORE INTERFERENCE AREAS ASSOCIATED WITH THE WIRELESS NETWORK SERVED BY THE APPARATUS OR ENTITY; AND

STEP 2054: RECEIVING, BY THE APPARATUS OR ENTITY, INFORMATION ASSOCIATED WITH ZERO OR MORE WIRELESS NETWORKS THAT AT LEAST ONE OF POTENTIALLY INTERFERE WITH THE GEOGRAPHIC COMMUNICATION AREA ASSOCIATED WITH THE WIRELESS NETWORK SERVED BY THE APPARATUS OR ENTITY, OR POTENTIALLY EXPERIENCE INTERFERENCE CAUSED BY THE ONE OR MORE INTERFERENCE AREAS ASSOCIATED WITH THE WIRELESS NETWORK SERVED BY THE APPARATUS OR ENTITY.

2050

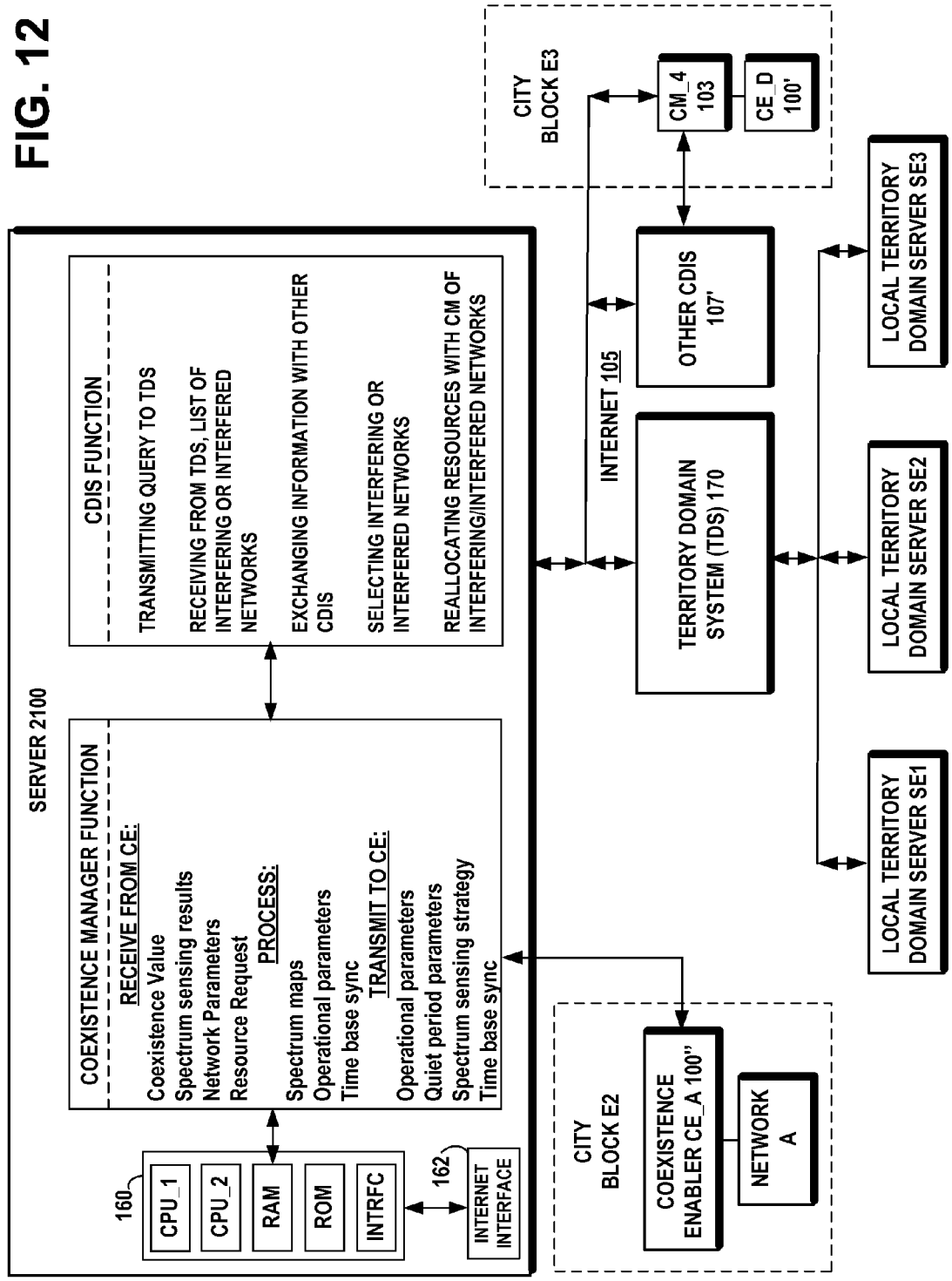

METHOD, APPARATUS, AND COMPUTER PROGRAM PRODUCT FOR WIRELESS NETWORK DISCOVERY BASED ON GEOGRAPHICAL LOCATION

FIELD

The field of the invention relates to radio coexistence concepts and utilization of RF spectrum to provide wireless network discovery based on geographic location to enable coexistence of secondary networks.

BACKGROUND

Use of radio frequency bands of the electromagnetic spectrum is regulated by governments in most countries, by allocating specific frequency bands to particular types of uses, such as licensed bands for commercial radio and television broadcasting, cellular telephony, maritime radio, police, fire, and public safety radio, GPS, radio astronomy, earth stations for satellite communications, and many other uses. Governments also allocate unlicensed bands, for example, for Wireless Regional Area Network (WRAN) broadband access for rural areas and wireless local area networks (WLAN) and wireless personal area networks (WPAN), such as the industrial, scientific, and medical (ISM) band.

In the United States, the Federal Communications Commission (FCC) regulates use of the radio spectrum, including radio and television broadcasting. Frequencies are allocated according to a bandplan in which guard bands are assigned between the allocated radio bands to avoid interference between adjacent signals. There are also unassigned frequency bands in the spectrum that either have never been used or have become free as a result of changes in technology. The unassigned frequency bands and guard bands are referred to as white spaces.

TV white space may be broadly defined as broadcast television spectrum that is unused by licensed services. There are at least two categories of TV white space: [1] Dedicated TV white space is a portion of the spectrum that the FCC has reallocated to unlicensed use from previously analog broadcast usage, and [2] Locally unused spectrum by licensed TV broadcasters in a geographic area.

[1] Dedicated TV white space: In the United States, the FCC has dedicated approximately 400 MHz of white spaces for unlicensed use that became unused after a federally mandated transformation of analog TV broadcasting to digital TV broadcasting. However, the FCC has prohibited unlicensed use of white spaces from interfering with existing licensed uses, including digital TV stations, low power TV stations, cable TV headends, and sites where low power wireless microphones are used. Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

[2] Locally unused spectrum by licensed TV broadcasters: The FCC has adopted rules to allow unlicensed radio transmitters to operate in the broadcast television spectrum at locations where that spectrum is not being used by licensed broadcasters. The FCC required the use of geolocation to establish the location of the unlicensed transmitter and a database of TV bands use by licensed broadcasters organized by their geographic coverage areas, to enable the unlicensed transmitter to know where local TV band white spaces may be available. The FCC required the use of spectrum sensors in the unlicensed transmitter to detect the presence of the incumbent, primary TV broadcaster's signal in the local TV band white space to enable the unlicensed transmitter to immediately relinquish using the band. A primary user in such a local TV band white space would be an incumbent TV broadcaster licensed to operate in that band, but in those geographic areas where there are no licensed incumbent TV broadcasters in operation, other unlicensed secondary users may make use of that band.

Other RF spectrum white spaces may be defined as RF spectrum that is locally unused in certain geographic areas, such as for example frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused RF spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band.

SUMMARY

Method, apparatus, and computer program product embodiments are disclosed for wireless resource sharing between heterogeneous wireless networks to enable coexistence of secondary networks in a shared band environment, according to an embodiment of the present invention. Wireless networks and services associated with the wireless networks may be discovered and registered and entities providing the services may be hosted based on a geographical area. Different types of territories may be registered based on the host type, service type, etc. When wireless networks are considered each network has at least two types of territories: communication territory and interference territory. A communication territory associated with a geographic area, is a region within which communication may be conducted between devices belonging to the wireless network. A communication territory may be defined with contour parameters describing the territory's border or contour. An interference territory associated with a geographic area, is a region within which transmissions from any of the devices belonging to the wireless network are higher than or equal to a given signal level. An interference territory represents an area within which radio signals from any of the TVBDs belonging to the wireless network may be considered interference to any other TVBDs, but especially to any TVBDs outside the communication territory. This territory defines a geographical area within which devices that don't belong to the network consider the transmissions from the network as interference. An interference territory may also be defined with contour parameters describing the territory's border or contour. The contour specified for a communication territory or an interference territory may be stored in a server associated with the corresponding geographic area, the server being part of a hierarchical distributed database referred to as the territory domain system. The territory domain system enables locating and identifying the geographic area of specific hosting entities, related services and information required to access the hosting entities and their services. The communication territories and interference territories are unique geographical areas that are managed by a server associated with the corresponding geographic area, in the territory domain system. Registered territories may overlap with multiple adjacent zones and thus a territory and its associated information may be registered on multiple servers in the territory domain system.

An example embodiment of the invention includes a method, comprising:

receiving, at an apparatus or entity, information associated with a wireless network;

determining, by the apparatus or entity, a geographic communication area and one or more geographic interference areas associated with the wireless network based on the received information;

transmitting, by the apparatus or entity, a message to a destination to register the wireless network and the determined geographic communication area and one or more geographic interference areas associated with the wireless network; and receiving, by the apparatus or entity, confirmation of the registering of the wireless network at the destination and information associated with zero or more wireless networks that at least one of potentially interfere with the determined geographic communication area associated with the wireless network, or potentially experience interference caused by the determined one or more interference areas associated with the wireless network.

An example embodiment of the invention includes a method, comprising: wherein the destination is an apparatus or entity within a territory domain system comprising a hierarchical, distributed database that includes information associated with a territory identifier and a description of services associated with the geographic communication area and other geographic communication areas proximate to the geographic communication area.

An example embodiment of the invention includes a method further comprising:

transmitting, by the apparatus or entity, a query to the destination, to request information associated with wireless networks that at least one of potentially interfere with the determined geographic communication area associated with the wireless network, or potentially experience interference caused by the determined one or more interference areas associated with the wireless network; and receiving, by the apparatus or entity, information associated with zero or more wireless networks that at least one of potentially interfere with the determined geographic communication area associated with the wireless network, or potentially experience interference caused by the determined one or more interference areas associated with the wireless network.

An example embodiment of the invention includes a method further comprising:

when receiving information associated with one or more wireless networks that at least one of potentially interfere with the determined geographic communication area associated with the wireless network, or potentially experience interference caused by the determined one or more interference areas associated with the wireless network, selecting, by the apparatus or entity, at least one of the one or more wireless networks that at least one of potentially interfere with the determined geographic communication area associated with the wireless network, or potentially experience interference caused by the determined one or more interference areas associated with the wireless network; and transmitting, by the apparatus or entity, a request for information characterizing the at least one selected wireless networks that at least one of potentially interfere with the determined geographic communication area associated with the wireless network, or potentially experience interference caused by the determined one or more interference areas associated with the wireless network.

An example embodiment of the invention includes an apparatus, comprising:

at least one processor;

at least one memory including computer program code;

the at least one memory and the computer program code configured to, with the at least one processor, cause the apparatus at least to:

receive information associated with a wireless network;

determine a geographic communication area and one or more geographic interference areas associated with the wireless network based on the received information;

transmit a message to a destination to register the wireless network and the determined geographic communication area and one or more geographic interference areas associated with the wireless network; and receive confirmation of the registering of the wireless network at the destination and information associated with zero or more wireless networks that at least one of potentially interfere with the determined geographic communication area associated with the wireless network, or potentially experience interference caused by the determined one or more interference areas associated with the wireless network.

An example embodiment of the invention includes an apparatus further comprising: wherein the destination is an apparatus or entity within a territory domain system that is a hierarchical, distributed database comprising a server associated with the geographic communication area and one or more other servers respectively associated with other geographic communication areas proximate to the geographic communication area.

An example embodiment of the invention includes an apparatus further comprising: wherein the apparatus comprises a coexistence discovery server.

An example embodiment of the invention includes a computer program product comprising computer executable program code recorded on a computer readable, non-transitory storage medium, the computer executable program code comprising:

code for receiving, at an apparatus or entity, information associated with a wireless network;

code for determining, by the apparatus or entity, a geographic communication area and one or more geographic interference areas associated with the wireless network based on the received information;

code for transmitting, by the apparatus or entity, a message to a destination to register the wireless network and the determined geographic communication area and one or more geographic interference areas associated with the wireless network; and code for receiving, by the apparatus or entity, confirmation of the registering of the wireless network at the destination and information associated with zero or more wireless networks that at least one of potentially interfere with the determined geographic communication area associated with the wireless network, or potentially experience interference caused by the determined one or more interference areas associated with the wireless network.

An example embodiment of the invention includes a method comprising:

transmitting, by an apparatus or entity, a query to a destination to request information associated with wireless networks that at least one of potentially interfere with a geographic communication area associated with a wireless network served by the apparatus or entity, or potentially experience interference caused by one or more interference areas associated with the wireless network served by the apparatus or entity; and receiving, by the apparatus or entity, information associated with zero or more wireless networks that at least one of potentially interfere with the geographic communication area associated with the wireless network served by the apparatus or entity, or potentially experience interference caused by the one or more interference areas associated with the wireless network served by the apparatus or entity.

An example embodiment of the invention includes an apparatus comprising:

at least one processor;

at least one memory including computer program code;

the at least one memory and the computer program code configured to, with the at least one processor, cause the apparatus at least to:

transmit a query to a destination to request information associated with wireless networks that at least one of potentially interfere with a geographic communication area associated with a wireless network served by the apparatus or entity, or potentially experience interference caused by one or more interference areas associated with the wireless network served by the apparatus or entity; and receive information associated with zero or more wireless networks that at least one of potentially interfere with the geographic communication area associated with the wireless network served by the apparatus or entity, or potentially experience interference caused by the one or more interference areas associated with the wireless network served by the apparatus or entity.

An example embodiment of the invention includes a computer program product comprising computer executable program code recorded on a computer readable, non-transitory storage medium, the computer executable program code comprising:

code for transmitting, by an apparatus or entity, a query to a destination to request information associated with wireless networks that at least one of potentially interfere with a geographic communication area associated with a wireless network served by the apparatus or entity, or potentially experience interference caused by one or more interference areas associated with the wireless network served by the apparatus or entity; and code for receiving, by the apparatus or entity, information associated with zero or more wireless networks that at least one of potentially interfere with the geographic communication area associated with the wireless network served by the apparatus or entity, or potentially experience interference caused by the one or more interference areas associated with the wireless network served by the apparatus or entity.

An example embodiment of the invention includes a method comprising:

receiving, at an apparatus or entity, a message to register a wireless network including information regarding a geographic communication area and one or more geographic interference areas associated with the wireless network;

registering, by the apparatus or entity, the wireless network with associated geographic communication area and one or more geographic interference areas based on the received information; and transmitting, by the apparatus or entity, confirmation of the registering of the wireless network and information associated with zero or more wireless networks that at least one of potentially interfere with the geographic communication area associated with the registered wireless network, or potentially experience interference caused by one or more interference areas associated with the registered wireless network.

An example embodiment of the invention includes a method further comprising:

receiving, by the apparatus or entity, a query from a source entity, to request information associated with wireless networks that at least one of potentially interfere with the geographic communication area associated with the wireless network, or potentially experience interference caused by the one or more interference areas associated with the wireless network; and transmitting, by the apparatus or entity, to the source entity, information associated with zero or more wireless networks that at least one of potentially interfere with the determined geographic communication area associated with the wireless network, or potentially experience interference caused by the determined one or more interference areas associated with the wireless network.

An example embodiment of the invention includes a method comprising: wherein the apparatus or entity is a territory domain system comprising a hierarchical, distributed database that includes information associated with a territory identifier and a description of services associated with the geographic communication area and other geographic communication areas proximate to the geographic communication area.

An example embodiment of the invention includes an apparatus comprising:

at least one processor;

at least one memory including computer program code;

the at least one memory and the computer program code configured to, with the at least one processor, cause the apparatus at least to:

receive a message to register a wireless network including information regarding a geographic communication area and one or more geographic interference areas associated with the wireless network;

register the wireless network with associated geographic communication area and one or more geographic interference areas based on the received information; and transmit confirmation of the registering of the wireless network and information associated with zero or more wireless networks that at least one of potentially interfere with the geographic communication area associated with the registered wireless network, or potentially experience interference caused by one or more interference areas associated with the registered wireless network.

An example embodiment of the invention includes a method comprising:

wherein the apparatus is a territory domain system that is a hierarchical, distributed database that includes a server associated with the geographic communication area and one or more other servers respectively associated with other geographic communication areas proximate to the geographic communication area.

An example embodiment of the invention includes a computer program product comprising computer executable program code recorded on a computer readable, non-transitory storage medium, the computer executable program code comprising:

code for receiving, at an apparatus or entity, a message to register a wireless network including information regarding a geographic communication area and one or more geographic interference areas associated with the wireless network;

code for registering, by the apparatus or entity, the wireless network with associated geographic communication area and one or more geographic interference areas based on the received information; and code for transmitting, by the apparatus or entity, confirmation of the registering of the wireless network and information associated with zero or more wireless networks that at least one of potentially interfere with the geographic communication area associated with the registered wireless network, or potentially experience interference caused by one or more interference areas associated with the registered wireless network.

The embodiments of the invention enable wireless resource sharing between heterogeneous wireless networks to enable coexistence of secondary networks. Services are discovered and registered and entities providing the services are hosted based on a geographical area, according to an embodiment of the present invention.

DESCRIPTION OF THE FIGURES

FIG. 1 is an example system architecture diagram according to an embodiment of the present invention, illustrating a wireless metropolitan area network's coverage area overlapped by a wireless local area network and the reallocation of channels from the wireless local area network to the TV band white space.

FIG. 5B is an example network diagram according to an embodiment of the present invention, illustrating an example of communicating by the network controller or coexistence manager 102, with one or more coexistence managers managing neighboring wireless networks belonging to a same network allocation group as the coexistence manager, to analyze the allocation of white space slots for neighbor networks in the same network allocation group.

FIG. 5C is an example network diagram according to an embodiment of the present invention, illustrating an example of communicating by the network controller or coexistence manager 102, with all of its coexistence managers managing neighboring wireless networks, to analyze the allocation of white space slots for all neighbor networks.

FIG. 10A is an example geographic map of the three city blocks of FIG. 7A, illustrating the interference contours of the communication territory surrounding the wireless network in the left-most city block E1, according to an embodiment of the present invention.

FIG. 10C is an example geographic map of the three city blocks of FIG. 7A, illustrating the interference contours of the communication territory surrounding the wireless network in the right-most city block E3, according to an embodiment of the present invention.

FIG. 11A is an example flow diagram of operational steps in the coexistence discovery and information server (CDIS) for discovering and registering services and hosting entities providing the services based on a territory, such as a geographical area for heterogeneous wireless networks to enable coexistence in a TV band white space, according to an embodiment of the present invention.

FIG. 11B is an example flow diagram of operational steps in the coexistence discovery and information server (CDIS) for discovering and registering services and hosting entities providing the services based on a territory, such as a geographical area for heterogeneous wireless networks to enable coexistence in a TV band white space, according to an embodiment of the present invention.

FIG. 11C is an example flow diagram of operational steps in the coexistence discovery and information server (CDIS) for discovering services based on a territory, such as a geographical area for heterogeneous wireless networks to enable coexistence in a TV band white space, according to an embodiment of the present invention.

FIG. 12 is an example network diagram illustrating an example embodiment of the network controller or coexistence manager that includes the function of the coexistence discovery and information server, to interact with the territory domain system in identifying wireless networks neighboring a wireless network in a city block, which potentially interfere with or are potentially interfered by the wireless network, according to an embodiment of the present invention.

DISCUSSION OF EXAMPLE EMBODIMENTS OF THE INVENTION

Figure 1A:
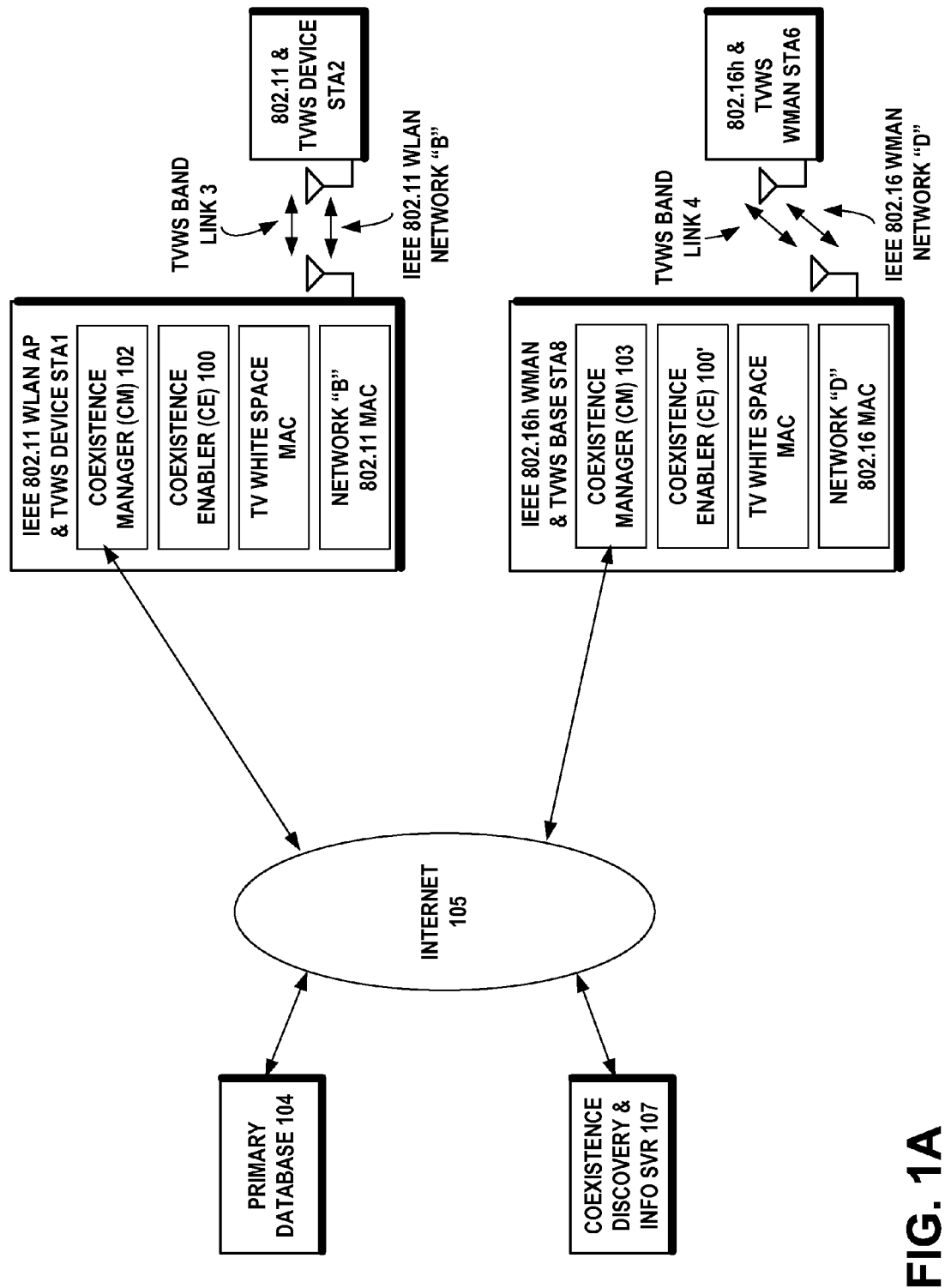
FIG. 1A is an example system architecture according to an embodiment of the present invention, illustrating an example relationship between the network controller or coexistence manager, the primary database, and the coexistence network element Coexistence Discovery & Info Server (CDIS). A network of distributed coexistence managers may communicate with one another over the Internet, in an example embodiment of the invention.

In the United States, the FCC has opened up 300 MHz to 400 MHz of white spaces for unlicensed use that became unused after a federally mandated transformation of analog TV broadcasting to digital TV broadcasting. However, the FCC has prohibited unlicensed use of white spaces from interfering with existing licensed uses, including digital TV stations, low power TV stations, cable TV headends, and sites where low power wireless microphones are used. Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

Coexistence standards are currently being developed to enable two or more independently operated wireless networks or devices using any radio technologies adapted for TV white space frequency bands, to access the same TV white space frequency band in the same location without mutual interference.

The IEEE 802.19 Working Group is currently defining coexistence rules for heterogeneous secondary networks. An example embodiment of the invention enables coexistence between heterogeneous secondary networks and coexistence between secondary networks and primary networks that are required to be protected. Primary networks and users are incumbent users of the selected frequency band that have a form of priority access to the band. Primary networks include networks operating in FCC licensed bands, such as for commercial radio and television broadcasting. Secondary networks and users are allowed to use the selected band only if there are resources that are not used by the primary users. Secondary networks include any broadband networks operating unlicensed in the TV white spaces (TVWS) and using transmission devices that comply with the FCC requirements for TV Band Devices (TVBDs). Fixed TVBD devices must include geo-location and query a database to determine allowed channels. Portable TVBD devices must be able to access geo-location data and include a spectrum sensing capability to identify TV and wireless microphone signals.

The FCC has adopted rules to allow unlicensed radio transmitters to operate in the broadcast television spectrum at locations where that spectrum is not being used by licensed broadcasters. The FCC required the use of geolocation to establish the location of the unlicensed transmitter and a database of TV bands use by licensed broadcasters organized by their geographic coverage areas, to enable the unlicensed transmitter to know where local TV band white spaces may be available. The FCC required the use of spectrum sensors in the unlicensed transmitter to detect the presence of the incumbent, primary TV broadcaster's signal in the local TV band white space to enable the unlicensed transmitter to immediately relinquish using the band. A primary user in such a local TV band white space would be an incumbent TV broadcaster licensed to operate in that band, but in those geographic areas where there are no licensed incumbent TV broadcasters in operation, other unlicensed secondary users may make use of that band.

Other RF spectrum white spaces may be locally unused in certain geographic areas, such as the frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused RF spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band.

Active coexistence between secondary networks using the RF white spaces may require new techniques for fairly sharing the available bandwidth among different heterogeneous secondary networks and accord the required preference for primary users of the band. Such new techniques may require some form of communication between the secondary networks to enable a fair usage of the local spectrum.

FIG. 1 is an example system architecture diagram according to an embodiment of the present invention, illustrating the coverage of an IEEE 802.16h wireless metropolitan area network (WMAN) cell overlapped by an IEEE 802.11 wireless local area network (WLAN) cell. An IEEE 802.16h WMAN STA 6 exchanges wireless broadband messages with an IEEE 802.16h WMAN base station 8 in a WMAN network "D". The WLAN access point STA1 exchanges wireless broadband messages with an IEEE 802.11 client device STA2, such as a personal computer over the WLAN network "B". Both IEEE 802.11 WLAN access point STA1 and the IEEE 802.11 client device STA2 interfere with the IEEE 802.16h WMAN STA 6. For example, WLAN devices are typically designed for better resistance to saturation than WMAN devices, since WMAN devices must be more sensitive to attenuated signals received over a greater range than are WLAN devices and are therefore more sensitive to interference. Both the WLAN access point STA1 and IEEE 802.11 client device STA2 are TV white space (TVWS) devices, meaning that they are equipped to communicate over the dedicated TV band white space 30. Similarly, the IEEE 802.16h WMAN STA 6 and the IEEE 802.16h WMAN base station 8 are TV white space (TVWS) devices, meaning that they are equipped to communicate over the dedicated TV band white space 30. Thus, the interference of the IEEE 802.16h WMAN STA 6 by both the IEEE 802.11 WLAN access point STA1 and the IEEE 802.11 client device STA2 may be ameliorated by reallocating the IEEE 802.11 frames from the WLAN network "B" to the TV band white space link 3. The dedicated TV band white space 30 may be shared by many terminals using diverse communication protocols. For example, if the WMAN network "D" reaches its maximum capacity, the traffic congestion may be alleviated by reallocating the IEEE 802.16h frames from the WMAN network "D" to the TV band white space link 4. A third device, STA3, is present in the 802.11 WLAN cell of STA1, as part of a neighboring network "A" with 802.11 AP STA5. STA3 is also a TV white space (TVWS) device and has reallocated frames on TVWS link 9 communicating over the dedicated TV band white space 30. A fourth device, STA4, is present in the 802.11 WLAN cell of STA1, as part of a neighboring network "F" with 802.11 AP STAT. STA4 is also a TV white space (TVWS) device and has reallocated frames on TVWS link 15 communicating over the dedicated TV band white space 30.

Other network topologies may make use of example embodiments of the invention, for example more heterogeneous networks, each of which has an Internet connection that they may use first for neighboring network discovery.

FIG. 1 also shows three example white space bands locally unused by licensed primary users of their respective RF spectrum white spaces, which may be used by the WLAN access point STA1 or client device STA2, operating as unlicensed secondary users. TV band white space 31 is locally unused by licensed TV broadcasters. Maritime radio band 33 is locally unused by licensed maritime band radios. Earth station-to-satellite radio band 35 is locally unused by licensed earth station radios. An example of a TV band white space 31 locally unused by licensed TV broadcasters is the 174-204 MHz band, representing the local absence of broadcast VHF TV channels 7, 8, 9, 10, and 11. If there were a local absence of licensed broadcasters in TV band white space 31, on VHF TV channels 7, 8, 9, 10, and 11, which would otherwise interfere with the WLAN access point STA1 or client device STA2, then they could operate as unlicensed secondary users and make use of TV band white space 31. If either STA1 or STA2 were to detect a signal transmitted from a neighboring TV broadcaster in band 31, then they would have to relinquish their use of the TV band white space 31 and make a resource request, in accordance with an example embodiment of the invention.

A maritime radio operates in a number of licensed frequency allocations and is a primary user in the maritime radio band 33. If there were no licensed maritime radios in operation that would interfere with the WLAN access point STA1 or client device STA2, then they could operate as unlicensed secondary users and make use of maritime radio band 33. If either STA1 or STA2 were to detect a signal transmitted from a neighboring maritime radio, then they would have to relinquish their use of the maritime band 33 and make a resource request, in accordance with example embodiments of the invention.

A satellite earth station transmits to satellites in licensed frequency allocations from 2.025 GHz to 2.110 GHz and is a primary user in the earth-to-satellite band 35. If there were no licensed earth station radios in operation that would interfere with the WLAN access point STA1 or client device STA2, then they could operate as unlicensed secondary users and make use of earth-to-satellite radio band 35. If either STA1 or STA2 were to detect a signal transmitted from a neighboring earth station radio, then they would have to relinquish their use of the earth-to-satellite band 35 and make a resource request, in accordance with example embodiments of the invention.

FIG. 1A is an example system architecture according to an embodiment of the present invention, illustrating an example relationship between a network controller or coexistence manager, a primary database, and a coexistence network element assisting the network controllers or coexistence managers in neighbor discovery. A network of distributed coexistence managers 102 and 103 may communicate with one another over the Internet, in an example embodiment of the invention. According to this example embodiment, the control node or coexistence enabler 100 in the IEEE 802.11 WLAN access point STA1 for a Network "B" is collocated with the TVWS coexistence manager 102. The coexistence enabler 100' in the IEEE 802.16h WMAN base STA8 for a Network "D" is collocated with the TVWS coexistence manager 103. The distributed coexistence managers 102 and 103 may communicate over the Internet with the TVWS primary database 104 and the TVWS coexistence network element Coexistence Discovery & Info Server (CDIS) 107 assisting the coexistence managers 102 and 103 in neighbor discovery, in an example embodiment of the invention. STA1 may be a master device registered through the control node or coexistence enabler 100 to the network controller or coexistence manager 102. STA8 may be a master device registered through the control node or coexistence enabler 100' to the network controller or coexistence manager 103.

In an embodiment of the invention, a STA1 master device is registered through its control node or coexistence enabler CE 100 to coexistence information services associated with its network controller or coexistence manager CM 102, to provide information characterizing the master device's satisfaction with the current resources available to its associated network B. STA8 master device is registered through its control node or coexistence enabler CE 100' to coexistence information services associated with its network controller or coexistence manager CM 103, to provide information characterizing the satisfaction of STA8 master device with the current resources available to its associated network D.

In an embodiment of the invention, Coexistence Discovery and Information Server (CDIS) 107 assists the CMs in the neighbor discovery. It keeps a record of the registered CMs and location of the networks they serve, and provides a list of candidate or potential neighbors for a CM which initiates the neighbor discovery for its network. CDIS may also store some other information relevant for coexistence, for example, statistics of the spectrum use and the portion of networks that use either the information or the management services.

Service Definitions for the IEEE 802.19.1 Standard

According to one example embodiment of the present invention, service definitions for the IEEE 802.19.1 standard is that services are provided by the coexistence system (i.e. the IEEE 802.19.1 system) and they are consumed by TV Band Devices (TVBDs). According to the system model, a TVBD interfaces to a coexistence system through a coexistence enabler CE. A TVBD and its associated coexistence enabler CE (CE/TVBD) may not provide services to the system. A coexistence enabler CE becomes a part of the system once it starts using the system's services, after registering or subscribing to those services. Once that has happened, the coexistence enabler CE may provide information to the system, which information is used by the system in its system services. Thus, a coexistence enabler CE and its associated TVBD may provide information to the system in order to use the services of the system. The system also has the capability to request information (for example, measurements) from the CE/TVBD combination and the coexistence enabler CE may be configured to provide information on certain conditions (for example, triggering rules for information provisioning and filtering rules). But, the CE/TVBD combination may not provide services; it is a user of services. An exception is the Basic/Support Services that are individual support services provided by substantially all the elements to facilitate system configuration and management and the use of information services and management services.

Example definitions of the coexistence system (i.e. the IEEE 802.19.1 system) services may be as follows:
Service Set [1]: Coexistence Management Services
  [a] Provided by the coexistence system, e.g. by CM.
  [b] A CE subscribes to this service when the TVBD associated to it wants the coexistence system to make decisions on the operational parameters.
Service Set [2]: Coexistence Information Services
  [a] Provided by the coexistence system, e.g. by CM.
  [b] A CE subscribes to this service when the TVBD associated to it wants to make its own decisions on the operational parameters.
Basic/Support Coexistence System Services
  [a] This service provides the basic functionality to configure and manage elements, inter-element communication and service usage.
  [b] Comprises of a set of individual services from which some need to be supported by all the entities and some are entity dependent.
The Basic/Support services are bidirectional (CE-CM) services from which some may be available for a CE without separate subscription.
Controlling the Management Space The coexistence manager (CM) is a logical entity providing coexistence services to the networks and devices associated with the coexistence enablers (CEs). There may be two different coexistence services: a) Coexistence management, b) Coexistence information. If a network/device subscribes to the coexistence management service, it asks and authorizes the CM to decide on its operating parameters. If the network/device is subscribed to the coexistence information service, the network/device decides on the operating parameters, but uses the coexistence system and the CM to obtain information for its decision making Neighboring networks/devices may be served by different CMs. The CMs may be responsible for keeping each other updated on changes in spectrum environment with respect to the networks/devices they serve and their neighbors. Communication between CMs with respect to neighbors may depend, at least to some extent, on the service to which the neighboring networks/devices are subscribed.

If the CMs were able to make decisions on operating parameters for all the neighboring networks/devices that are subscribed to the coexistence management service, without regards for which CM serves a particular network/device, then there may be no assurance that a CM could have exclusive control of decisions for its own network/devices. In this context "own network/devices" means that the CM is like a network management server that controls operations of a certain set of networks and devices. There is typically a pre-established relationship between a master device that controls a single network and the CM and that relationship determines the ownership of the CM over networks/devices. This would typically be a consideration when CMs are operated by a network service provider or a network operator who does not want any other competing CM controlling its networks/devices.

If CMs merely inform each other of their decisions, there may be no real management service as most of the networks/devices are served by different CMs. At one extreme each master device, for example, an access point (AP), has a collocated and embedded CM that serves only that device and the related network. If the CM is making decisions on the AP's operating parameters and there are similar neighboring networks and devices, but the CMs can only decide on operating parameters of their own network/device, there would be no real coexistence management in the system. Each network/device would make their own decisions, whereas it would often be more efficient to make joint decisions.

In embodiments of the invention, a CM may determine whether it allows another CM to manage its own network/device when the other CM manages a neighboring network/device. A CM has a control function to determine whether sharing of control is permitted and has a communication function to communicate the decision to the other CM.

Inter-CM Communication

Once the CM has determined with the control function the control parameter value, it may communicate in the following manner, the service subscription to other CMs that manage neighboring networks/devices of its own network/device:
  a) If Device(i) is subscribed to the coexistence management service, and
    a.1) If Management_Allowed[i]=True, notify the other CM that the Device(i) is subscribed to the coexistence management service (i.e. indicate the actual service subscription).
    a.2) If Management_Allowed[i]=False, notify the other CM that the Device(i) is subscribed to the coexistence information service (i.e. indicate a fake service subscription).
  b) If Device(i) is subscribed to the coexistence information service, notify the other CM that the Device(i) is subscribed to the coexistence information service (i.e. tell the actual service subscription).

Resource Reallocation Process

If there has been a major change in the network neighborhood after a previous resource allocation, resulting in there being not enough free or advertized resources are available to satisfy the requirements of Network "B", the coexistence enabler 100 and coexistence manager 102 may initiate a resource reallocation process. The resource reallocation process may be either a light resource request process directed only to the networks in the same network allocation group or a more extensive resource request process directed to all networks within interference range. This graduated analysis brings more stability to the network environment when resource needs are varying. Example steps in requesting a reallocation of resources are:
  coexistence enabler 100 identifies excess resource need because of:
    Internal request
    Coexistence communication trigger
  coexistence enabler 100 sends a Resource Request to its coexistence manager 102.
  coexistence manager 102 analyses environment situation using
    Spectrum map (a separate process to keep updated)
  coexistence manager 102 determines resource allocation process
    More extensive: change in number of available channels for secondary users or in number of secondary networks
    Light: other cases
  coexistence manager 102 initiates resource allocation if coexistence enabler 100 is eligible or other suitable free resources available.

Examples of a network allocation group include self-coexistence scenarios where two systems (a base station or access point and the associated mobile station or STA) use the same technology and may share a frequency channel. For example, an IEEE 802.11 WLAN may coexist with another IEEE 802.11 WLAN in sharing a TV band white space, if both systems use the same physical layer (PHY) technology and channel width. In another example, an IEEE 802.16h WMAN coexists with another IEEE 802.16h WMAN in sharing a TV band white space.

Other examples of a network allocation group include different IEEE 802 network technologies that may be time division multiplexed based on the IEEE 802.16h draft standard and are synchronized with a GPS clock or IEEE 1588 or IETF network time protocol clocks.

Neighboring networks may be identified to a local network, for example, by a coexistence manager transmitting a request to a server via an Internet connection. This request may inquire as to whether other networks are located proximate to the local network in an operational environment. The server may return information to the coexistence manager via the Internet informing the coexistence manager of the proximately-located networks.

The information provided by the server to the coexistence manager may comprise Internet addresses corresponding to potential coexistence enablers or coexistence managers that are managing wireless networks in the same operational environment as the local network. The coexistence manager uses these addresses to contact at least some of the coexistence managers of the potential networks via the Internet in order to request communication configuration and test information. The other networks may respond to these requests, and the coexistence manager may use the communication received configuration and test information to select a group of candidate networks. Candidate networks may be selected based on, for example, the distance from the local network to a potential network, transmission properties (e.g., transmission power of potential networks), etc. Information needed for candidate selection may be provided by potential networks to the local network or the coexistence manager via an Internet connection.

The local network may then initiate testing the group of candidate networks. Testing may comprise transmitting one or more wireless signals that should be receivable by the candidate networks. The coexistence manager may utilize testing results to select real neighbor networks from the group of candidate networks.

In an example embodiment of the invention, FIG. 1A shows the relationship between the control node or coexistence enabler 100 and the network controller or coexistence manager 102 in the TV white space (TVWS) WLAN access point STA1 and the distributed coexistence manager 103 in the TVWS base STA8. The coexistence enabler 100 has to obtain information required for coexistence from a traffic network or device representing it. This includes configuration and control of measurements. Also, the coexistence enabler 100 has to provide reconfiguration commands and control information to the Network "B" or the WLAN access point STA1, corresponding to coexisting decisions received from coexistence managers 102 and 103, respectively. The coexistence manager 102 is responsible for discovery of Coexistence Managers (CM)s 103 managing neighboring wireless networks, for example, and coexistence related information may be exchanged with them. The coexistence manager 102 o 103 has the needed information to make decisions of resource sharing among the Coexistence Managers (CM)s managing neighboring wireless networks.

The example system architecture of FIG. 1A shows the coexistence enabler 100 and coexistence manager 102 in the TV white space WLAN access point STA1 for a Network "B". In the example shown, the TV white space (TVWS) WLAN access point STA1 includes a coexistence enabler 100 and coexistence manager 102, and is serving as an access point for the TVWS wireless device STA2 in the Network "B", which may be, for example, an IEEE 802.11 WLAN. The IEEE 802.16h WMAN base STA 8 is also a TV white space (TVWS) wireless device and includes a coexistence enabler 100' and coexistence manager 103, and communicates with the WMAN STA 6. IEEE 802.16h WMAN base station 8 is in the WMAN network "D", which may be, for example, an IEEE 802.16h WMAN. The coexistence manager 102 handles resource requests from the coexistence enabler 100 in STA1. The coexistence manager 103 handles resource requests from the coexistence enabler 100' in base STA 8. The TV white space (TVWS) WLAN access point STA1 in the Network "B" includes a Network "B" MAC and PHY to communicate over the Network "B". The IEEE 802.16h WMAN base STA 8 in the Network "D", includes a Network "D" MAC and PHY to communicate over the Network "D". Each TV white space (TVWS) wireless devices STA1 in the Network "B" and STA 6 in the Network "D", includes a TV white spaces MAC and PHY to communicate in channels in the TV white spaces band reallocated by the coexistence manager 102 and 103, respectively, without mutual interference. The coexistence enablers 100 and 100' in STA1 and in base STA 8 send resource requests to the respective coexistence managers 102 and 103.

The example system architecture of FIG. 1A shows the coexistence manager 102 receiving a resource request from the coexistence enabler 100 in TV white space (TVWS) WLAN access point STA1. The coexistence manager 102 has received Spectrum sensing results and network parameters from the coexistence enabler 100 in device STA1. Network parameters may include specific user requirements (user load, QoS, priority, etc), aggregate spectral efficiency, etiquette (first come, first served, etc.), and user or network policies. The coexistence manager 102 accesses the primary database 104 to obtain available secondary channels in the TV band white space. The coexistence manager 102 accesses the coexistence network element Coexistence Discovery & Info Server (CDIS) 107 to obtain Potential neighbor networks' addresses. The coexistence manager 102 processes this data in conjunction with Spectrum maps, Operational parameters, and Time base sync, to determine a resource reallocation for the coexistence enabler 100 in device STA1. The coexistence manager 102 then sends to the coexistence enabler 100 in device STA1 the resource reallocation, including Operational parameters, Quiet period parameters, Spectrum sensing strategy, and Time base sync. The coexistence enabler 100 in device STA1 then controls the medium access control (MAC) to communicate in channels in the TV white spaces band reallocated by the coexistence manager 102, without interference from other networks sharing the same white space channels. A similar operation may be carried our by the coexistence manager 103 in conjunction with the coexistence enabler 100' in base STA 8. A network of distributed coexistence managers 102 and 103 may communicate with one another over the Internet 105.

Figure 1B:
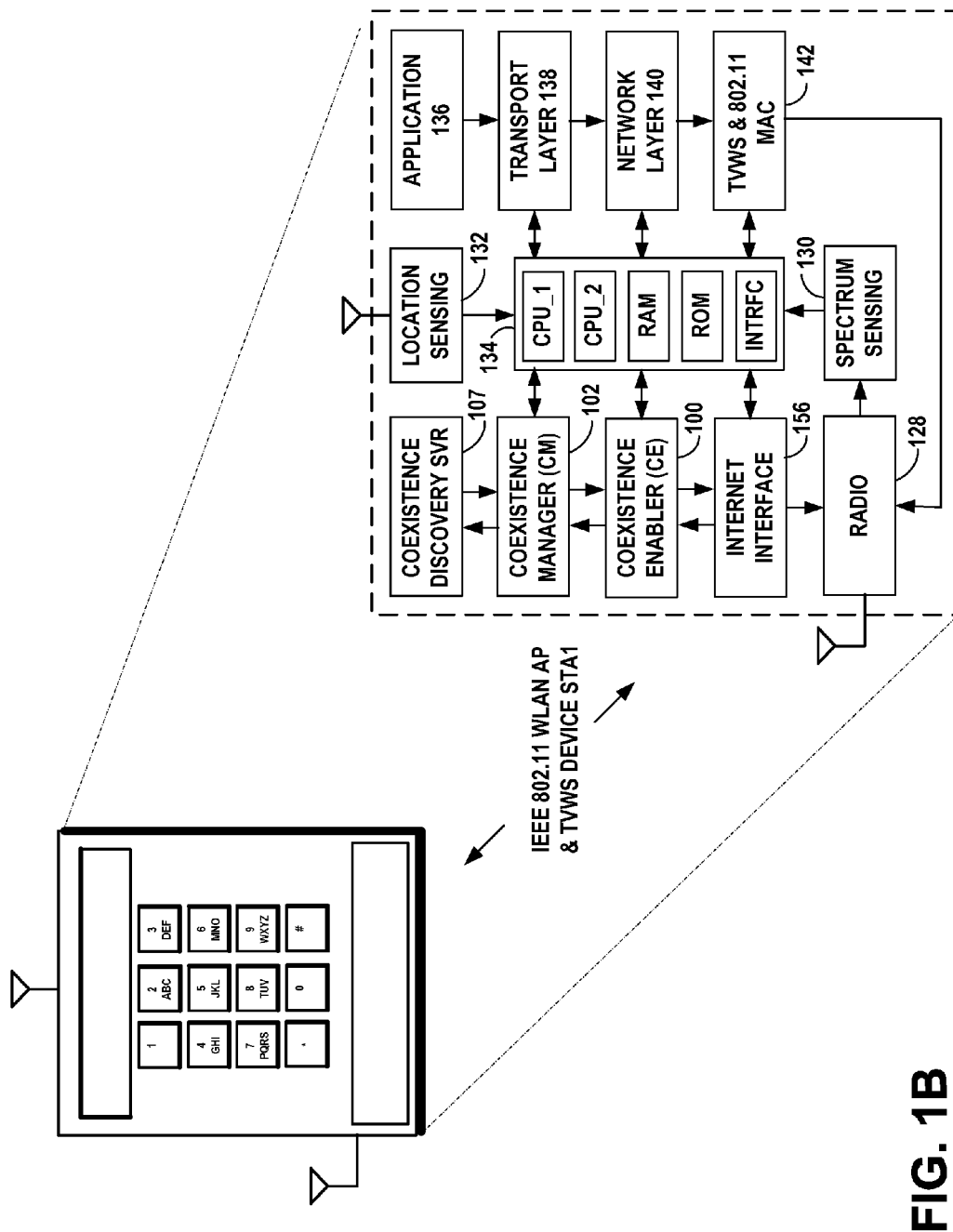
FIG. 1B is an example functional block diagram according to an embodiment of the present invention, illustrating an example TV white space wireless device including the network controller or coexistence manager and the control node or coexistence enabler for a network. The device may be configured to operate in additional RF spectrum white space bands wherein there are no primary user radios operating in the neighboring wireless networks.

FIG. 1B is an example functional block diagram according to an embodiment of the present invention, illustrating an example TV white space WLAN access point STA1 including the control node or coexistence enabler 100 for Network "B" and network controller or coexistence manager 102. The example device STA1 includes a protocol stack for Network "B", including the radio 128 and the Network "B" IEEE 802.11 MAC 142, which may be based, for example, on the IEEE 802.11 WLAN standard. The MAC 142 includes integrated TV white space features. The protocol stack may also include a network layer 140, a transport layer 138, and an application program 136. The example device STA1 includes a processor 134 that includes a dual core central processing unit CPU_1 and CPU_2, a RAM memory, a ROM memory, and an interface for a keypad, display, and other input/output devices. A location sensor 134, such as a GPS is included to establish the geographic location of the device STA1, and the location of the STA1 is reported to the network controller or coexistence manager 102. The coexistence enabler 100 sends resource requests to the coexistence manager 102. The MAC 142 includes integrated TV white space features to communicate using the radio 128 in channels in the TV white spaces band reallocated by the coexistence manager 102, without mutual interference. The spectrum sensor 130 senses the electromagnetic environment of the STA1 and reports it to the coexistence manager 102.

Control node according to an embodiment of the present invention, such as the CE 100 obtains information required for coexistence from TV Band Device (TVBD) network or device. This includes configuration and control of measurements performed by TVBD network or device. The CE forwards the collected information to its associated network controller, such as CM 102. The information may be formatted in standard format. Also, the CE provides reconfiguration commands and control information to TVBD network or device, corresponding to coexisting decisions received from the associated CM. The CE may reside in a TVBD device, e.g. in access point, base station, or mesh point. There is one CE in a network. It may collect the information from the other network nodes using radio standard specific means.

A network controller, such as the CM 102 is responsible for making the decisions on the spectrum resource sharing, discovery of other CMs controlling neighboring networks and coexistence related information exchange with them. The CM may serve one or more networks. It collects information from associated networks and configures it via a control node of a wireless network, such as CE 100. The CM may also obtain information from the TVWS database. From the collected information the CM constructs the spectrum map for the network, and calculates the amount of resources for which the network is eligible in the current spectrum environment. The information is used in spectrum allocation. The CM commands its CE(s) 100 based on the decisions it and its neighboring CMs have made. It is optional whether there is a hierarchy between CMs. The CM may reside in a TVBD device, or in the network.

A wireless network discovery apparatus or entity, such as the Coexistence Discovery and Information Server (CDIS) 107 may assist the CMs 102 to discover possible coexistence conflicts of the networks it controls, and to discover the CMs with which the conflicts may be solved. The CDIS may support the discovery of CMs by keeping a record of the existing CMs and location of the networks they control. It provides a list of potential neighboring CMs for the CMs controlling new or moving networks. Such CDIS server is needed for discovering neighboring networks, because all the networks are not expected to support the same radio connectivity and thus cannot discover each other directly over the radio interface. The CDIS may have other functions like storing more information of each CM, statistics of the spectrum use, or providing common Quiet Period for spectrum sensing. The CDIS may also use the information of primary users due to an optional interface to TVWS database. The CDIS 107 may reside in a TVBD device, or in the network.

The interface circuits in FIG. 1B may interface with one or more radio transceivers, battery and other power sources, key pad, touch screen, display, microphone, speakers, ear pieces, camera or other imaging devices, etc. The RAM and ROM may be removable memory devices such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. of the control node or coexistence enabler and coexistence manager from a computer program product or article of manufacture in the form of computer-usable media such as resident memory devices, smart cards or other removable memory devices, or in the form of program logic transmitted over any transmitting medium which transmits such a program. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

Figure 1C:
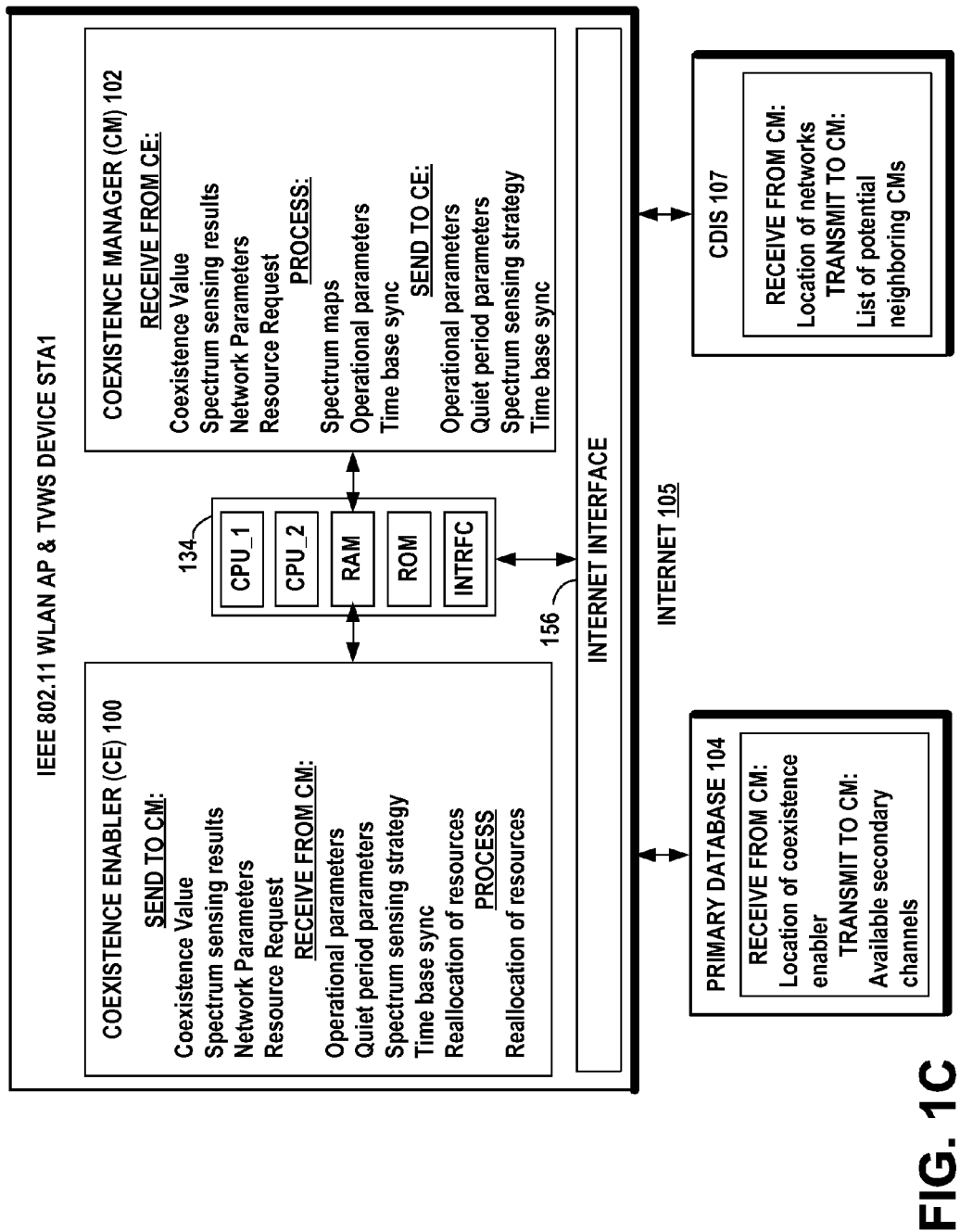
FIG. 1C is an example functional block diagram according to an embodiment of the present invention, illustrating the IEEE 802.11 WLAN AP and TVWS device STA1, which includes the network controller or coexistence manager and the control node or coexistence enabler, communicating over the Internet with the primary database and the coexistence network element Coexistence Discovery & Info Server (CDIS).

FIG. 1C is an example functional block diagram according to an embodiment of the present invention, illustrating the IEEE 802.11 WLAN AP & TVWS device STA1 that includes both the network controller or coexistence manager 102 and the control node or coexistence enabler 100. The coexistence manager 102 communicates with the primary database 104 and the coexistence and wireless network discovery element Coexistence Discovery & Info Server (CDIS) 107 via the Internet interface 156. The coexistence manager 102 accesses the primary database 104 to obtain available secondary channels in the TV band white space. The coexistence manager 102 accesses the coexistence and wireless network discovery element Coexistence Discovery & Info Server (CDIS) 107 to obtain Potential neighbor networks' addresses. The coexistence manager 102 sends resource reallocation messages to the coexistence enabler 100. The example coexistence manager 102 includes a processor 154 that includes a dual core central processing unit CPU_1 and CPU_2, a RAM memory, a ROM memory, and an interface for input/output devices. The database interface 156 provides the interface to the primary database 104 and the coexistence network element Coexistence Discovery & Info Server (CDIS) 107. The CDIS 107 may reside in the STA1 device, or in the network.

The interface circuits in FIG. 1C may interface with one or more radio transceivers, battery and other power sources, key pad, touch screen, display, microphone, speakers, ear pieces, camera or other imaging devices, etc. The RAM and ROM may be removable memory devices such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of an example embodiment of the invention. The program logic may be delivered to the writeable RAM, PROMS, flash memory devices, etc. of the coexistence enabler from a computer program product or article of manufacture in the form of a non-transitory computer-usable media such as resident memory devices, smart cards or other removable memory devices, or in the form of program logic transmitted over any transmitting medium which transmits such a program. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

In an example embodiment of the invention, in a first process the Coexistence Enabler (CE) 100 may calculate a CoexistenceValue (CV) from some parameters of the network under it, for example the IEEE 802.11 WLAN NETWORK "B". The CE 100 will transmit a CV value to its CM 102, which will further share it with other CMs of all neighboring networks. In an example embodiment of the invention, in a second process, the CE 100 will transmit its network capabilities to its CM 102, which will share them with the same other CMs of all neighboring networks. In an example embodiment of the invention, in a third process, the spectrum map creation process is performed by the CM 102 from the information received from the CE 100, the primary database 104 and information from the CMs of neighboring networks. The information of these three processes is used when the CE 100 identifies an excess resource need in its network and sends a resource request (RR) containing the amount of additional resources it needs to its CM 102. Each CM 102 has received the CV, the spectrum map and the network capabilities of its own network under CE 100 and neighboring networks. The CM 102 processes the RR, and if an allocation analysis is needed, it uses the CVs of the requesting network and its neighboring networks to evaluate whether the requesting network needing more resources is eligible to for the amount of resources requested in the RR. If the network is eligible to the requested additional resources, its CM 102 will then communicate a new resources allocation to the other CMs of its neighboring networks, or else the CM 102 will inform CE 100 that the network requesting the additional resources is not eligible for the requested resources.

In an example embodiment of the invention, certain parameters provide a good and/or practical representation of the eligibility level to the spectrum resources. The CoexistenceValue (CV) has to be counted with similar methods for each network. Some candidate parameters for the CoexistenceValue include: the number of nodes per network (with particular counting method), the current allocation usage level, and the network capabilities. A particular parameter priority may be used for "tuning the eligibility" among the networks under one CM.

Figure 1D:
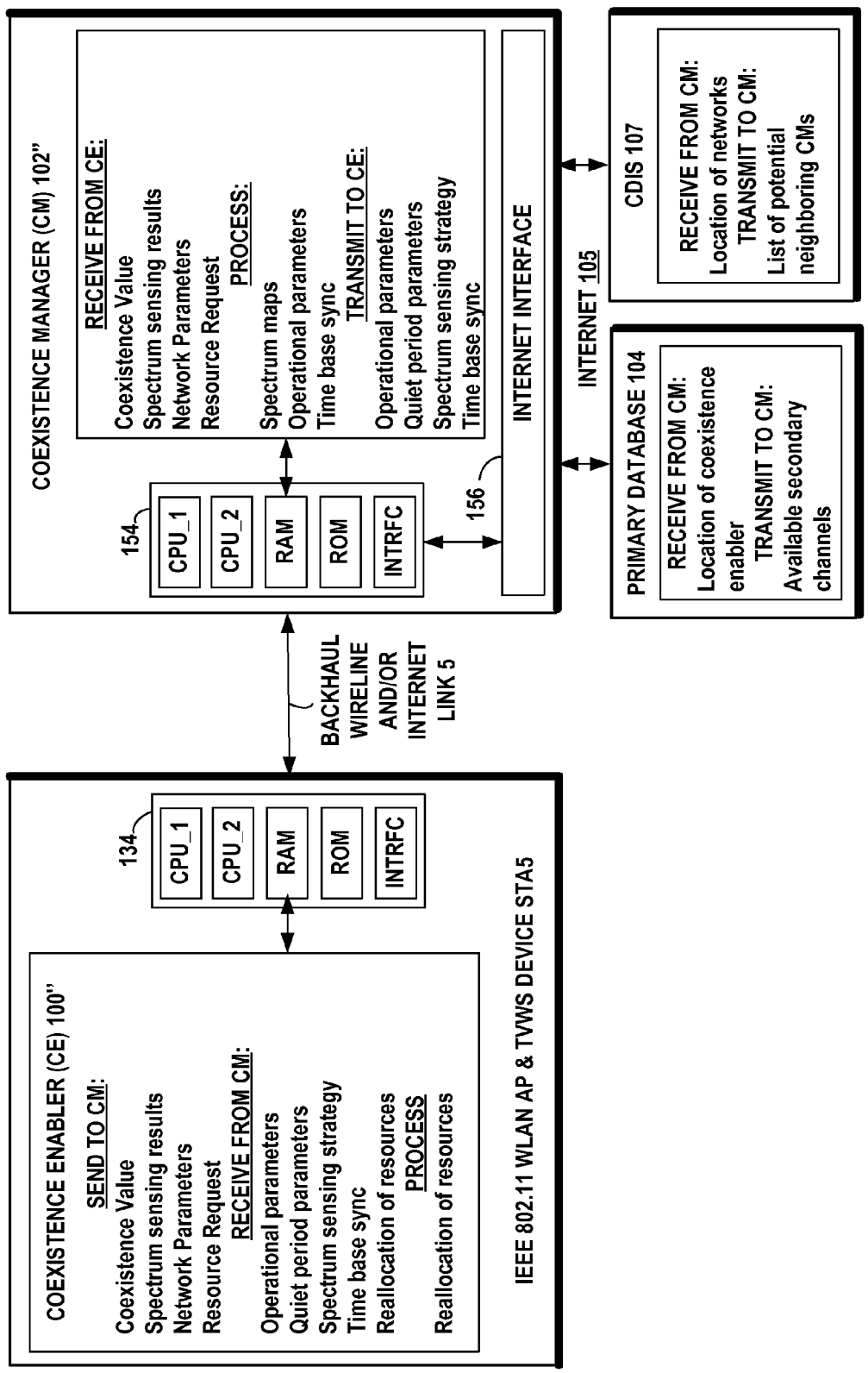
FIG. 1D is an example network diagram according to another embodiment of the present invention, illustrating the IEEE 802.11 WLAN AP and TVWS device STA5, which includes the control node or coexistence enabler, communicating over a backhaul wireline and/or internet link with the network controller or coexistence manager.

FIG. 1D is an example network diagram according to another embodiment of the present invention, illustrating the IEEE 802.11 WLAN AP and TVWS device STA5, which includes the control node or coexistence enabler 100", communicating over a backhaul wireline and/or internet link 5 with the network controller or coexistence manager 102".

Figure 1E:
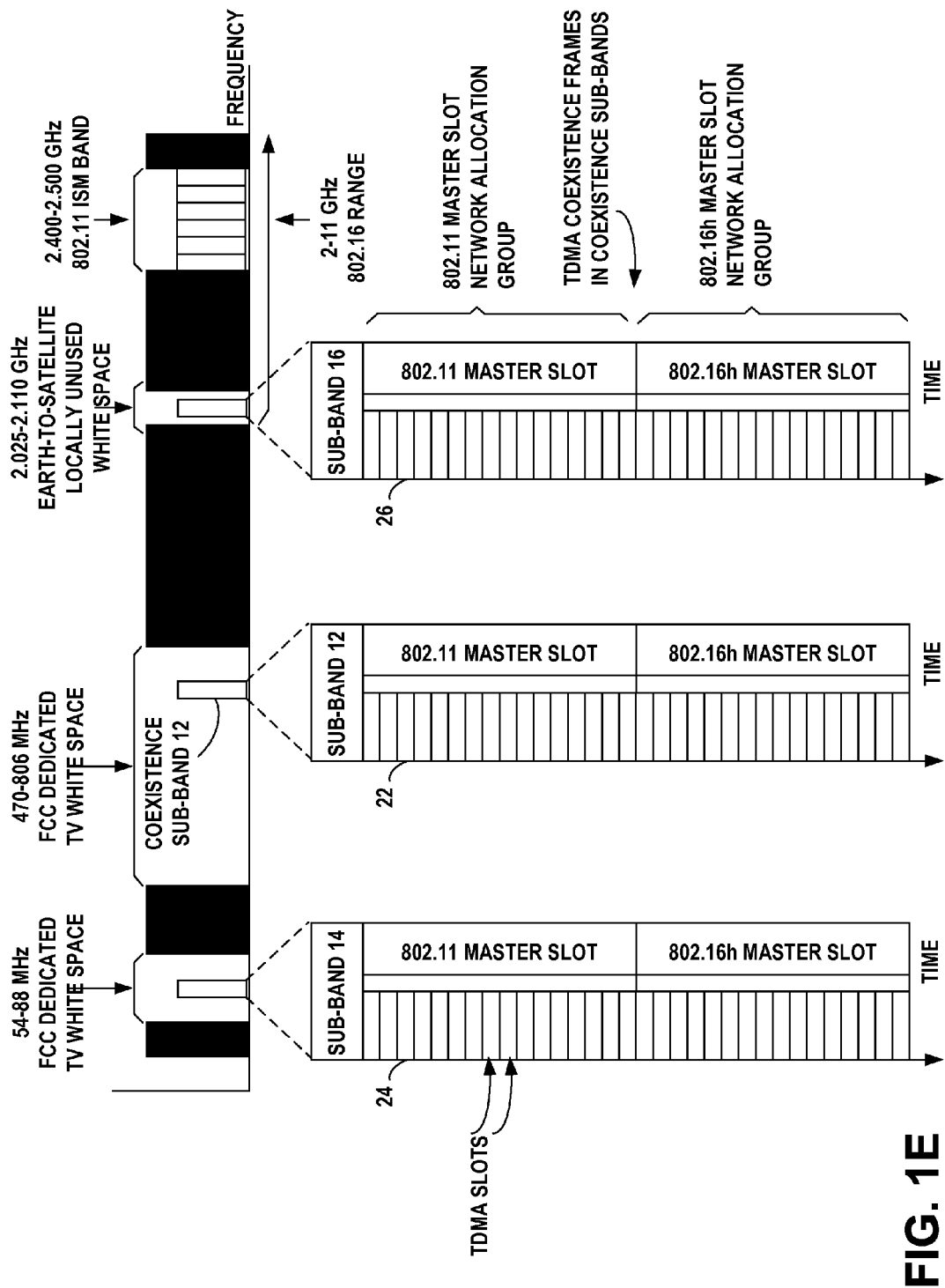
FIG. 1E is an example frequency band diagram illustrating an example TDMA coexistence frame 22 in sub-band 12 in the FCC dedicated TV band white space of 470-806 MHz, an example TDMA coexistence frame 24 in sub-band 14 in the FCC dedicated TV band white space of 54-88 MHz, and an example TDMA coexistence frame 26 in sub-band 16 in the earth station-to-satellite locally unused white space band 2.025 GHz to 2.110 GHz, according to an embodiment of the present invention.

FIG. 1E is an example frequency band diagram illustrating an example TDMA coexistence frame 22 in sub-band 12 in the FCC dedicated TV band white space of 470-806 MHz, an example TDMA coexistence frame 24 in sub-band 14 in the FCC dedicated TV band white space of 54-88 MHz, and an example TDMA coexistence frame 26 in sub-band 16 in the earth station-to-satellite locally unused white space band 2.025 GHz to 2.110 GHz, according to an embodiment of the present invention. License-exempt access to these bands as a secondary use for coexistence of networks requesting additional resources, may include restrictions on geographic location, transmission power, range, and bandwidth of the transmissions of the requesting networks.

For example, the 802.11 WLAN standards specify an OFDM-based physical layer with a bandwidth of 20 MHz channel separation. At 11 MHz from the center of the channel, the energy is approximately 20 dB lower than the maximum signal level. Further away from the centre frequency, the energy levels fall further resulting in minimal interference on adjacent channels. The TV band white spaces at 54-88 MHz and at 470-806 MHz are good candidates for coexistence of an 802.11 WLAN wireless LAN channel. The earth station-to-satellite white space band at 2.025 GHz to 2.110 GHz is a good candidate for coexistence of an 802.11 WLAN wireless LAN channel. A TV band white space locally unused by licensed TV broadcasters, for example, in the 174-204 MHz band, representing the local absence of broadcast TV channels 7, 8, 9, 10, and 11, as is the circumstance in the Richmond, Va. (USA) area, is a good candidate for coexistence of an 802.11 WLAN wireless LAN channel.

FIG. 1E shows an example of the location of the white spaces in the RF spectrum and example TDMA coexistence frames in the white space bands, showing the freely available time slots before any networks have been allocated slots. The white spaces include the FCC dedicated TV white space 54-88 MHz band, the FCC dedicated TV white space 470-806 MHz band, and locally unused the earth station-to-satellite white space band 2.025 GHz to 2.110 GHz.

There are a number of TVWS coexistence techniques possible for enabling two or more independently operated wireless networks or devices using different radio technologies adapted for TV white space frequency bands, to access the same TV white space frequency band in the same location without mutual interference. Some examples of coexistence techniques include dynamic frequency selection, transmit power control, listen-before-talk behavior, time division multiplexing different IEEE 802 technologies, message-based on-demand spectrum contention, and control through a centralized network controller or coexistence manager.

The example coexistence technique illustrated here for each sub-band 12, 14, and 16, is time division multiplexing of the slots in TDMA coexistence frames allocated to different IEEE 802 technologies. The two IEEE 802 technologies chosen for this example are the IEEE 802.16h WMAN standard and the IEEE 802.11 WLAN standard. The IEEE 802.16h WMAN uses a fixed outdoor base station, such as the WMAN base station 8, serving indoor and outdoor portable clients, such as the WMAN STA 6. The IEEE 802.11 WLAN station, such as the WLAN access point STA7, may include Internet access and geo-location capability. The TDMA coexistence frame may be divided into a IEEE 802.11 master slot network allocation group and an IEEE 802.16h master slot network allocation group. The IEEE 802.11 master slot network allocation group carries twelve free IEEE 802.11 WLAN white space slots. The IEEE 802.16h master slot network allocation group carries the twelve free IEEE 802.16h WMAN white space slots.

Figure 1F:
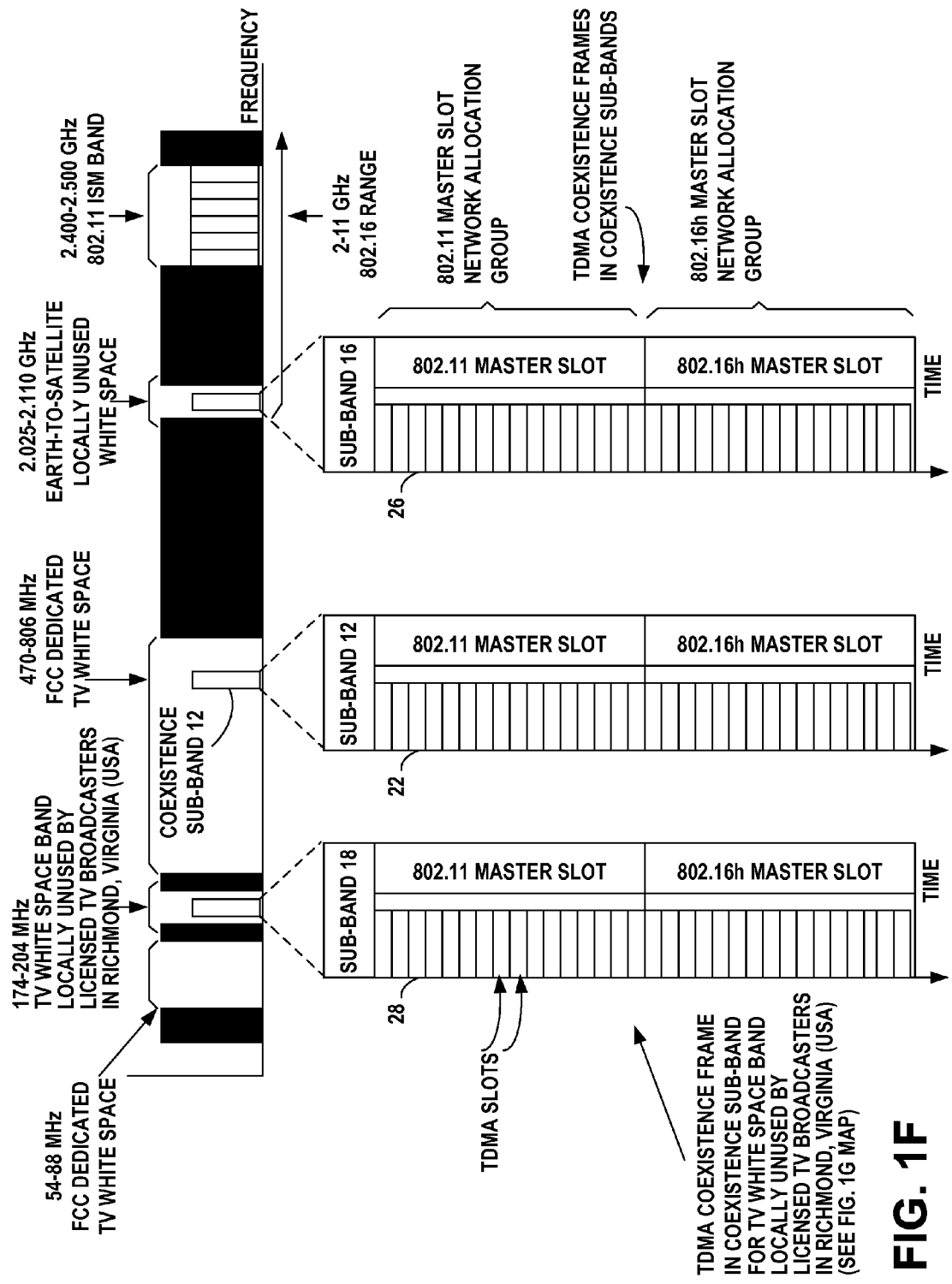
FIG. 1F is an example frequency band diagram illustrating an example TDMA coexistence frame 28 in sub-band 18 in the TV band white space locally unused by licensed TV broadcasters in the 174-204 MHz band, representing broadcast TV channels 7, 8, 9, 10, and 11 in the Richmond, Va. (USA) area, an example TDMA coexistence frame 22 in sub-band 12 in the FCC dedicated TV band white space of 470-806 MHz, and an example TDMA coexistence frame 26 in sub-band 16 in the earth station-to-satellite locally unused white space band 2.025 GHz to 2.110 GHz, according to an embodiment of the present invention.

FIG. 1F is an example frequency band diagram illustrating an example TDMA coexistence frame 28 in sub-band 18 in the TV band white space locally unused by licensed TV broadcasters in the 174-204 MHz band, representing broadcast TV channels 7, 8, 9, 10, and 11 in the Richmond, Va. (USA) area, an example TDMA coexistence frame 22 in sub-band 12 in the FCC dedicated TV band white space of 470-806 MHz, and an example TDMA coexistence frame 26 in sub-band 16 in the earth station-to-satellite locally unused white space band 2.025 GHz to 2.110 GHz, according to an embodiment of the present invention.

Figure 1G:
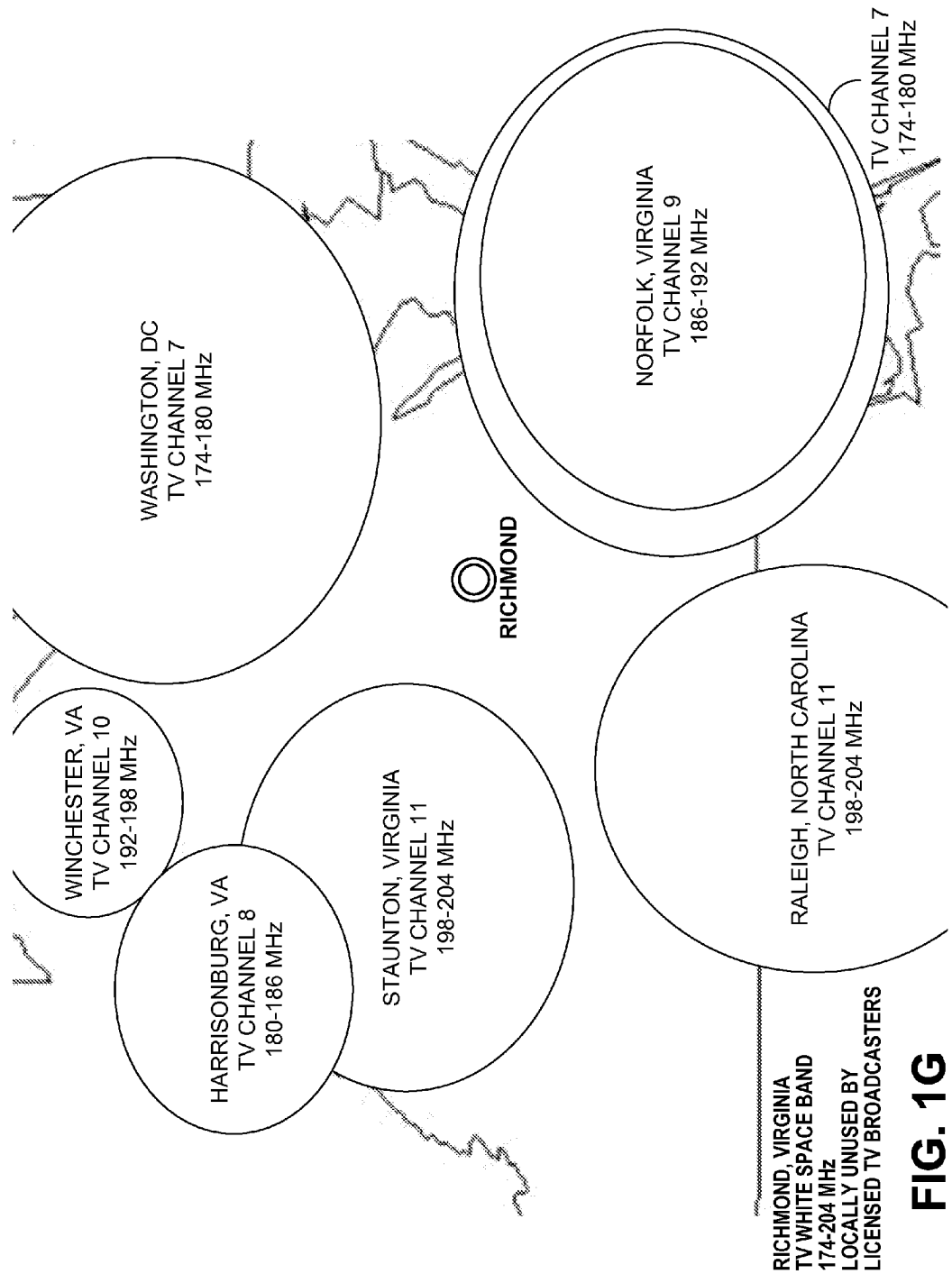
FIG. 1G is an example map of the Richmond, Va. (USA) geographic area and an overlay of coverage areas for broadcast TV channels 7, 8, 9, 10, and 11, illustrating that there is a locally available TV band white space that is unused by licensed TV broadcasters in the 174-204 MHz band.

FIG. 1G is an example map of the Richmond, Va. (USA) geographic area and an overlay of coverage areas for broadcast TV channels 7, 8, 9, 10, and 11, illustrating that there is a locally available TV band white space that is unused by licensed TV broadcasters in the 174-204 MHz band, as shown in FIG. 1F. The cities where there are TV broadcasters for TV channels 7, 8, 9, 10, and 11 in a circular area of approximately 160 kilometers in diameter surrounding the city of Richmond, Va., are shown in the following table. The map of FIG. 1G shows that there is no coverage by licensed TV broadcasters in the 174-204 MHz band, which is therefore a locally available TV band white space.

| | | |
|---|---|---|
| WASHINGTON, DC | TV CHANNEL 7 | 174-180 MHz |
| NORFOLK, VIRGINIA | TV CHANNEL 7 | 174-180 MHz |
| HARRISONBURG, VA | TV CHANNEL 8 | 180-186 MHz |
| WASHINGTON, DC | TV CHANNEL 9 | 186-192 MHz |
| NORFOLK, VIRGINIA | TV CHANNEL 9 | 186-192 MHz |
| WINCHESTER, VA | TV CHANNEL 10 | 192-198 MHz |
| RALEIGH, NC | TV CHANNEL 11 | 198-204 MHz |
| STAUNTON, VIRGINIA | TV CHANNEL 11 | 198-204 MHz |

Figure 1H:
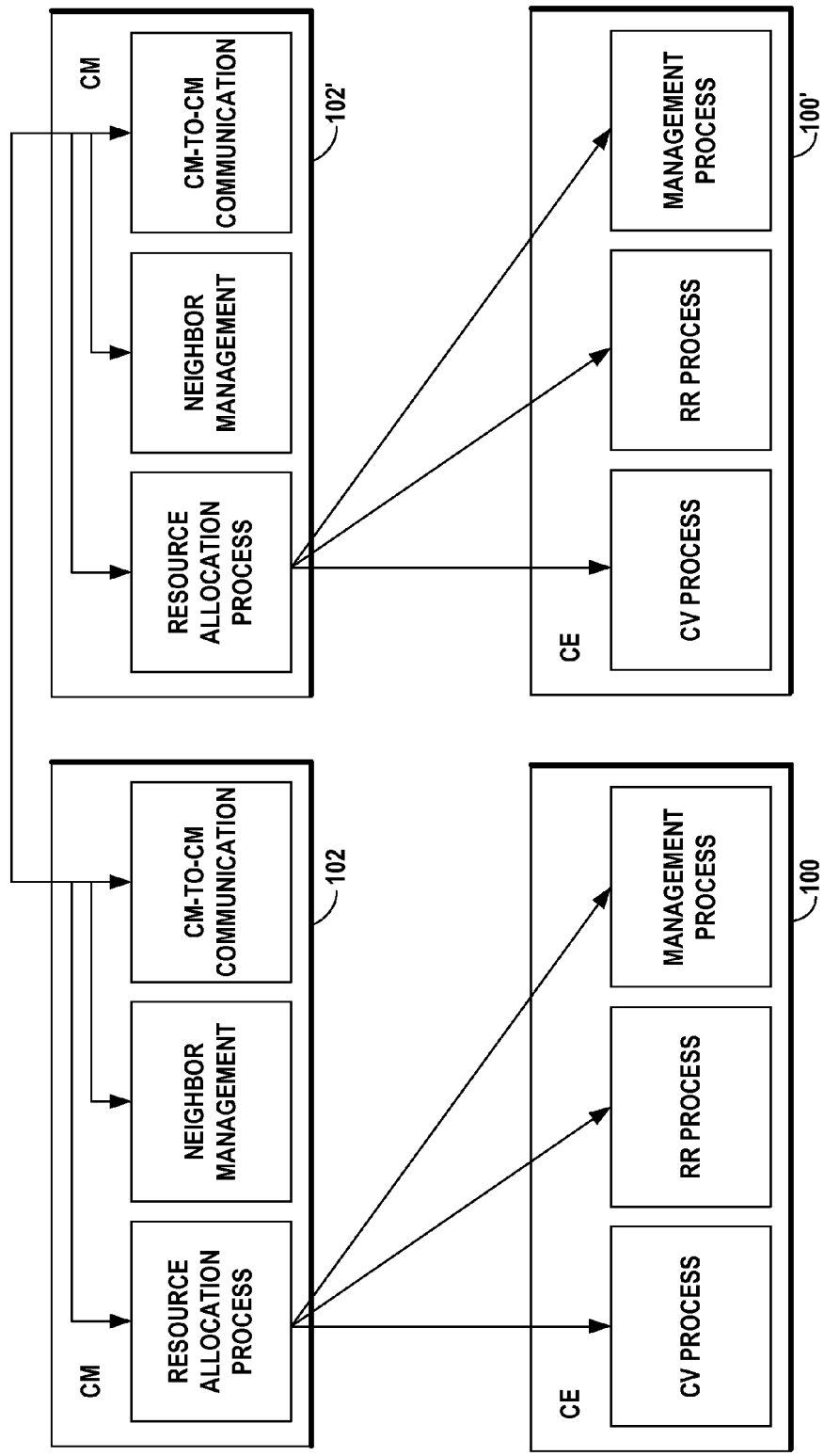
FIG. 1H is an example of the basic functionalities of the network controller or coexistence manager and the control node or coexistence enabler.

FIG. 1H is an example of the basic functionalities of the network controller or coexistence manager and the control node or coexistence enabler.

For the control node or coexistence enabler (CE):

CV process: Determine a parameter that characterizes the network's eligibility level to the spectrum resources. The parameter is determined from certain parameters of the network. The parameter may be called a coexistence value (CV). Provide the CV of the network to the CM serving the CE.

RR process: Form a resource request (RR) and issue it to the serving CM. Formed based upon information gathered from the network on its resource needs.

Management process: Registers the CE to a CM in order to become served by the CM. Maintains connection to the CM and provides information e.g. about network capabilities and CE features. Contains support functions that make the actual coexistence management functionality possible.

For the network controller or coexistence manager (CM):

Resource allocation process: Shares CVs from the CEs one is serving with the CMs of the neighboring networks. Exchanges spectrum maps with the CMs of the neighboring networks. Determines resource allocations using the CVs and spectrum maps.

Neighbor management: Determines neighbors for the CEs/networks the CM serves and facilitates connection setup between CMs serving neighboring networks.

CM-to-CM communication: Provides basic communication services for other functions/processes of the CM to exchange information with other CMs. Communication is needed between CMs that serve CEs of neighboring networks to exchange e.g. CV parameter values and RR process related information.

Figure 2:
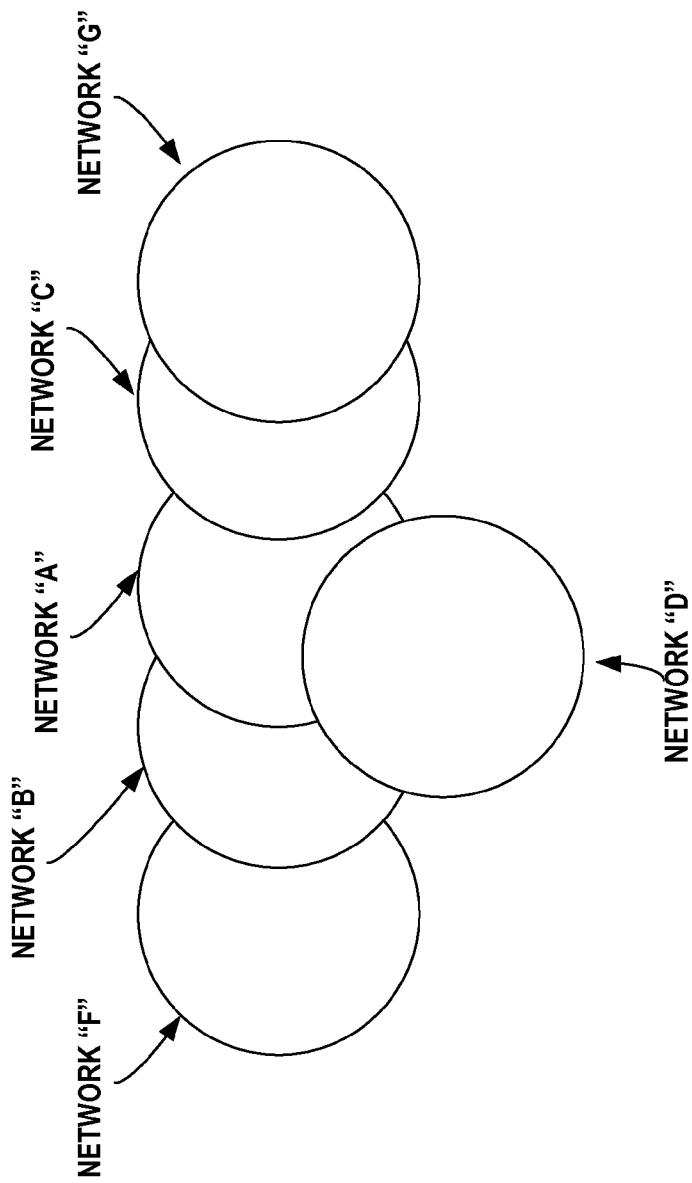
FIG. 2 is an example network topology scenario where the network "B" needs more resources, according to an embodiment of the present invention.

FIG. 2 is an example network topology scenario where the network "B" needs more resources, according to an embodiment of the present invention. An example embodiment of the invention specifies the coexistence entities, their relationships and the resource request method, as illustrated by the following example. The FIG. 2 shows a network scenario, where the circles A, B, C, D, E, F, and G represent the coverage area of each network. These networks are controlled in coexistence by the control node or coexistence enabler and the coexistence manager. Each network has its own coexistence enabler and may have its own coexistence manager or alternately one coexistence manager may control several networks, for example a company WLAN network with several APs.

Figure 3:
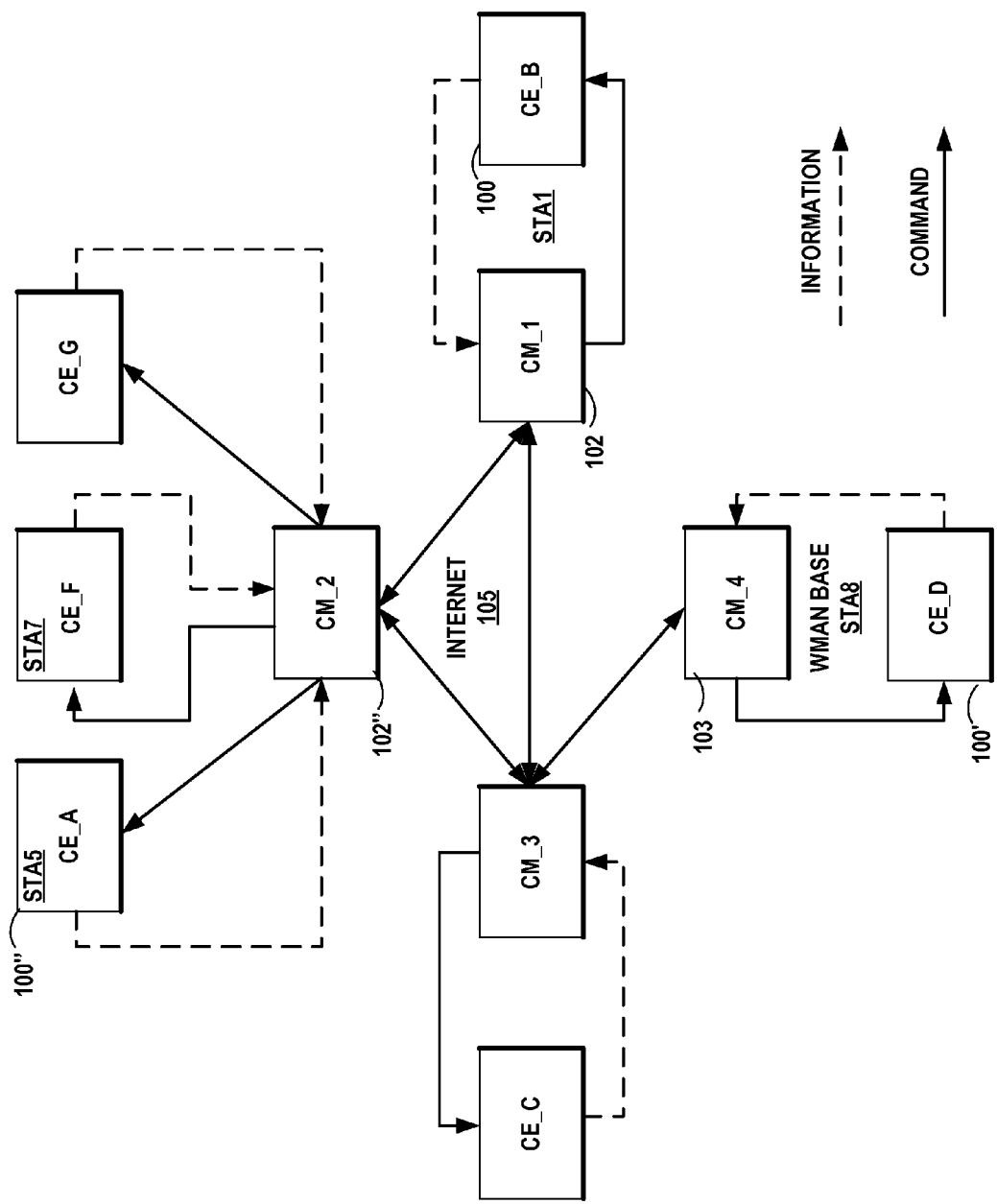
FIG. 3 is an example of coexistence management of the several networks shown in FIG. 2, according to an embodiment of the present invention.

FIG. 3 is an example of coexistence management of the several networks shown in FIG. 2, according to an embodiment of the present invention. Different network controller or coexistence managers 102 are connected together based on actual network overlapping below them. Also networks A, F, and G may form a company network, where each network has its own control node or coexistence enabler 100", but all are managed by one network controller or coexistence manager 102". To complete the architecture view all coexistence managers has a connection to primary database 104 and coexistence network element Coexistence Discovery & Info Server (CDIS) 107, as shown in FIG. 4A. It is possible that some networks may rely only on spectrum sensing (a special mode in FCC TV white spaces).

Figure 4:
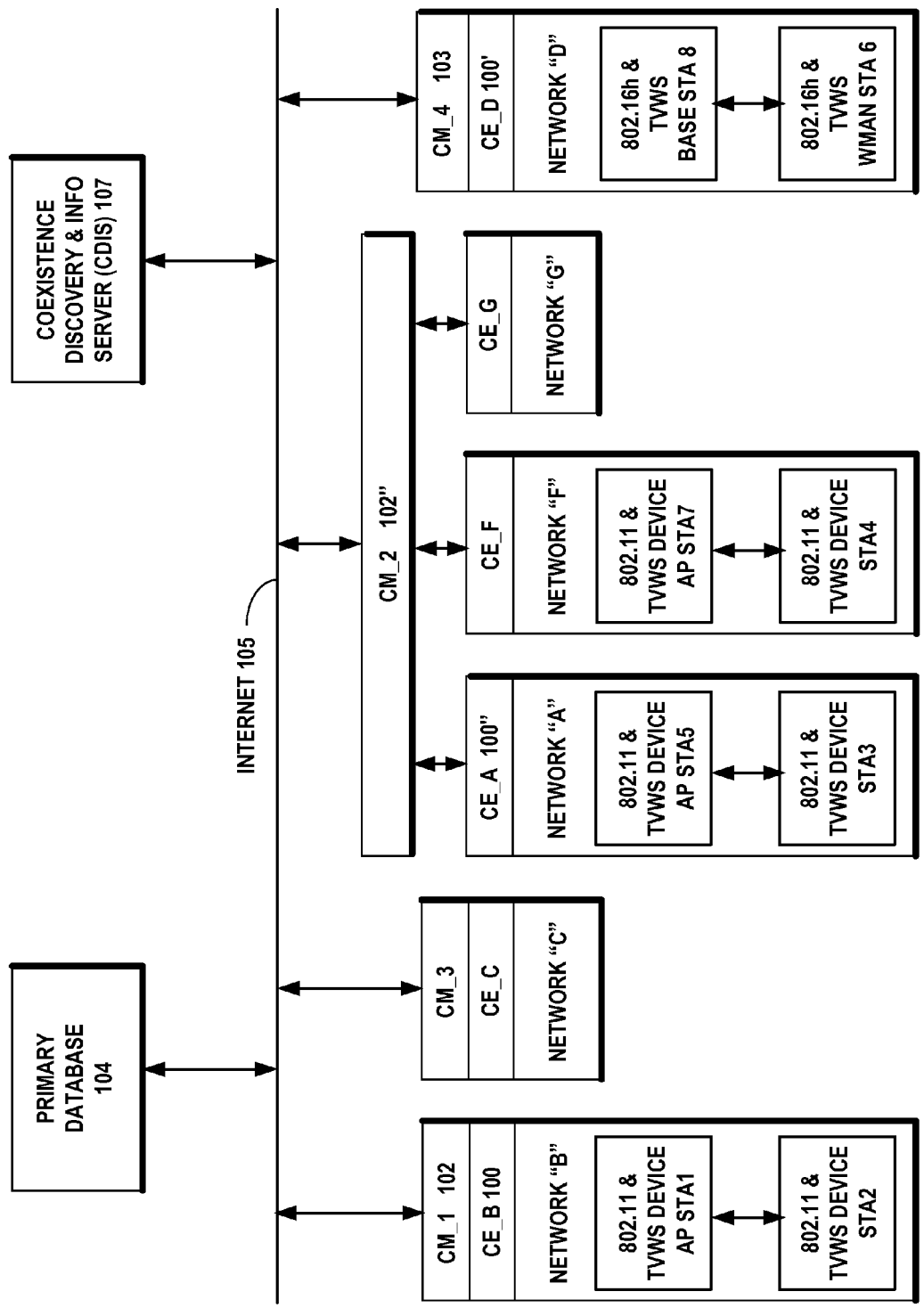
FIG. 4 is an example arrangement of the control node or coexistence enablers for networks A through G, the network controller or coexistence managers serving the coexistence enablers, the primary database, and the coexistence network element Coexistence Discovery & Info Server (CDIS), according to an embodiment of the present invention.

FIG. 4 is an example arrangement of the control node or coexistence enablers 100 for networks A through G, the network controller or coexistence managers 102 and 103 respectively serving the coexistence enablers 100 and 100', the primary database 104, and the coexistence network element Coexistence Discovery & Info Server (CDIS) 107, according to an embodiment of the present invention. For example, the coexistence manager CM_1 serves a single coexistence enabler CE_B for network "B" that includes STA1. The coexistence manager CM_3 serves a single coexistence enabler CE_C for network "C". The coexistence manager CM_4 serves a single coexistence enabler CE_D 100' for the 802.16 network "D" that includes base STA 8. Coexistence manager CM_2 102" serves three coexistence enablers CE_A, CE_F, and CE_G. Coexistence enabler CE_A 100" serves network "A" that includes STA5 and STA3. Coexistence enabler CE_F serves network "F" that includes STA4. All four coexistence managers CM_1, CM_2, CM_3, and CM_4 may access each other over the Internet 105, based on actual network overlapping of the networks they serve. All of the coexistence managers CM_1, CM_2, CM_3, and CM_4 have a connection to the primary database 104 and coexistence network element Coexistence Discovery & Info Server (CDIS) 107.

The coexistence manager 102 applies rules in making its determination of which of two networks based on different technologies, should be given priority in spectrum reallocation. For example, WLAN devices are typically designed for better resistance to saturation than WMAN devices, since WMAN devices must be more sensitive to attenuated signals received over a greater range than are WLAN devices. Thus, in an example embodiment of the invention, the coexistence manager 102 will generally favor the reallocation of an 802.11 network to the TVWS band, instead of reallocating the 802.16 network, when spectrum reallocation is requested, so as to remove the source of disturbance from the vicinity of 802.16 network.

The coexistence manager (CM) 102 decides, if no free channel or enough advertized resources were available, whether to grant the request by determining whether resource allocation requires an extensive reallocation or a light reallocation of a number of secondary channels or networks. In a light resource request process, for example, a change in the number of terminals within a single frequency channel may require changes only among the allocations between the users of that channel. In an extensive resource request process, for example, if a primary user reserves a channel, then all secondary users of that channel need to be reallocated to other channels, and a more complete resource reallocation may be initiated.

The coexistence manager 102 then sends to the coexistence enabler 100 in device STA1 the resource reallocation, including Operational parameters, Quiet period parameters, Spectrum sensing strategy, and Time base sync. The coexistence enabler 100 in device STA1 then controls the TV white space MAC to communicate in channels in the TV white spaces band reallocated by the coexistence manager 102, without interference from other networks sharing the same white space channels.

An example embodiment of the types of information exchanged between the coexistence manager 102, primary database 104, Coexistence Discovery & Info Server (CDIS) 107, and control node or coexistence enabler 100 may be as follows.

Between coexistence manager and Primary database:
→Location of coexistence enabler to Primary database
←Available channels for secondary usage to coexistence manager Between coexistence manager and Coexistence Discovery & Info Server (CDIS):
→Location of networks to CDIS
→Network parameters for neighbor discovery such as maximum transmit power, receiver sensitivity, interference tolerance and operating frequency capabilities,
←Potential neighbor coexistence managers to coexistence manager Processing in coexistence manager:
↔Spectrum maps
↔Operational parameters of its own (alternative 1), operational parameters of its own and real neighbors (alternative 2)
↔time base sync Between coexistence manager and coexistence enabler:
→Operational parameters to coexistence enabler
→Quiet period parameters to coexistence enabler
→Spectrum sensing strategy to coexistence enabler
→Time base sync to coexistence enabler
←Coexistence value (CV) to coexistence manager
←Spectrum sensing results to coexistence manager
←Network parameters to coexistence manager
←Resource Request to coexistence manager Procedures to find real neighbors, how to analyze fair resource allocation between the real neighbors, and what content is to be communicated between real neighbors is described in the copending U.S. patent application Ser. No. 12/689,663. filed Jan. 19, 2010, entitled "Apparatus Identification In Coexistence Networking", by Mika Kasslin, Jari June 11, Juha Salokannel, assigned to Nokia Corporation and incorporated herein by reference.

In an example embodiment of the invention, the objective in the resource request process is to keep the changes in spectrum allocations within as small a number of networks as possible, but still maintain fairness between the secondary networks. The operating principle to accomplish this is to first search for a free channel and/or advertised free resources, these two first steps may be implemented in opposite order or one of them may be skipped. And then divide spectrum reallocation into light and more extensive resource requests, corresponding to the stimulus that invokes the resource request process. This results in more stability, on an average, to changes in allocations and avoids a request causing an avalanche of new allocation requests to neighboring networks.

When a need for new resources is requested by the coexistence enabler, the coexistence manager of a secondary network may first check if there was a free channel or enough free advertized resources in neighborhood. If there are not enough resources seen, the coexistence manager may analyze the local network environment and then select a suitable resource request process. Example reasons for causing a resource request may include:

1. A primary has appeared in a channel currently available for secondary usage; a) occupied at the moment by a secondary network or b) free or backup/evacuation channel.
2. A new secondary network has entered the area
3. Interference level by some cause has raised to intolerable level
4. A new channel is found available for secondary usage
5. A secondary network in the area has closed its operation
6. A secondary network has need for more resources
7. A secondary network is releasing resources The first three example reasons for causing a resource request may initiate a more extensive resource request, since there is either a change in the number of available networks or the number of secondary networks is reduced. The appearance of a primary network may be found by spectrum sensing with the coexistence enabler and the coexistence enabler will then report that appearance to the coexistence manager. The appearance of a primary network may also be found when the primary database 104 communicates that information to the coexistence manager, causing the coexistence manager to command the coexistence enabler to shift the network.

The appearance of a new secondary network may be also found by spectrum sensing with the coexistence enabler and the coexistence enabler will then report that appearance to the coexistence manager. The appearance of a new secondary network may be also found directly from the network to the coexistence manager, with the help of the CDIS 107 to sort out whether these two networks are real neighbors.

The fourth and fifth reasons for a resource request, either a new channel is found available for secondary usage or a secondary network in the area has closed its operation, may be a cause for some networks to initiate more extensive resource allocation.

The sixth and seventh reasons for a resource request, either a secondary network has need for more resources or a secondary network is releasing resources, may result in a light resource allocation.

After a more extensive resource request has been made, each network has been allocated to a certain network allocation group and to each of these groups is allocated a certain quantity of channels based on the number of networks in each group and network parameters characterizing the group. In a light resource request, the resources are only reallocated among those networks that belong to the same network allocation group.

Figure 5A:
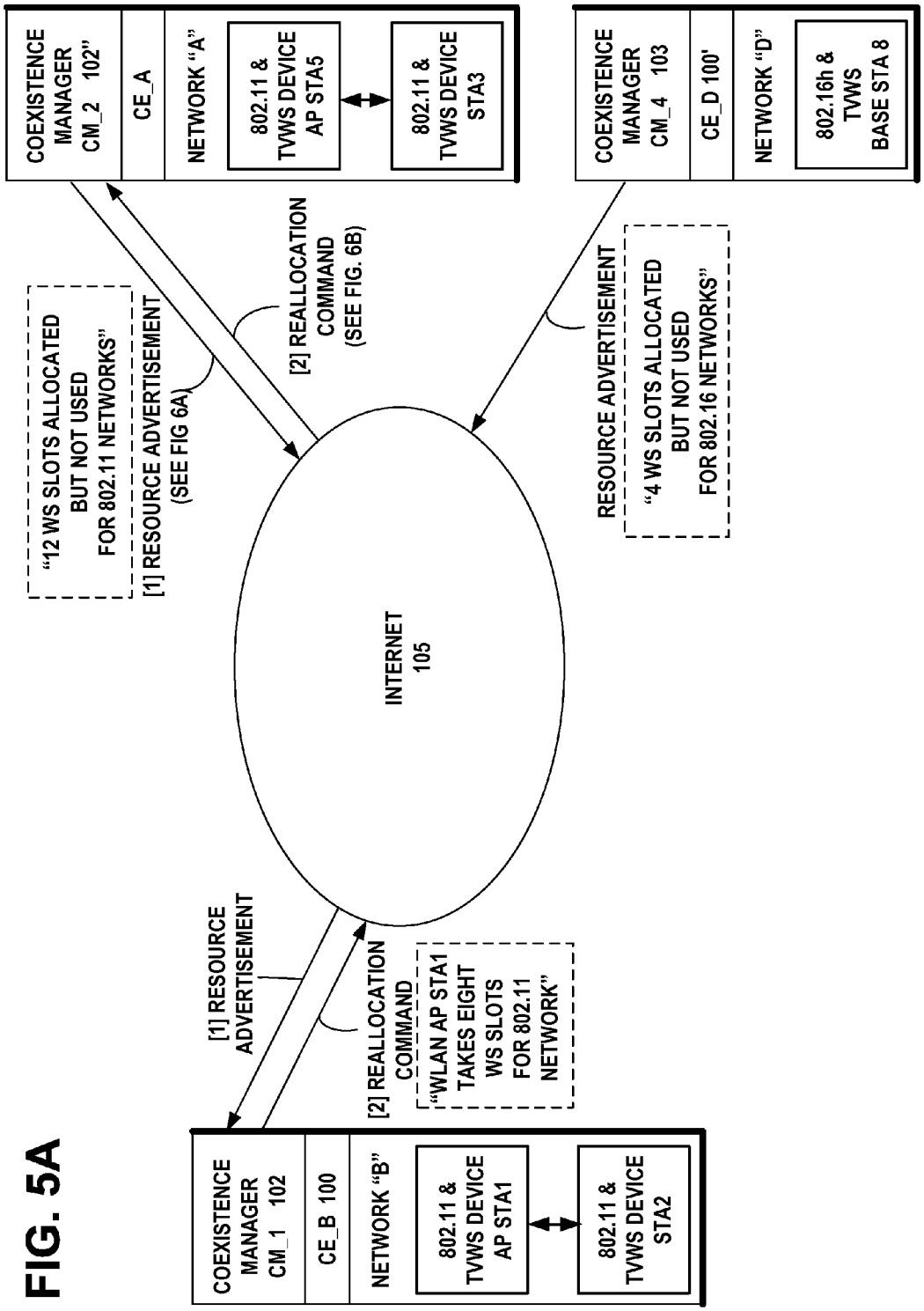
FIG. 5A is an example network diagram according to an embodiment of the present invention, illustrating an example of communicating by the network controller or coexistence manager 102, with one or more coexistence managers managing neighboring wireless networks, which advertise white space slots allocated but not used in a coexistence band.

FIG. 5A is an example network diagram according to an embodiment of the present invention, illustrating if there are no or an insufficient number of available free resources in the coexistence band, then checking by the network controller or coexistence manager for availability of allocated but unused resources in the coexistence band, as advertised by one or more coexistence managers managing neighboring wireless networks in the network allocation group. As an example, the coexistence manager CM_1 102, receives from one or more coexistence managers CM_2 and CM_4 103 managing neighboring wireless networks, advertisements of an availability of allocated but unused resources in a coexistence band. CM_2 transmits in step [1] a resource advertisement, "12 WS slots allocated but not used for 802.11 networks", as shown in the spectrum diagram of FIG. 6A. CM_1 replies in step [2] with a reallocation command "WLAN AP STA1 takes eight WS slots for 802.11 network", as shown in the spectrum diagram of FIG. 6B.

FIG. 5B is an example network diagram according to an embodiment of the present invention, illustrating if there are no or an insufficient number of available free resources or not enough advertised allocated but unused resources in the coexistence band for the network allocation group, then analyzing by the network controller or coexistence manager an allocation of used resources in the coexistence band for neighboring wireless networks in the network allocation group, for which the control node or coexistence enabler is eligible. As an example, in step [1] the coexistence manager CM_1 102 sends a query "Analyze Allocation Of WS Slots For WLAN 802.11 Neighbor Networks" to analyze allocations. In step [2] CM_2 then receives a resource status "Using 4 TVWS Slots For 802.11 STA3 in 802.11 Network 'A' " from coexistence manager CM_2, as shown in the spectrum diagram of FIG. 6C. In step [3] CM_1 then sends a reallocation command to CM_2 "WLAN AP STA1 Takes Two TVWS Slots For 802.11 Network", as shown in the spectrum diagram of FIG. 6D.

In an example embodiment of the invention, coexistence managers may advertise the resource status information of the networks they serve and keep the neighboring networks aware of the availability of both allocated but unused resources in the coexistence band and used resources in the coexistence band. In this manner, a coexistence manager serving networks requiring resources may review the previously distributed advertisements of both allocated but unused resources in the coexistence band and used resources in the coexistence band and then proceed immediately to a reallocation command.

FIG. 5C is an example network diagram according to an embodiment of the present invention, illustrating if there are insufficient available resources and insufficient reallocatable used resources in the coexistence band for neighboring networks in the network allocation group, for which the control node or coexistence enabler is eligible, then extending analysis by the network controller or coexistence manager to an allocation of used resources in the coexistence band for all neighboring wireless networks regardless of the network allocation group, i.e., both those networks within and outside of the same network allocation group, for which the coexistence enabler is eligible. As the result, reallocation commands may be issued to all the neighboring networks regardless of their network allocation group. As an example, in step [1] the coexistence manager CM_1 102 sends a query "Analyze Allocation Of WS Slots For All Neighbor Networks'" to analyze allocations. In step [2] CM_2 then receives a resource status "No WS Slots For 802.11 Network" from coexistence manager CM_2. Also, CM_2 then receives a resource status "Using 4 TVWS Slots For WMAN 802.16 Base STA in WMAN Network '13' "from coexistence manager CM_4, as shown in the spectrum diagram of FIG. 6E. In step [3] CM_1 then sends a reallocation command to CM_4 "WLAN AP STA1 Takes Two TVWS Slots From 802.16 WMAN Network 'W'", as shown in the spectrum diagram of FIG. 6F.

Figure 6A:
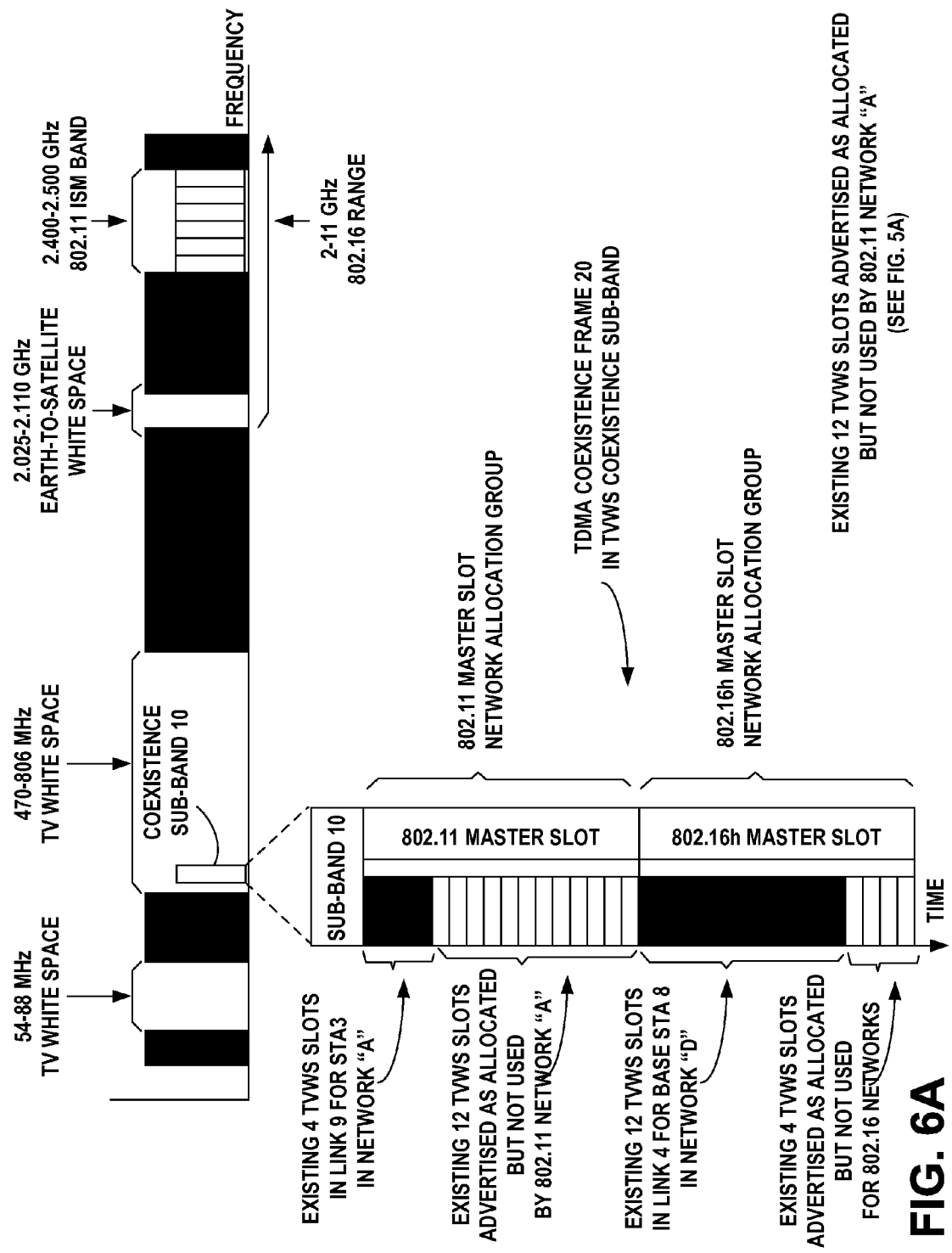
FIG. 6A is an example frequency band diagram illustrating a coexistence sub-band 10 in the TV band white space according to an embodiment of the present invention, illustrating an example of existing twelve TVWS slots advertised as allocated but not used by 802.11 network "A" (see FIG. 5A).

FIG. 6A is an example frequency band diagram illustrating a coexistence sub-band 10 in the TV band white space according to an embodiment of the present invention, illustrating an example of existing twelve TVWS slots advertised as allocated but not used by 802.11 network "A" (see FIG. 5A).

Also shown in FIG. 6A is the location of the TV white spaces and an example TDMA coexistence frame in the TV band white space, showing the occupancy of the time slots before the WLAN access point STA1 has any slots allocated to the TV band white space. The TV white spaces include 54-88 MHz band and 470-806 MHz band in the electromagnetic spectrum. Other locally unused white spaces may be present in certain geographic locations, such as frequency allocations from 2.025 GHz to 2.110 GHz for earth stations to transmit to communications satellites in areas remote from such earth stations. Also shown is the ISM band at 2.400-2500 GHz, in which the IEEE 802.11 signals are transmitted, for example in WLAN Network "B". For the wireless metropolitan area network (WMAN), the original version of the IEEE 802.16 standard specified a physical layer operating in the 10 to 66 GHz range. IEEE 802.16a, updated in 2004, added specifications for the 2 to 11 GHz range. For this example, example spectrum diagram shows the 2 to 11 GHz range, in which the IEEE 802.16 signals are transmitted, for example in WMAN Network "D".

There are a number of TVWS coexistence techniques possible for enabling two or more independently operated wireless networks or devices using different radio technologies adapted for TV white space frequency bands, to access the same TV white space frequency band in the same location without mutual interference. Some examples of coexistence techniques include dynamic frequency selection, transmit power control, listen-before-talk behavior, time division multiplexing different IEEE 802 technologies, message-based on-demand spectrum contention, and control through a centralized network controller or coexistence manager.

The example TVWS coexistence technique used here is to time division multiplexing different IEEE 802 technologies. The two IEEE 802 technologies chosen for this example are the IEEE 802.16h WMAN standard and the IEEE 802.11 WLAN standard. The IEEE 802.16h WMAN uses a fixed outdoor base station, such as the WMAN base station 8, serving indoor and outdoor portable clients, such as the WMAN STA 6. The IEEE 802.11 WLAN station, such as the WLAN access point STA1, may include Internet access and geo-location capability. The MAC 142 in the WLAN access point STA1 includes integrated TV white space features to communicate with the radio 128 in channels in the TV white spaces band reallocated by the coexistence manager 102, without mutual interference. The IEEE 802.16h WMAN STA 6, for example, may also include a MAC with integrated TV white space features to communicate using a radio in frequency sub-bands in the TV white spaces band reallocated by the coexistence manager 102, without mutual interference.

The spectrum diagram of FIG. 6A shows the TDMA coexistence frame 20 in TVWS coexistence sub-band. The 802.11 master slot network allocation group includes existing 4 TVWS slots in link 9 for STA3 in network "A" and existing 12 TVWS slots advertised as allocated but not used by 802.11 network "A". The 802.16h master slot network allocation group includes existing 12 TVWS slots in link 4 for base STA8 in network "D" and existing 4 TVWS slots advertised as allocated but not used for 802.16 networks.

Figure 6B:
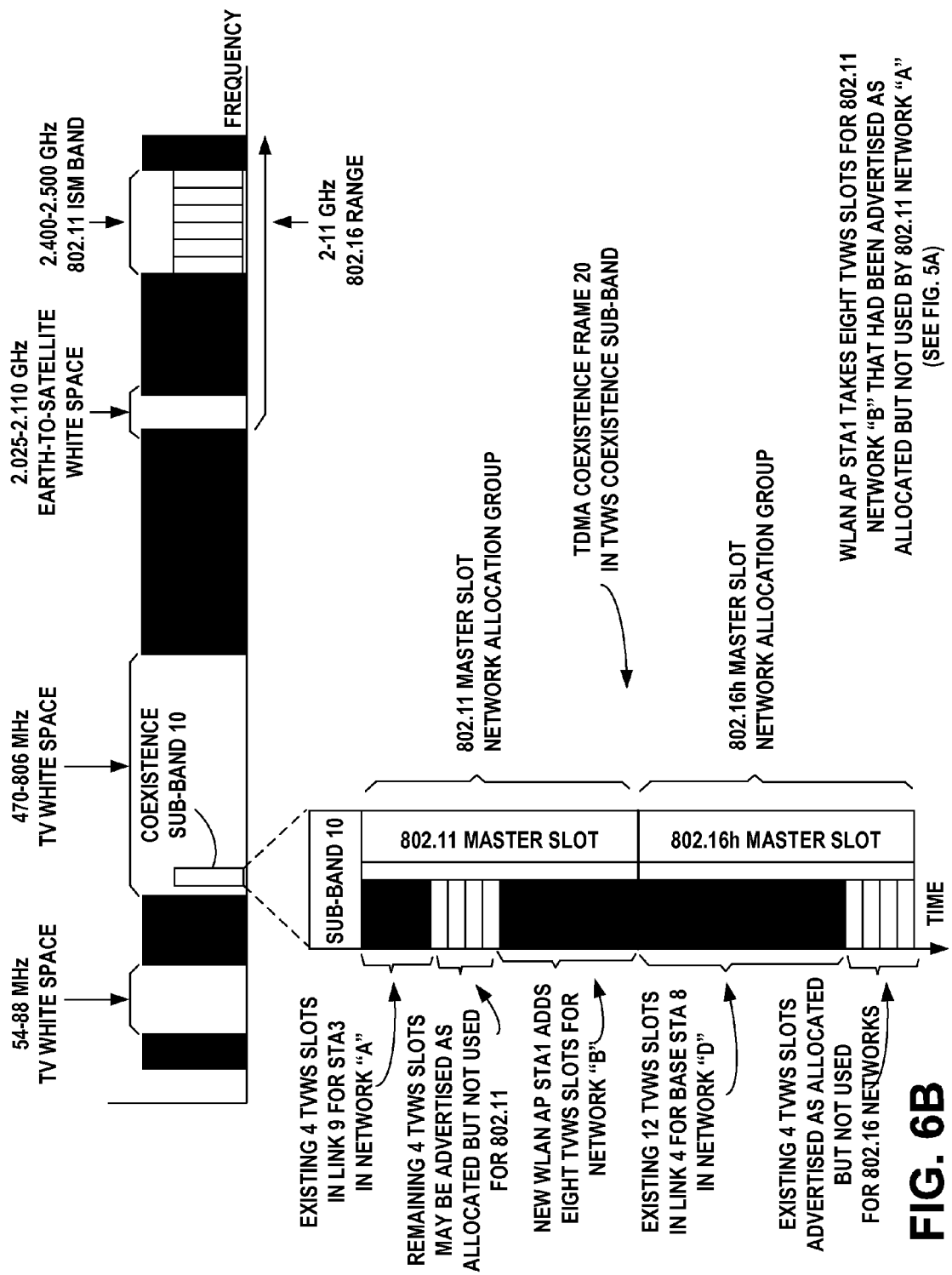
FIG. 6B is an example frequency band diagram illustrating a coexistence sub-band 10 in the TV band white space according to an embodiment of the present invention, illustrating an example of WLAN AP STA1 taking eight TVWS slots for 802.11 network "B" that had been advertised as allocated but not used by 802.11 network "A" (see FIG. 5A).

FIG. 6B is an example frequency band diagram illustrating a coexistence sub-band 10 in the TV band white space according to an embodiment of the present invention, illustrating WLAN AP STA1 takes eight TVWS slots for 802.11 network "B" that had been advertised as allocated but not used by 802.11 network "A" (See FIG. 5A).

A light reallocation typically is available in the following circumstances:
1. When a secondary network has need for more resources.
2. When a secondary network is releasing resources.

Figure 6C:
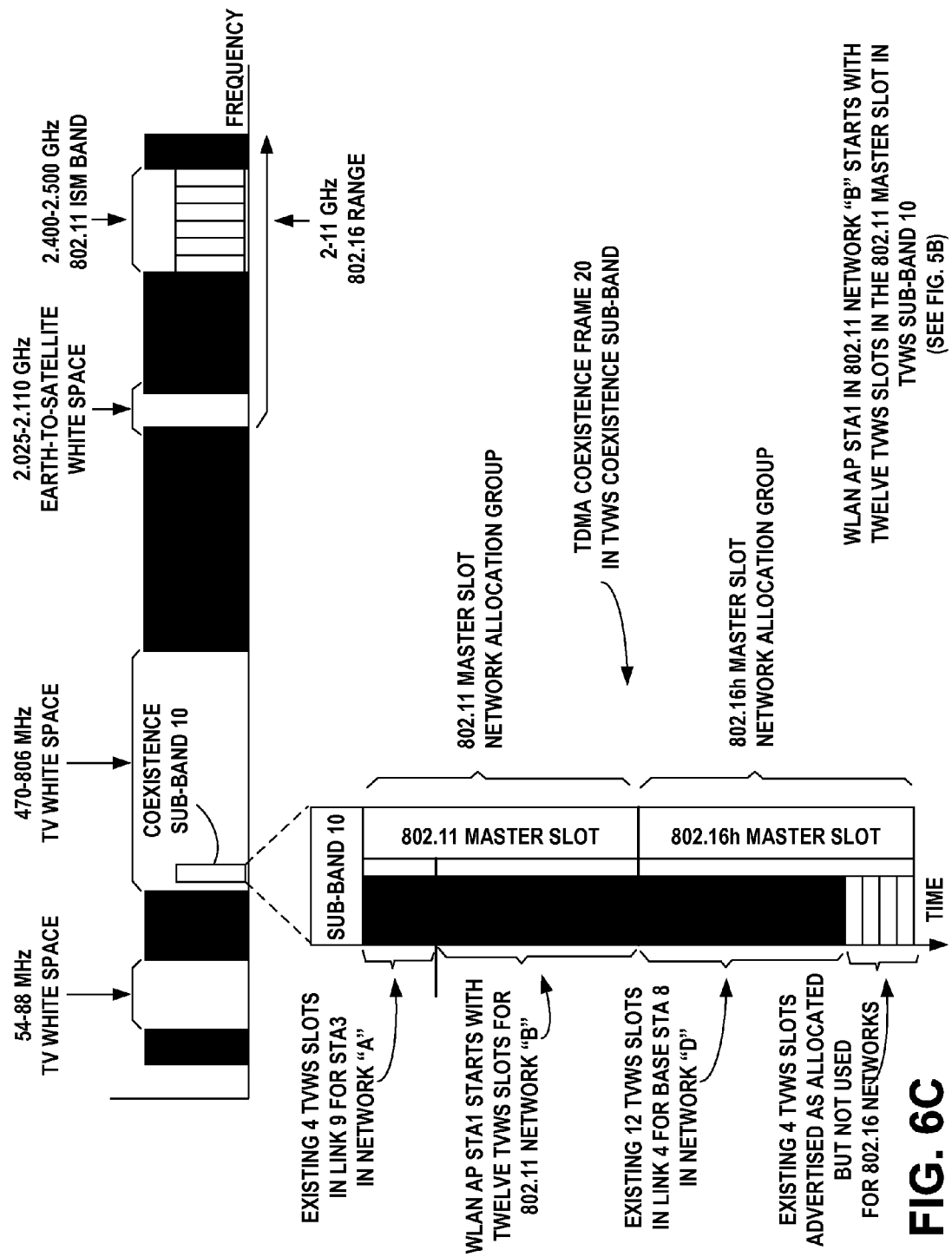
FIG. 6C is an example frequency band diagram illustrating a coexistence sub-band 10 in the TV band white space according to an embodiment of the present invention, illustrating an example of WLAN AP STA1 in 802.11 network "B", which starts with twelve TVWS slots in the 802.11 master slot in TVWS sub-band 10 (see FIG. 5B).

FIG. 6C is an example frequency band diagram illustrating a coexistence sub-band 10 in the TV band white space according to an embodiment of the present invention, illustrating WLAN AP STA1 in 802.11 network "B" starts with twelve TVWS slots in the 802.11 master slot in TVWS sub-band 10. (See FIG. 5B)

Figure 6D:
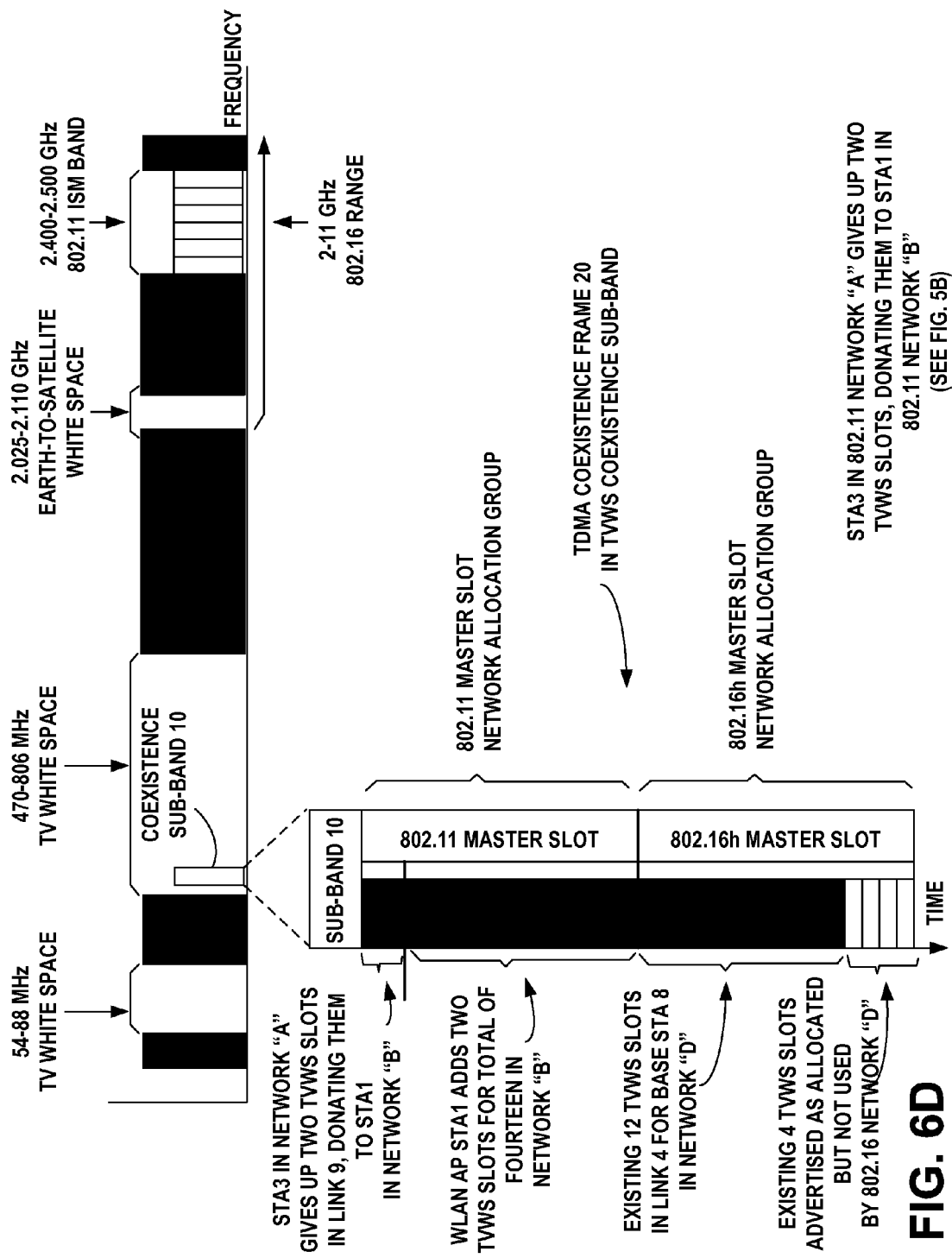
FIG. 6D is an example frequency band diagram illustrating a coexistence sub-band 10 in the TV band white space according to an embodiment of the present invention, illustrating an example of STA3 in 802.11 network "A" giving up two TVWS slots, donating them to STA1 in 802.11 network "B" (see FIG. 5B).

FIG. 6D is an example frequency band diagram illustrating a coexistence sub-band 10 in the TV band white space according to an embodiment of the present invention, illustrating STA3 in 802.11 network "A" gives up two TVWS slots, donating them to STA1 in 802.11 network "B". (See FIG. 5B)

Figure 6E:
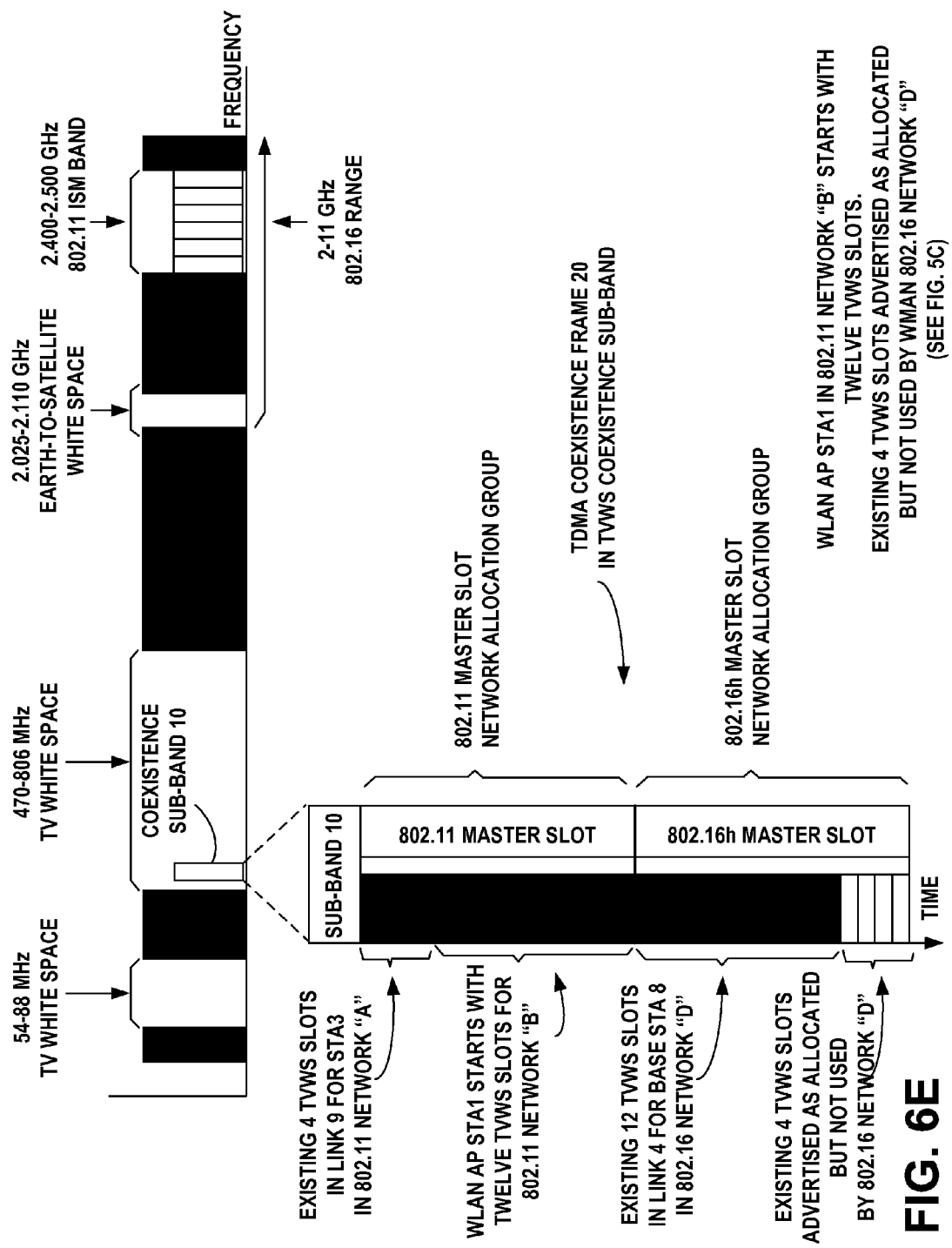
FIG. 6E is an example frequency band diagram illustrating a coexistence sub-band 10 in the TV band white space according to an embodiment of the present invention, illustrating an example of WLAN AP STA1 in 802.11 network "B" starting with twelve TVWS slots. There are also 4 TVWS slots advertised as allocated but not used by WMAN 802.16 network "D" (see FIG. 5C).

FIG. 6E is an example frequency band diagram illustrating a coexistence sub-band 10 in the TV band white space according to an embodiment of the present invention, illustrating WLAN AP STA1 in 802.11 network "B" starts with twelve TVWS slots existing 4 TVWS slots advertised as allocated but not used by WMAN 802.16 network "D" (See FIG. 5C)

Figure 6F:
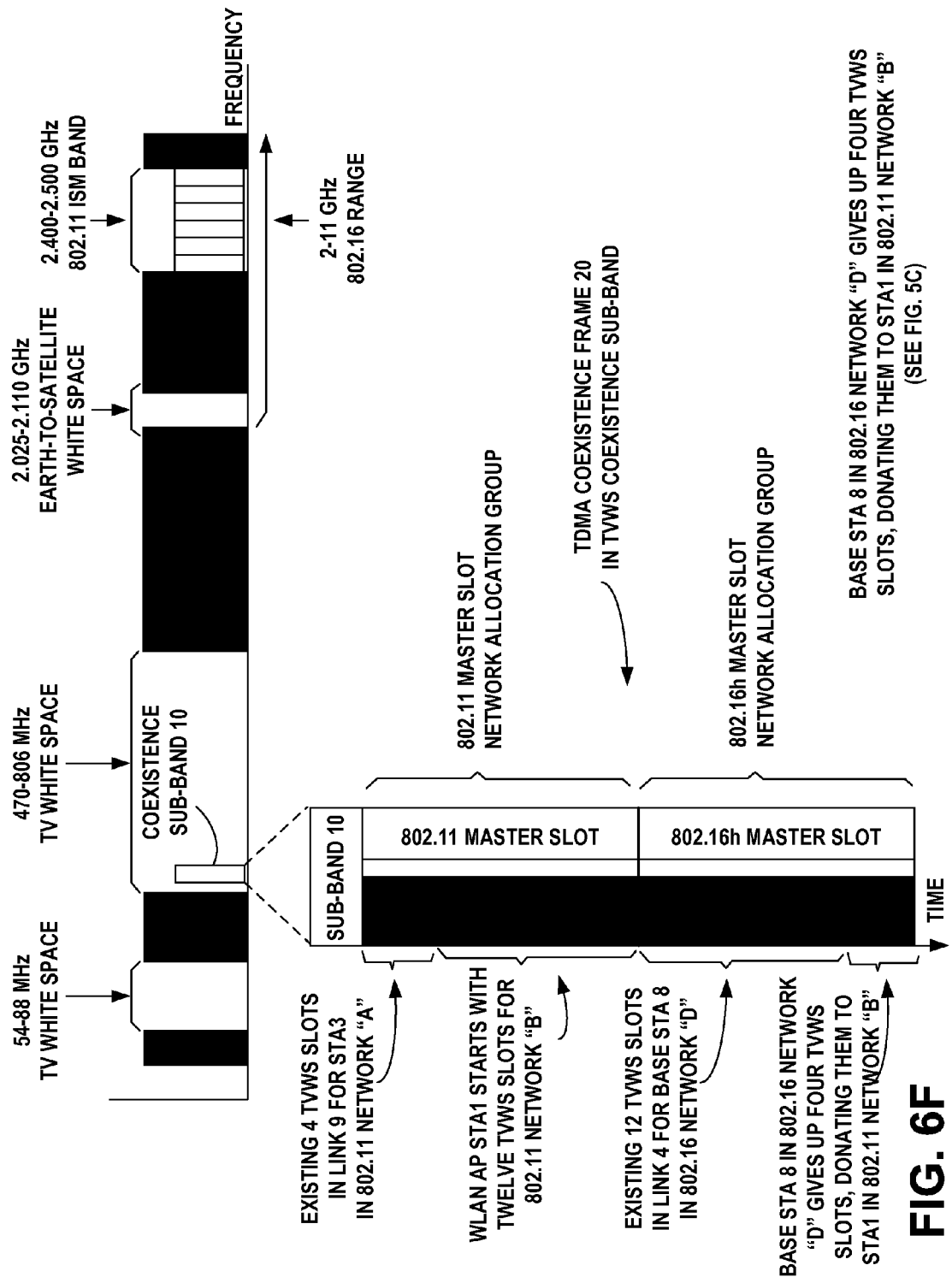
FIG. 6F is an example frequency band diagram illustrating a coexistence sub-band 10 in the TV band white space according to an embodiment of the present invention, illustrating an example of base STA8 in 802.16 network "D" giving up four TVWS slots, donating them to STA1 in 802.11 network "B" (see FIG. 5C).

FIG. 6F is an example frequency band diagram illustrating a coexistence sub-band 10 in the TV band white space according to an embodiment of the present invention, illustrating base STA 8 in 802.16 network "D" gives up four TVWS slots, donating them to STA1 in 802.11 network "B" (See FIG. 5C)

A more extensive reallocation is typically required in the following circumstances:

1. When a primary user (existing licensed uses, for example, licensed TV broadcaster, etc.) has appeared in a channel currently available for secondary usage, either occupied at the moment by a secondary network or the primary has evacuated a channel.

2. When a new secondary network has entered the area.

3. When interference level by some cause has raised to intolerable level.

4. When a new channel is found available for secondary usage.

5. When a secondary network in the area has closed its operation.

Figure 6G:
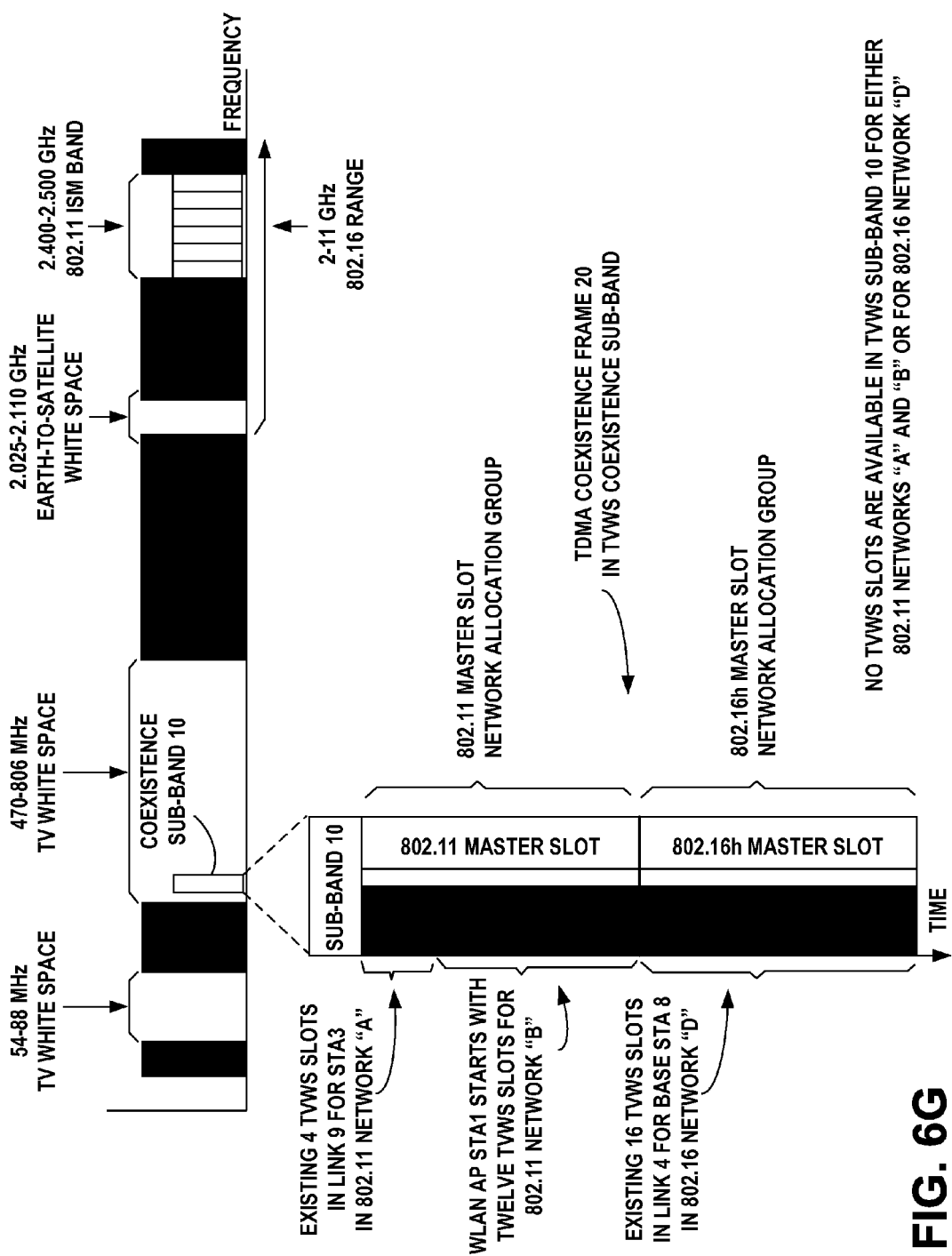
FIG. 6G is an example frequency band diagram illustrating a coexistence sub-band 10 in the TV band white space according to an embodiment of the present invention, illustrating an example of no TVWS slots being available in TVWS sub-band 10 for either 802.11 networks "A" and "B" or for 802.16 network "D".

FIG. 6G is an example frequency band diagram illustrating a coexistence sub-band 10 in the TV band white space according to an embodiment of the present invention, illustrating no TVWS slots are available in TVWS sub-band 10 for either 802.11 networks "A" AND "B" or for 802.16 network "D".

Figure 6H:
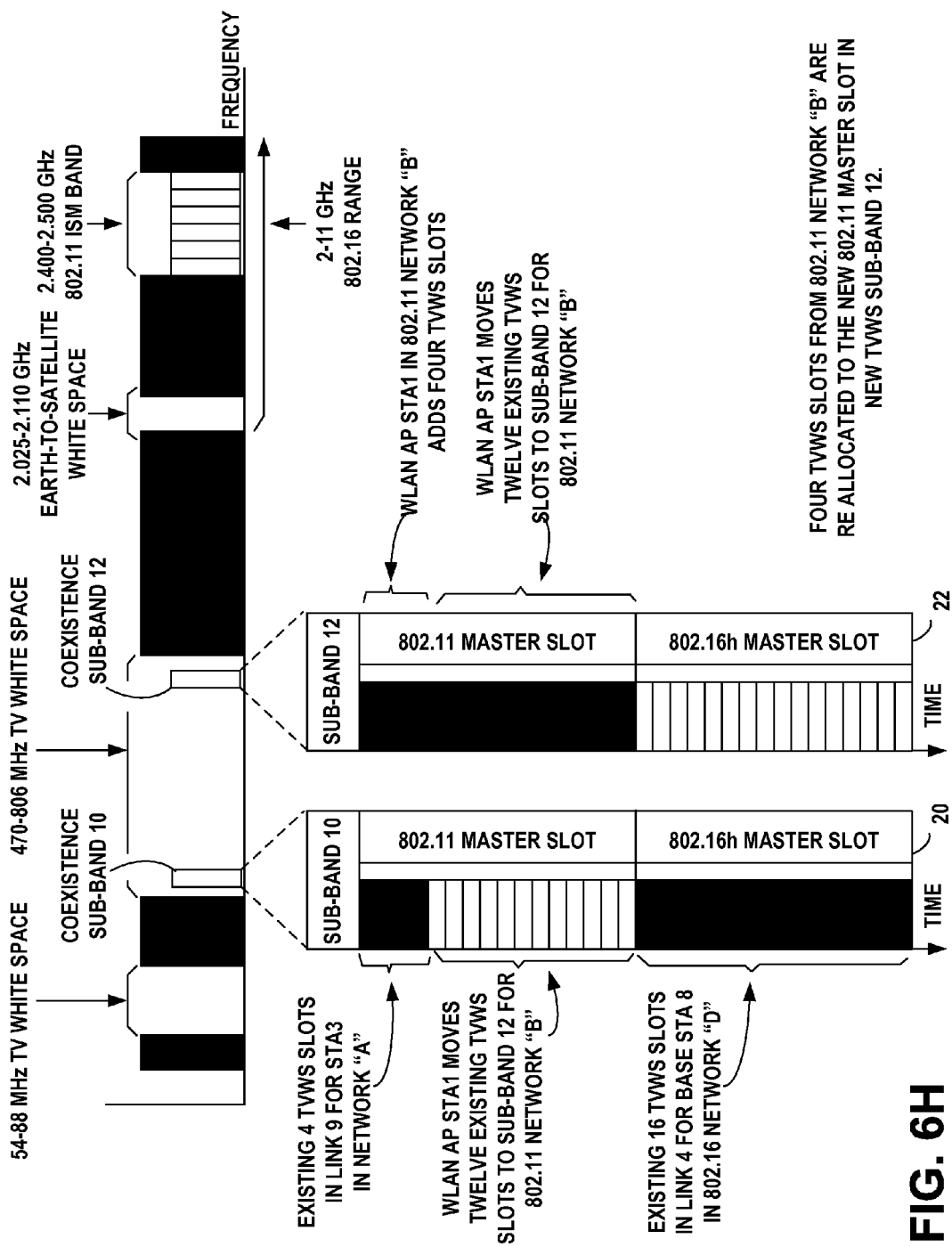
FIG. 6H is an example frequency band diagram illustrating two coexistence sub-bands 10 and 2 in the TV band white space according to an embodiment of the present invention, illustrating an example of four TVWS slots from 802.11 network "B" being re allocated to the new 802.11 master slot in new TVWS sub-band 12.

FIG. 6H is an example frequency band diagram illustrating two coexistence sub-bands 10 and 2 in the TV band white space according to an embodiment of the present invention, illustrating four TVWS slots from 802.11 network "B" are re allocated to the new 802.11 master slot in new TVWS sub-band 12.

Discovering Services Based on Geographical Location in a Shared Band Environment Method, apparatus, and computer program product embodiments are disclosed for wireless resource sharing between heterogeneous wireless networks to enable coexistence of secondary networks in a shared band environment, according to an embodiment of the present invention. Wireless networks and services associated with the wireless networks may be discovered and registered and entities providing the services may be hosted based on a geographical area. Different types of territories may be registered based on the host type, service type, etc. When wireless networks are considered each network has at least two types of territories: communication territory and interference territory. A communication territory associated with a geographic area, is a region within which communication may be conducted between devices belonging to the wireless network. A communication territory may be defined with contour parameters describing the territory's border or contour. An interference territory associated with a geographic area, is a region within which transmissions from any of the devices belonging to the wireless network are higher than or equal to a given signal level. An interference territory represents an area within which radio signals from any of the TVBDs belonging to the wireless network may be considered interference to any other TVBDs, but especially to any TVBDs outside the communication territory. This territory defines a geographical area within which devices that don't belong to the network consider the transmissions from the network as interference. An interference territory may also be defined with contour parameters describing the territory's border or contour. The contour specified for a communication territory or an interference territory may be stored in a server associated with the corresponding geographic area, the server being part of a hierarchical distributed database referred to as the territory domain system. The territory domain system enables locating and identifying the geographic area of specific hosting entities, related services and information required to access the hosting entities and their services. The communication territories and interference territories are unique geographical areas that are managed by a server associated with the corresponding geographic area, in the territory domain system. Registered territories may overlap with multiple adjacent zones and thus a territory and its associated information may be registered on multiple servers in the territory domain system.

Services provided to network controllers or coexistence managers (CMs) may include a discovery service with which a CM identifies devices (control nodes or coexistence enablers (CEs)) that interfere or are interfered by devices (CEs) that are registered to the CM. The service may be provided by a coexistence discovery and information server (CDIS). In embodiments of the invention, all interferer/interfered devices may be identified, including neighboring CM areas served by different CDISs, regardless of the CDIS to which they are registered.

Embodiments of the invention enable registering and discovering services and hosting entities providing the services based on a territory, such as a geographical area. Embodiments of the invention enable registration of hosting entities and related services based on a territory. Different types of territories may be registered. A territory is defined by means of a territory border or contour associated with different contour parameters. Contour parameters may depend on the territory type. Embodiments of the invention allow identifying territory specific hosting entities, related services and information required to access the hosting entities and its services. Registered territories may overlap with multiple zones and the system. Thus a territory and all the associated information may be registered to multiple servers.

In embodiments of the invention, the territory domain system (TDS) is organized in a territory domain space that consists of a tree of unique territories/geographical areas that are each managed by a server. These unique geographical areas may be called zones. Each node or leaf in the tree has zero or more resource records, which hold information associated with the zone. The tree sub-divides into sub-zones beginning at the root. The territory domain system (TDS) is a hierarchical system built on a distributed database. A distributed database may be a set of databases in a distributed system that may appear to applications as a single data source.

Example embodiments of the invention comprise a hierarchical and distributed TDS, enabling access of any entity to both register and inquire of territories and associated information. Embodiments of the invention ensure that a territory becomes registered to the correct entity or entities that manage zones that overlap with the registered territory. An inquiry is targeted to a specific territory on which the inquirer wants to find information associated with the territory. Embodiments of the invention ensure that the inquiry ends up being sent to the correct server or correct servers.

Figure 7A:
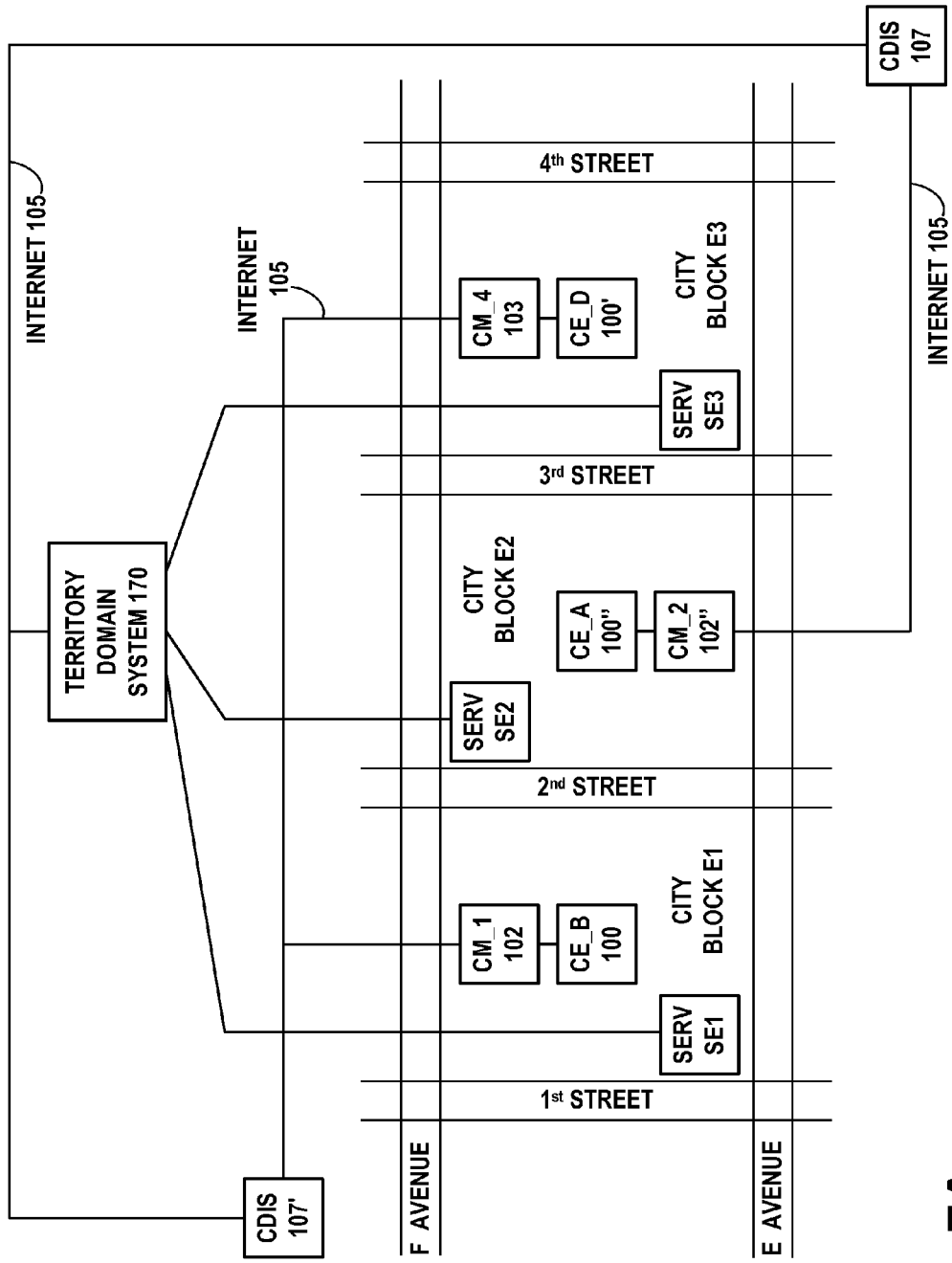
FIG. 7A is an example geographic map of three city blocks, each of which includes at least one coexistence enabler and its wireless network managed by a coexistence manager, and each city block further including a server that is part of a hierarchical, distributed database territory domain system, according to an embodiment of the present invention.

FIG. 7A is an example geographic map of three city blocks (zones) E1, E2, and E3, each of which includes at least one coexistence enabler and its wireless network managed by a coexistence manager. Each city block further includes a respective server SE1, SE2, and SE3 that is part of a hierarchical, distributed database territory domain system 170, according to an embodiment of the present invention. The city block E1 is bounded by 1st Street and 2nd Street and by E Avenue and F Avenue. The city block E2 is bounded by 2nd Street and 3rd Street and by E Avenue and F Avenue. The city block E3 is bounded by 3rd Street and 4th Street and by E Avenue and F Avenue.

The city block E1 includes wireless networks of the control node or coexistence enabler CE_B 100, which is managed by the coexistence manager CM_1 102. The network controller or coexistence manager CM_1 102 is associated with the CDIS 107' that assists the coexistence manager CM_1 102 in the neighbor discovery in a shared band environment. CDIS 107' keeps a record of registered CMs and the location of the networks they serve. CDIS 107' provides a list of candidate or potential neighbors for a CM that initiates the neighbor discovery for its network. CDIS 107' may also store other information relevant for coexistence in a shared band environment, for example, statistics of the spectrum use and the portion of networks that use either the information service or the management service. The coexistence enabler CE_B 100 and its wireless network in city block E1 may be registered to CDIS 107' through their respective CM_1 102 for coexistence management and information system services.

The city block E2 includes wireless networks of the control node or coexistence enabler CE_A 100", which is managed by the coexistence manager CM_2 102". The network controller or coexistence manager CM_2 102" is associated with a different CDIS 107 that assists coexistence manager CM_2 102" in the neighbor discovery in a shared band environment. CDIS 107 also keeps a record of registered CMs and the location of the networks they serve. CDIS 107 also provides a list of candidate or potential neighbors for a CM that initiates the neighbor discovery for its network. CDIS 107 may also store other information relevant for coexistence in a shared band environment, for example, statistics of the spectrum use and the portion of networks that use either the information service or the management service. The coexistence enabler CE_A 100" and its wireless network in city block E2 may be registered to CDIS 107 through their respective CM_2 102" for coexistence management and information system services.

The city block E3 includes wireless networks of the control node or coexistence enabler CE_D 100', which is managed by the coexistence manager CM_4 103. The network controller or coexistence manager CM_4 103 is associated with the CDIS 107' that assists coexistence manager CM_4 103 in the neighbor discovery in a shared band environment. CDIS 107' also keeps a record of registered CMs and the location of the networks they serve. CDIS 107' also provides a list of candidate or potential neighbors for a CM that initiates the neighbor discovery for its network. CDIS 107' may also store other information relevant for coexistence in a shared band environment, for example, statistics of the spectrum use and the portion of networks that use either the information service or the management service. The coexistence enabler CE_D 100' and its wireless network in city block E3 may be registered to CDIS 107' through their respective CM_4 103 for coexistence management and information system services.

Since, the wireless networks of coexistence enabler CE_A 100" in city block E2 and its coexistence manager CM_2 102" are associated with a different CDIS 107 than the CDIS 107' associated with the wireless networks of coexistence enabler CE_B 100 in city block E1 and its coexistence manager CM_2 102, communication and interference information exchanged between these wireless networks is made available by the hierarchical, distributed database territory domain system 170, according to an embodiment of the present invention.

The wireless networks in city block E1 may be registered to CDIS 107' through their respective CM_1 102 and provide information associated with a communication territory and one or more interference territories of the wireless network in the city block E1. CDIS 107' registers the communication territory and one or more interference territories of the wireless networks with which it is associated, to the territory domain system 170, for example by way of transmitting the information over the internet 105. The information may be made available throughout the hierarchical, distributed database, across multiple physical locations. The CDIS 107' determines the communication area of the TVBD network and at least the interference signal level tolerated by the TVBDs on the border of the communication area. The CDIS 107' registers with the territory domain system 170, this territory, its contour, the interference signal level as the contour parameter value and two service descriptors for the TVBD: a) descriptor of the CM serving the TVBD, b) descriptor of itself.

The CDIS 107' may determine one territory for each interference level within range of [min dBm, max dBm] with x dB steps. These interference territories may be needed to accommodate different interference tolerance levels of different TVBDs. Thus, the territory domain system 170 may have a number of interference territories per a TVBD network. The CDIS 107' registers these territories, their contours and at least the associated interference level to the system. Additionally, the same two service descriptors for the CM_1 102 and the CDIS 107' are registered with the interference territories, as well as with the communication territory.

When the different CDIS 107, associated with the wireless networks of coexistence enabler CE_A 100" in city block E2 and its coexistence manager CM_2 102", needs to find out those TVBDs that either (potentially) interfere with a TVBD or a TVBD network registered to CDIS 107 or are interfered by a TVBD or a TVBD network registered to it, the CDIS 107 performs a territory inquiry with the territory domain system 170. Potential interferers in a shared band environment, may be discovered by the CDIS 107 by issuing an inquiry to the territory domain system 170 in which it asks for interference territories that both overlap with the communication territory given in the inquiry and have the contour parameter value given in the inquiry. The territory domain system 170 returns those interference territories that match these two criteria. Alternatively an inquiry may have only a communication territory as the search criterion and the territory domain system 170 returns those interference territories that overlap with the given communication territory regardless of the contour parameter value. Potentially interfered TVBDs and TVBD networks in a shared band environment, may be discovered by the CDIS 107 by issuing an inquiry to the territory domain system 170, in which it asks for communication territories that overlap with interference territories of a geographical area given in the inquiry. The inquiry may contain the interference territory with the min dBm, i.e. the interference territory with the largest territory area. The territory domain system 170 returns those communication territories that overlap with the given interference territory. Alternatively an inquiry on interfered TVBDs and TVBD networks may contain both a geographical area and a contour parameter value. Then the territory domain system 170 returns those communication territories that both overlap with interference territories of the given interference area and have the contour parameter given in the inquiry.

When the CDIS 107 has performed those two inquires with the territory domain system 170, it has a list of potential interfering/interfered TVBDs and CMs and the CDISs serving them. CDIS 107 may need to first exchange some information with peer CDIS 107' about those TVBDs in the list. In order to do that, CDIS 107 may need to first obtain the CDIS 107' IP address from the internet domain name server (DNS). Then, CDIS 107 needs to obtain information, as an example, about interfering/interfered TVBD bandwidth (BW) and use, as an example, the following formula to identify the correct interference territory from the ones received from the territory domain system:

a) if BW_own is larger than or equal to the BW_other, use the own tolerated interference level to pick up the interference territory of the other, b) else use (own tolerated interference level—correction term) to pick up the interference territory of the other.

The correction term may be, for example, the ratio of BW_own and BW_other in decibels.

The interference territory that was thus selected indicates the TVBDs and TVBD networks that potentially interfere the TVBD registered to the CDIS and in question in this inquiry.

Once the CDIS 107 has performed these steps, it may provide a list of interfering/interfered TVBD neighbors and associated information to the inquiring CM_2 102", for example in the form of CM hostnames and wireless network identifiers or names.

Figure 7B:
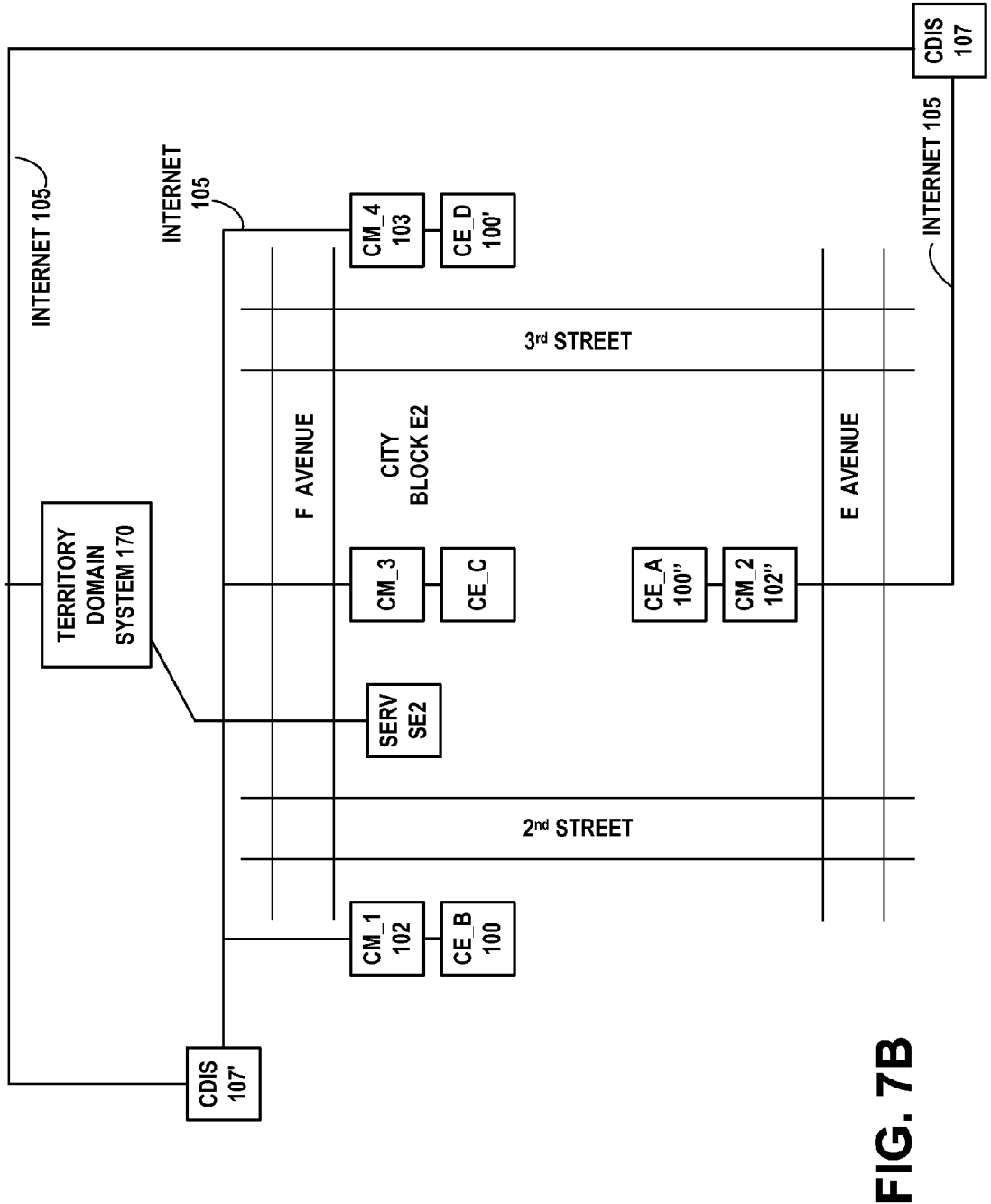
FIG. 7B is an example geographic map of the city block E2 of FIG. 7A, which is shown with at least two coexistence enablers and their respective wireless networks managed by two coexistence managers associated with two different coexistence discovery and information servers, and the TDS server that is part of the hierarchical, distributed database territory domain system, according to an embodiment of the present invention.

FIG. 7B is an example geographic map of the city block E2 of FIG. 7A, which is shown with at least two coexistence enablers CE_A 100" and CE_C and their respective wireless networks that are respectively managed by two coexistence managers CM_2 102" and CM_3 that are respectively associated with two different coexistence discovery and information servers CDIS 107 and CDIS 107'. The TDS server SE2 associated with city block E2, is part of the hierarchical, distributed database territory domain system, according to an embodiment of the present invention. Since, the wireless networks of coexistence enabler CE_A 100" in city block E2 and its coexistence manager CM_2 102" are associated with a different CDIS 107 than the CDIS 107' associated with the wireless networks of coexistence enabler CE_C in city block E2 and its coexistence manager CM_3, communication and interference information exchanged between these wireless networks is made available by the hierarchical, distributed database territory domain system 170, according to an embodiment of the present invention.

Figure 8:
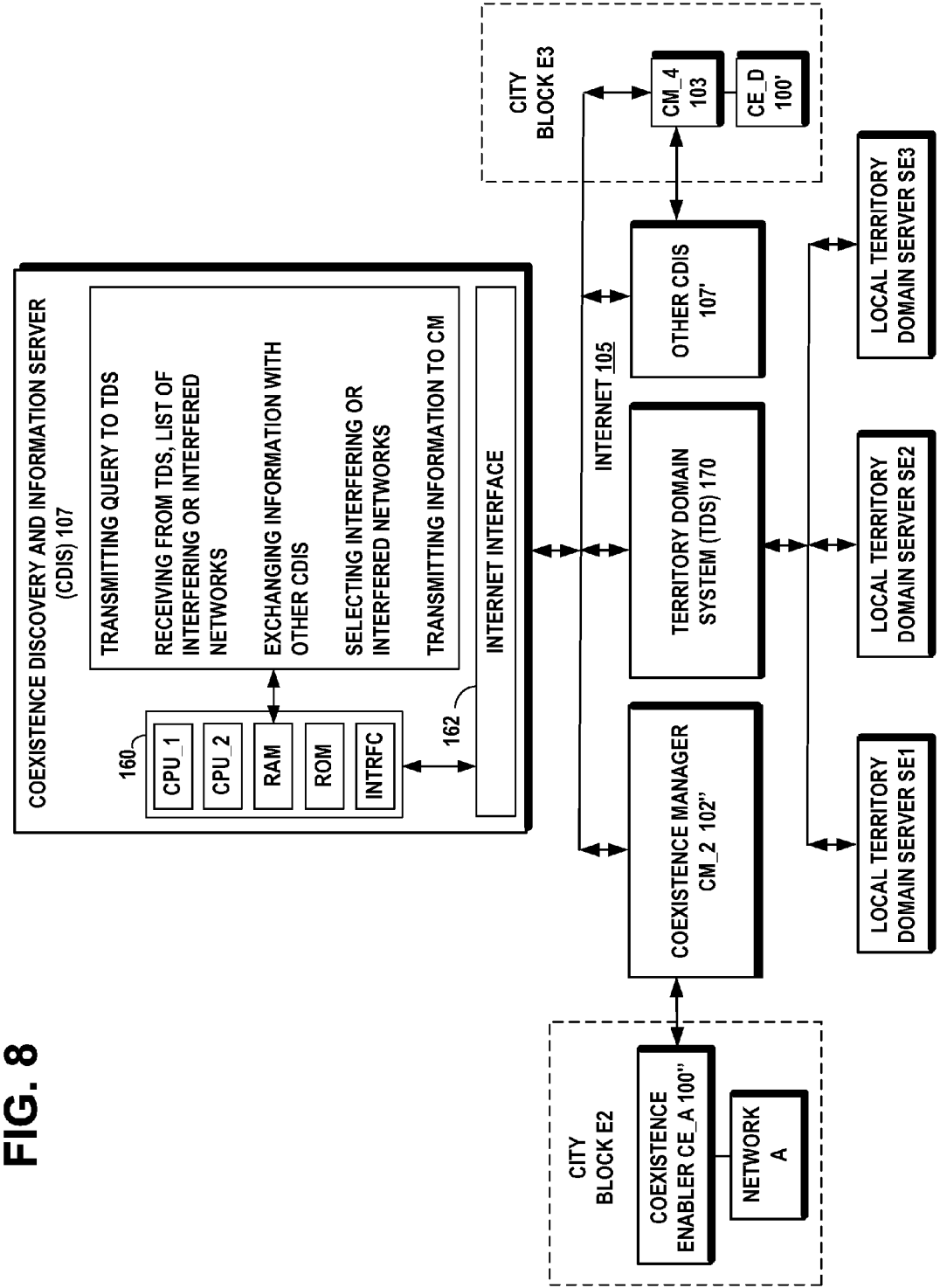
FIG. 8 is an example network diagram illustrating an example embodiment of the coexistence discovery and information server and the territory domain system identifying wireless networks neighboring a wireless network in a city block, which potentially interfere with or are potentially interfered by the wireless network, according to an embodiment of the present invention.

FIG. 8 is an example network diagram according to an example embodiment of the present invention, illustrating the coexistence discovery and information server and the territory domain system identifying wireless networks neighboring a wireless network in a geographic area of a city block, which potentially interfere with or are potentially interfered by the wireless network.

The coexistence discovery and information server (CDIS) 107 communicates over internet 105 with the coexistence manager 102", the territory domain system 170, and other CDISs 107'. The territory domain system 170 is a hierarchical, distributed database that includes a server SE1 associated with a local geographic area (zone) or city block E1, a server SE2 associated with the proximate geographic area (zone) or city block E2, and a server SE3 associated with another proximate geographic area (zone) or city block E3. The territory domain system 170 includes information associated with a territory identifier and a description of services associated with the local geographic area E1 and for the other geographic areas E2 and E3 proximate to the geographic area E1.

The coexistence discovery and information server (CDIS) 107 includes a processor 160 that includes a dual or multi-core central processing unit CPU_1 and CPU_2, a RAM memory, a ROM memory, and an interface for input/output devices. The internet interface 162 provides the interface to the coexistence manager 102", the territory domain system 170, and other CDISs 107'. The RAM and ROM may be removable memory devices such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of an example embodiment of the invention. The program logic may be delivered to the writeable RAM, PROMS, flash memory devices, etc. from a computer program product or article of manufacture in the form of non-transitory computer-usable media such as resident memory devices, smart cards or other removable memory devices. Alternately, they may be embodied as integrated circuit logic in the form of programmed logic arrays or custom designed application specific integrated circuits (ASIC).

In an example embodiment of the invention, the RAM and/or ROM store programmed instructions to cause performing of example steps, as shown in FIG. 11A, comprising:

Step 2002: receiving by the coexistence discovery and information server (CDIS) 107, information associated with a wireless network. The information may be received from the control node or coexistence enabler CE_A 100" or from the network controller or coexistence manager CM_2 102" regarding the master TVBD of the network "A", for example. The information may include the CE/TVBD identifier, the TVBD geo-location (or alternatively a geographical area), such as city block E2, and a list of service descriptors (service type, hostname/domain name) that relate to the TVBD. This step is performed for each CE/network registered to CMs that the CDIS serves.

Step 2003: determining by the coexistence discovery and information server (CDIS) 107, a communication territory and one or more interference territories of the master TVBD of the network "A", in city block E2, for example. This step is performed for each CE/network registered to CMs that the CDIS serves.

Figure 9:
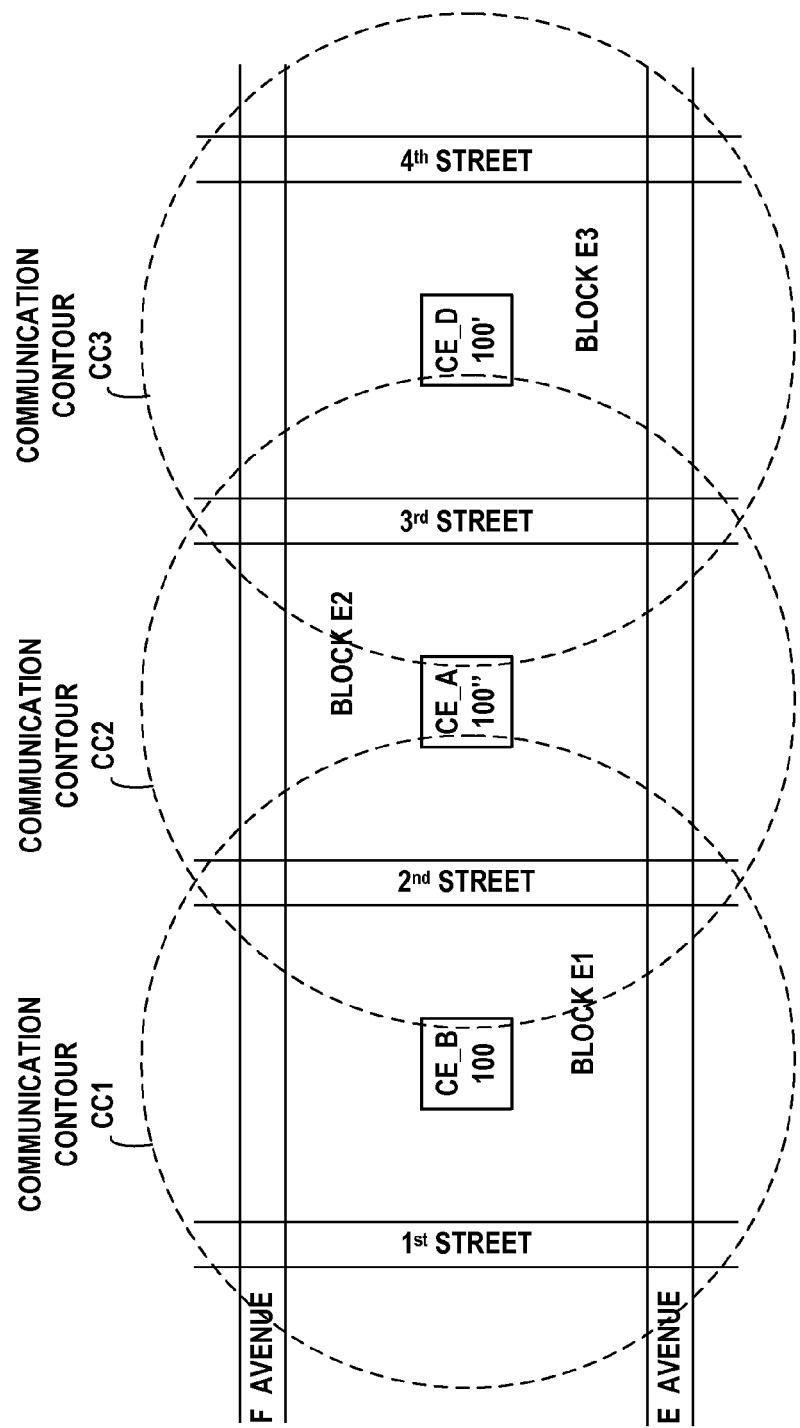
FIG. 9 is an example geographic map of the three city blocks of FIG. 7A, illustrating the communication contours of the communication territories surrounding the respective wireless networks in the respective geographical city blocks, according to an embodiment of the present invention.

The communication territory for the master TVBD of the network "A", for example, is determined to be a communication contour CC2 of FIG. 9, which is a circle centered on the TVBD and surrounding the TVBD. The circular communication contour CC2 has a contour parameter value at its circumference, representing a radio signal level that the TVBDs of the network "A" can tolerate as interference. The communication territory CC2 is a region within which communication may be conducted between the TVBD and other devices.

Figure 10B:
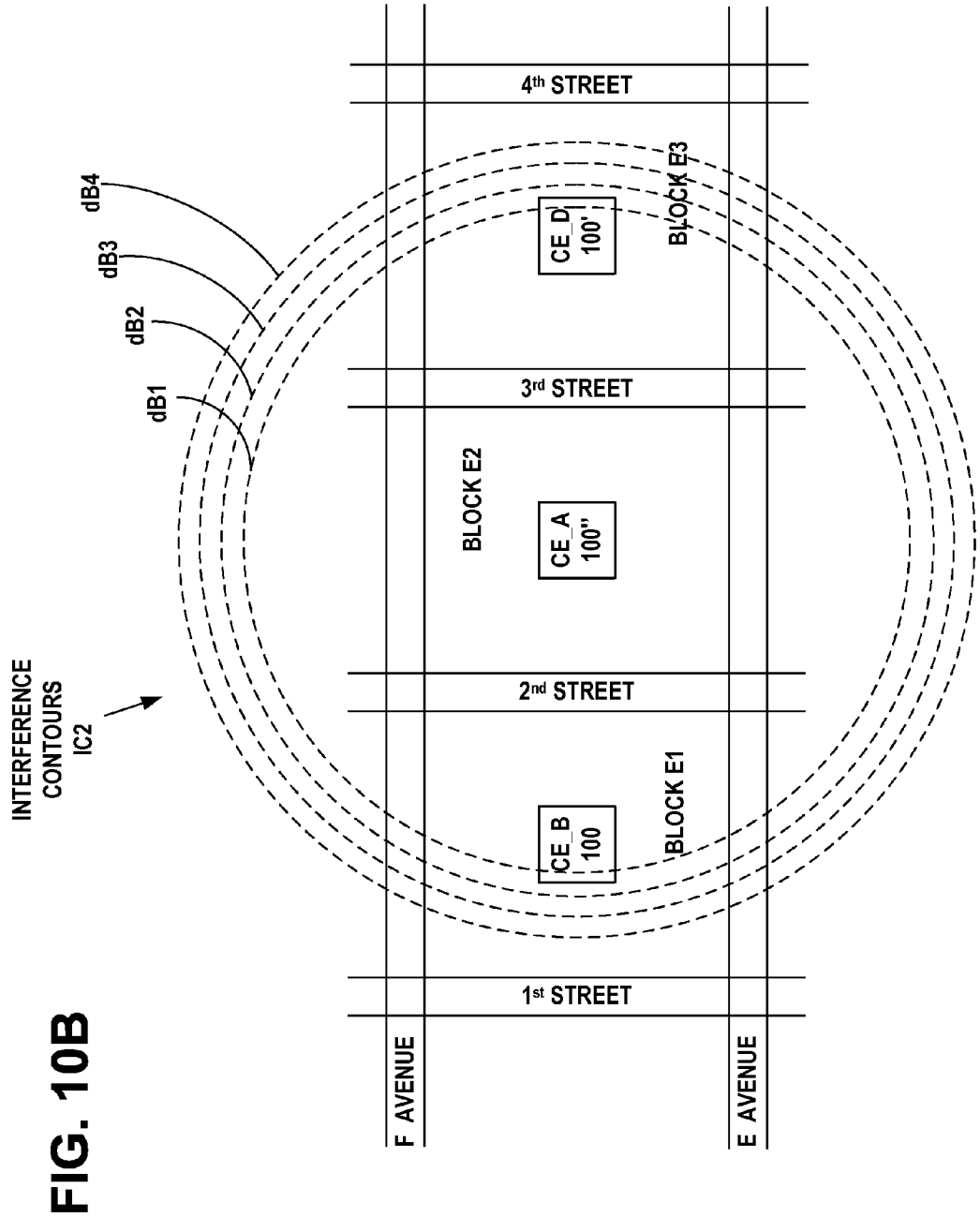
FIG. 10B is an example geographic map of the three city blocks of FIG. 7A, illustrating the interference contours of the communication territory surrounding the wireless network in the middle city block E2, according to an embodiment of the present invention.

The interference territories for the master TVBD of the network "A", for example, is determined to be a set of communication contours IC2 of FIG. 10B, which are concentric circles dB1, dB2, dB3, and dB4 centered on the TVBD and surrounding the TVBD. The circular interference territory dB1, for example, is a region within which transmissions from the TVBD or any of the devices of the wireless network are higher than or equal to the signal level dB1. An interference territory represents an area within which radio signals from any of the TVBDs within a communication area may be considered interference to any TVBDs, but especially to any TVBDs outside the communication area. The CDIS 107' may determine one territory for each interference level within range of [min dBm, max dBm] with x dB steps. These interference territories may be needed to accommodate different interference tolerance levels of different TVBDs. Thus, there may be a number of interference territories per TVBD network.

Step 2004: registering by the coexistence discovery and information server (CDIS) 107 to a territory domain system (TDS) 170, the communication territory and one or more interference territories of the master TVBD of the network "A", for example. The CDIS 107 registers these territories, their contours and at least the associated interference level to the TDS 170. The information may include the CE/TVBD identifier, the TVBD geo-location (or alternatively a geographical area), such as city block E2, and a list of service descriptors (service type, hostname/domain name) that relate to the TVBD. This step is performed for each CE/network registered to CMs that the CDIS serves.

Step 2006: transmitting by the coexistence discovery and information server 107, a query to the territory domain system 170, to identify wireless networks neighboring the wireless network "A" of coexistence enabler CE_A in the geographic area E2, in the same area E2 or in other geographic areas E1 and E3 proximate to the geographic area E2, which potentially interfere with or are potentially interfered by the wireless network "A".

Step 2008: receiving by the coexistence discovery and information server 107, from the territory domain system 170, a list of potential interfering or interfered wireless networks of coexistence enabler CE_B and of coexistence enabler CE_D neighboring the wireless network "A" of coexistence enabler CE_A and one or more other coexistence discovery and information servers 107' serving them, in response to the query.

Step 2010: exchanging by the coexistence discovery and information server 107, information with the one or more other coexistence discovery and information servers 107', the information associated with the potential interfering or interfered wireless networks of coexistence enabler CE_B and of coexistence enabler CE_D neighboring the wireless network "A" of coexistence enabler CE_A.

Step 2012: selecting by the coexistence discovery and information server 107, one or more of the potential interfering or interfered wireless networks of coexistence enabler CE_B and of coexistence enabler CE_D neighboring the wireless network "A" of coexistence enabler CE_A, based on the exchanged information.

Step 2014: transmitting by the coexistence discovery and information server 107, information associated with the one or more of the potential interfering or interfered wireless networks of coexistence enabler CE_B and of coexistence enabler CE_D neighboring the wireless network "A" of coexistence enabler CE_A, to the associated coexistence manager 102" of the wireless network "A" of coexistence enabler CE_A.

Territory Domain System in General

The territory domain system has structure and architecture wherein servers are interconnected and form a system that is hierarchical with geographical area zones as the basis. Servers are responsible for managing the zones. The system enables users to register territories and look for them.

1. Territory

In embodiments of the invention, there are different types of territories. As an example, in case of a coexistence system, two types of territories are needed: a) communication territory, b) interference territory. A communication territory represents an area within which a TVBD, for example a master TVBD, such as an access point or a base station, may serve and communicate with other TVBDs, for example a slave TVBDs, such as clients or mobile terminals. An interference territory represents an area within which radio signals from any of the TVBDs within a communication area may be considered interference to any TVBDs but especially to any TVBDs outside the communication area.

A territory is defined by a territory border, i.e. contour. A contour may be associated with a contour parameter and a parameter value or a parameter set with corresponding parameter values. In embodiments of the invention, when the system is used by a coexistence system, the contour parameter is a value representing a radio signal level, for example, in dBm on the contour. For a communication territory, a contour parameter may represent an interference level that may be tolerated by TVBDs that belong to that communication territory and operate at the minimum level at which communication can be conducted. Additionally, for a communication territory, there may be another contour parameter that represents an expected/provisioned service signal level from the master TVBD on the border of the territory.

In practice, territories may be defined using well known geometric forms such as an ellipse, a rectangle, or a circle, to enable reasonable processing in territory-related functions. Zones may be defined with any of these geometric forms, but a practical approach is to use rectangular zones.

Each territory is associated with a set of information that is stored in the TDS servers, based on registration. At least the following information may be made available for each territory:

1a. Territory Name/Identifier

As an example, in case of a coexistence system, the following information may be given for each territory:

Identifier of the TVBD managing the territory. In practice this is the master TVBD that provides the communication territory and enables a number of slave TVBDs to operate within the communication territory/area. The same master TVBD identifier may be also used with the interference territory as the identifier.

Alternatively, embodiments may use the control node or coexistence enabler (CE) identifier or name or the TVBD name as the identifier of the territory. An objective is to have an identifier or a name that the user of the system may use, for example, to later connect to the territory service provider.

1b. Description of services associated with the territory

Service descriptor may be of the following form: a) Service type, b) Hostname:

The service type parameter defines what kind and type of service is associated to the territory;

The hostname is the name of the host that provides the service. The hostname may be the same as used in the domain name system (DNS) with which one may determine the IP address of the host, so that the service may be accessed.

As an example, in case of a coexistence system, the following two service descriptors may be given for each territory:

i. Service descriptor one:

Service type: Coexistence management service (i.e. TVBD network is served by a CM);

Hostname: Hostname of the CM that serves the TVBD network, i.e. the master TVBD of the network.

ii. Service description two:

Service type: Coexistence discovery and information service (i.e. CDIS that serves the CM);

Hostname: Hostname of the CDIS.

2. Territory Registration

In embodiments of the invention, the territory domain system enables registration of territories, wherein a territory may overlap with many other territories and/or geographic areas (zones). The territory domain system may register a territory to all those servers that manage the respective geographic areas (zones) that the territory overlaps.

3. Search

In embodiments of the invention, the coexistence system performs different kinds of inquiries, based on geographical areas. In all the inquiries and searches, an inquirer determines a geographical area on which it wants to get information available in the system. A basic search is such that one looks for territories registered to the system that overlap with the area given in the search inquiry. The territories associated with the area in the inquiry may overlap with a number of zones that are managed by respective servers in the system and the system ensures that the inquiry goes to the servers that manage the zones to which the inquired area fits. When there is a hit between an inquiry and a registered territory, the system and its servers provide replies in which the registered territories and associated information are given.

In embodiments of the invention, an inquiry may contain further details to limit the search, in addition to the geographical area. Embodiments may limit an inquiry to some specific territory type. As an example, in case of a coexistence system, one is typically interested in looking for either communication territories or interference territories, separately. Additionally, embodiments of the invention may limit an inquiry with a contour parameter value. One may give in an inquiry, a contour parameter value that must match the contour parameter value of the registered territory in order for the system to provide the territory as a hit. Even then, however, only those territories are given that the geographical area overlaps in the inquiry. In embodiments, the overlap by territories of the geographical area, may be the basis in the query for the search and hit. In embodiments, a set of contour parameter values or a parameter value range may be given in an inquiry. The basic processing and the meaning of those parameters remains the same.

Use from a Coexistence System

In embodiments of the invention, a CDIS may register to the territory domain system a communication territory and one or more interference area territories for each TVBD registered to it. A CM that uses the CDIS and its services provides the TVBD registration information to the CDIS and the CDIS subsequently uses the territory domain system for discovery purposes.

The CDIS determines the communication area of the TVBD and, as an example, the interference signal level tolerated by the TVBDs on the border of the communication area. The CDIS registers this territory, its contour, and as an example, the interference signal level as the contour parameter value, and two service descriptors for the TVBD: a) descriptor of the CM serving the TVBD, b) descriptor of itself.

The CDIS determines, as an example, one territory for each interference level within a range of [min dBm, max dBm] with x dB steps. These interference territories may be needed to accommodate different interference tolerance levels of different TVBDs. Thus, the territory domain system may have a number of interference territories for a TVBD network. The CDIS registers these territories, their contours and at least the associated interference level, to the TDS system. Additionally, the same two service descriptors for the CM and the CDIS may be registered with the interference territories, as with the communication territory.

When the CDIS needs to find out those TVBDs that either (potentially) interfere with a TVBD or a TVBD network registered to it, or are interfered by a TVBD or a TVBD network registered to it, the CDIS performs a territory inquiry with the territory domain system. The CDIS finds potential interferers by issuing an inquiry to the TDS system in which it asks for interference territories that both overlap with the given communication territory and have the contour parameter value given in the inquiry. The system returns those interference territories that match these two criteria. The CDIS finds potentially interfered TVBDs and TVBD networks by issuing an inquiry to the TDS system in which it asks for communication territories that overlap with a given interference territory. The inquiry contains the interference territory with the min dBm, i.e. the interference territory with the largest territory area.

When the CDIS has performed those two inquires with the territory domain system, the TDS system responds with a list of potential interfering/interfered TVBDs and CMs and the CDISs serving them. The CDIS may need to exchange some information with peer CDISs about the listed TVBDs. In order to do that, the CDIS may need to first obtain the peer CDISs' IP addresses from the DNS. Then the CDIS may obtain more detailed information about interfering/interfered TVBD bandwidth (BW) and use the following formula to identify the correct interference territory from the ones received in the list from the territory domain system:

a) if BW_own is larger than or equal to the BW_other, use the own tolerated interference level to identify the interference territory of the other;

b) else use (own tolerated interference level—correction term) to identify the interference territory of the other.

The correction term may be the ratio of BW_own and BW_other in decibels.

The interference territory that was thus selected indicates the TVBDs and TVBD networks that potentially interfere with the TVBD registered to the CDIS and in question in this inquiry.

Once the CDIS has performed these steps it may provide the list of interfering/interfered TVBD neighbors and associated information to the CM, especially in the form of CM hostnames FIG. 9 is an example geographic map of the three city blocks of FIG. 7A, illustrating the communication contours CC1, CC2, and CC3 of the communication territories surrounding the respective wireless networks for coexistence enablers CE_B 100, CE_A 100", and CE_D 100' in the respective geographical city blocks E1, E2, and E3, according to an embodiment of the present invention. A communication territory associated with a geographic area, is a region within which communication may be conducted between devices of the wireless network. A communication territory may be defined with contour parameters describing the territory's border or contour. For a communication territory, a contour parameter may represent an interference level that may be tolerated by TVBDs that belong to that communication territory and operate at the minimum level at which communication can be conducted.

FIG. 10A is an example geographic map of the three city blocks of FIG. 7A, illustrating the interference contours dB1, dB2, dB3, and dB4 of the interference territory surrounding the wireless network for coexistence enabler CE_B 100 in the left-most city block E1, according to an embodiment of the present invention. An interference territory associated with a geographic area, is a region within which transmissions from any of the devices of the wireless network are higher than or equal to a given signal level. An interference territory represents an area within which radio signals from any of the TVBDs within a communication area may be considered interference to any TVBDs, but especially to any TVBDs outside the communication area. This territory defines a geographical area within which devices that don't belong to the network consider the transmissions from the network as interference and thus the name interference territory. An interference territory may be defined with contour parameters describing the territory's border or contour. The circular interference territory dB1, for example, is a region within which transmissions from the TVBD or any of the devices of the wireless network are higher than or equal to the signal level dB1. The CDIS may determine one territory for each interference level within range of [min dBm, max dBm] with x dB steps.

FIG. 10B is an example geographic map of the three city blocks of FIG. 7A, illustrating the interference contours dB1, dB2, dB3, and dB4 of the interference territory surrounding the wireless network for coexistence enabler CE_A 100" in the middle city block E2, according to an embodiment of the present invention.

FIG. 10C is an example geographic map of the three city blocks of FIG. 7A, illustrating the interference contours dB1, dB2, dB3, and dB4 of the interference territory surrounding the wireless network for coexistence enabler CE_D 100' in the right-most city block E3, according to an embodiment of the present invention.

FIG. 11A is an example flow diagram of operational steps in the coexistence discovery and information server (CDIS) 107 for discovering and registering services and hosting entities providing the services based on a territory, such as a geographical area for heterogeneous wireless networks to enable coexistence in a TV band white space, according to an embodiment of the present invention. The steps of the flow diagram 2000 of FIG. 11A may represent computer code instructions stored in the RAM and/or ROM memory of the CDIS 107, which when executed by the central processing units (CPU), carry out the functions of an example embodiment of the invention. The steps may be carried out in another order than shown and individual steps may be combined or separated into component steps.

Step 2002: receiving by a coexistence discovery and information server (CDIS), information associated with a wireless network;

Step 2003: determining a communication territory and one or more interference territories of the wireless network in a geographic area;

Step 2004: registering by the CDIS to a territory domain system, the communication territory and one or more interference territories of the wireless network;

Step 2006: transmitting by the CDIS, a query to the territory domain system, to identify wireless networks neighboring the wireless network, which potentially interfere with or are potentially interfered by the wireless network;

Step 2008: receiving by the CDIS, a list of potential interfering or interfered wireless networks neighboring the wireless network and one or more other CDIS serving them, in response to the query;

Step 2010: exchanging by the CDIS, information with the one or more other CDIS, associated with bandwidths of the potential interfering or interfered wireless networks neighboring the wireless network;

Step 2012: selecting by the CDIS, one or more of the potential interfering or interfered wireless networks neighboring the wireless network based on the information associated with the bandwidths; and Step 2014: transmitting by the CDIS, information associated with the one or more of the potential interfering or interfered wireless networks neighboring the wireless network, to an associated network controller of the wireless network.

FIG. 11B is an example flow diagram of operational steps in the coexistence discovery and information server (CDIS) 107 for discovering and registering services and hosting entities providing the services based on a territory, such as a geographical area for heterogeneous wireless networks to enable coexistence in a TV band white space, according to an embodiment of the present invention. The steps of the flow diagram 2030 of FIG. 11B may represent computer code instructions stored in the RAM and/or ROM memory of the CDIS 107, which when executed by the central processing units (CPU), carry out the functions of an example embodiment of the invention. The steps may be carried out in another order than shown and individual steps may be combined or separated into component steps.

Step 2032: receiving, at an apparatus or entity, information associated with a wireless network;

Step 2034: determining, by the apparatus or entity, a geographic communication area and one or more geographic interference areas associated with the wireless network based on the received information;

Step 2036: transmitting, by the apparatus or entity, a message to a destination to register the wireless network and the determined geographic communication area and one or more geographic interference areas associated with the wireless network; and Step 2038: receiving, by the apparatus or entity, confirmation of the registering of the wireless network at the destination and information associated with zero or more wireless networks that at least one of potentially interfere with the determined geographic communication area associated with the wireless network, or potentially experience interference caused by the determined one or more interference areas associated with the wireless network.

FIG. 11C is an example flow diagram of operational steps in the coexistence discovery and information server (CDIS) 107 for discovering services based on a territory, such as a geographical area for heterogeneous wireless networks to enable coexistence in a TV band white space, according to an embodiment of the present invention. The steps of the flow diagram 2050 of FIG. 11C may represent computer code instructions stored in the RAM and/or ROM memory of the CDIS 107, which when executed by the central processing units (CPU), carry out the functions of an example embodiment of the invention. The steps may be carried out in another order than shown and individual steps may be combined or separated into component steps.

Step 2052: transmitting, by an apparatus or entity, a query to a destination to request information associated with wireless networks that at least one of potentially interfere with a geographic communication area associated with a wireless network served by the apparatus or entity, or potentially experience interference caused by one or more interference areas associated with the wireless network served by the apparatus or entity; and Step 2054: receiving, by the apparatus or entity, information associated with zero or more wireless networks that at least one of potentially interfere with the geographic communication area associated with the wireless network served by the apparatus or entity, or potentially experience interference caused by the one or more interference areas associated with the wireless network served by the apparatus or entity.

FIG. 12 is an example network diagram illustrating an example embodiment of a network entity, such as a server 2100 that includes the function of a coexistence manager 102" of FIG. 1D and also includes the function of a coexistence discovery and information server 107 of FIG. 8. The server 2100 of FIG. 12 performs the functions of a coexistence manager as described for FIG. 1D and also performs the functions of a CDIS as described for FIG. 8. The server 2100 of FIG. 12 interacts with the territory domain system 170 in identifying wireless networks neighboring a wireless network in a city block, which potentially interfere with or are potentially interfered by the wireless network, according to an embodiment of the present invention.

Figure 13:
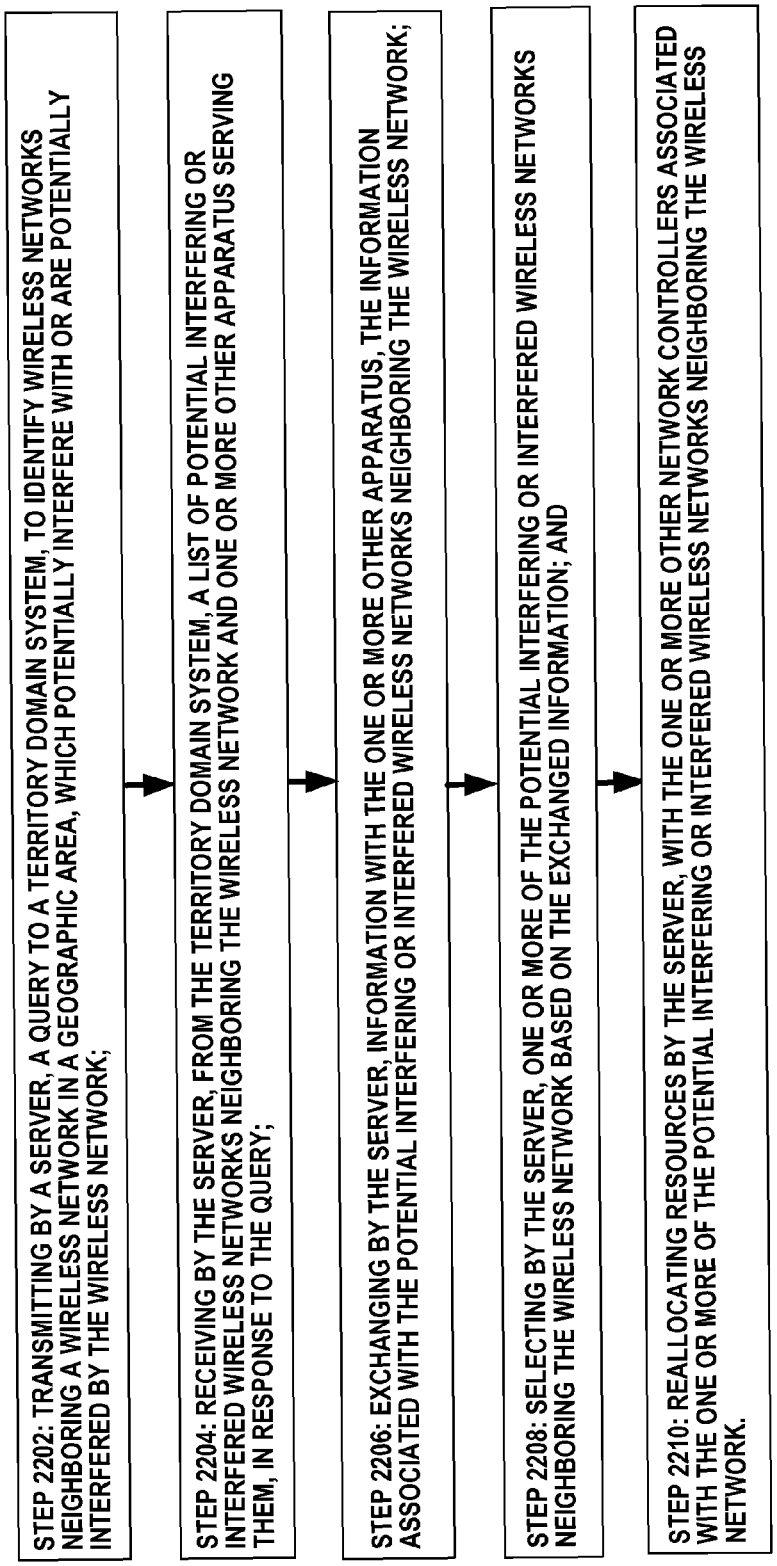
FIG. 13 is an example flow diagram of operational steps in the network controller or coexistence manager of FIG. 12, for discovering and registering services and hosting entities providing the services based on a territory, such as a geographical area for heterogeneous wireless networks to enable coexistence in a TV band white space, according to an embodiment of the present invention.

FIG. 13 is an example flow diagram of operational steps in the server 2100 of FIG. 12, for discovering and registering services and hosting entities providing the services based on a territory, such as a geographical area for heterogeneous wireless networks to enable coexistence in a TV band white space, according to an embodiment of the present invention. The steps of the flow diagram 2200 of FIG. 13 may represent computer code instructions stored in the RAM and/or ROM memory of the server 2100 of FIG. 12, which when executed by the central processing units (CPU), carry out the functions of an example embodiment of the invention. The steps may be carried out in another order than shown and individual steps may be combined or separated into component steps.

Step 2202: transmitting by a server, a query to a territory domain system, to identify wireless networks neighboring a wireless network in a geographic area, which potentially interfere with or are potentially interfered by the wireless network;

Step 2204: receiving by the server, from the territory domain system, a list of potential interfering or interfered wireless networks neighboring the wireless network and one or more other apparatus serving them, in response to the query;

Step 2206: exchanging by the server, information with the one or more other apparatus, the information associated with the potential interfering or interfered wireless networks neighboring the wireless network;

Step 2208: selecting by the server, one or more of the potential interfering or interfered wireless networks neighboring the wireless network based on the exchanged information; and Step 2210: reallocating resources by the server, with the one or more other network controllers associated with the one or more of the potential interfering or interfered wireless networks neighboring the wireless network.

Figure 14:
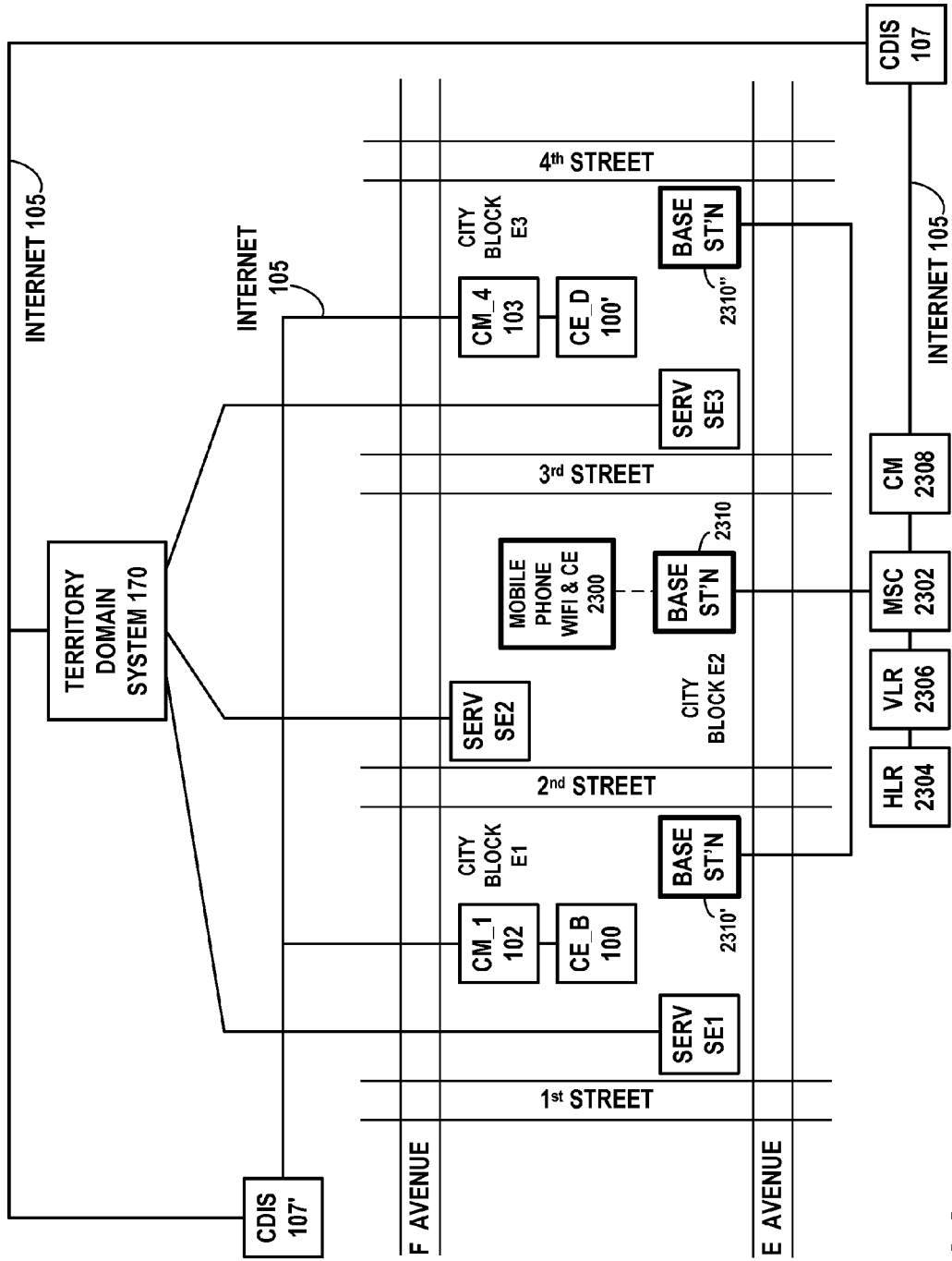
FIG. 14 is an example geographic map of the three city blocks of FIG. 7A, wherein an example mobile phone and Wi-Fi device that includes a control node or coexistence enabler, the mobile device having the capability to function as a TV white space wireless device, the mobile phone circuits in the device communicating via a cellular base station to a mobile switching center that, in turn, communicates with the network controller or coexistence manager and the coexistence discovery and information server, to interact with the territory domain system in identifying wireless networks neighboring the mobile device in a city block, which potentially interfere with or are potentially interfered by the mobile device, according to an embodiment of the present invention.

FIG. 14 is an example geographic map of the three city blocks of FIG. 7A, wherein an example mobile phone and Wi-Fi device 2300, includes a control node or coexistence enabler (CE). The mobile device 2300 has the capability to function as a TV white space wireless device. When the mobile device 2300 is in the city block E2, the mobile phone circuits in the mobile device 2300 wirelessly communicate via a cellular base station 2310 to a mobile switching center (MSC) 2302, a visitor location register (VLR) 2306 and a home location register (HLR) 2304. The VLR 2306 buffers the current location of the mobile device 2300 near the base station 2310. If the mobile device 2300 moves to city block E1 where a second base station 2310' is located, the mobile phone circuits in the mobile device 2300 wirelessly communicate via the second cellular base station 2310' to the mobile switching center (MSC) 2302, the visitor location register (VLR) 2306, and the home location register (HLR) 2304. If the mobile device 2300 moves to city block E3 where a third base station 2310" is located, the mobile phone circuits in the mobile device 2300 wirelessly communicate via the third cellular base station 2310" to the mobile switching center (MSC) 2302, the visitor location register (VLR) 2306, and the home location register (HLR) 2304. The HLR 2304 also tracks the location of the mobile device 2300 as it moves to more remote regions served by different VLRs connected to the MSC 2302, and provides the updated location to the different VLRs. The MSC 2302, in turn, communicates with the network controller or coexistence manager (CM) 2308 and the coexistence discovery and information server (CDIS) 107, as previously described, to interact with the territory domain system (TDS) 170. The CDIS 107 and the TDS 170 identify wireless networks neighboring the mobile device 2300 that are near its current location near the base station 2310, which potentially interfere with or are potentially interfered by the mobile device 2300, according to an embodiment of the present invention.

Figure 15:
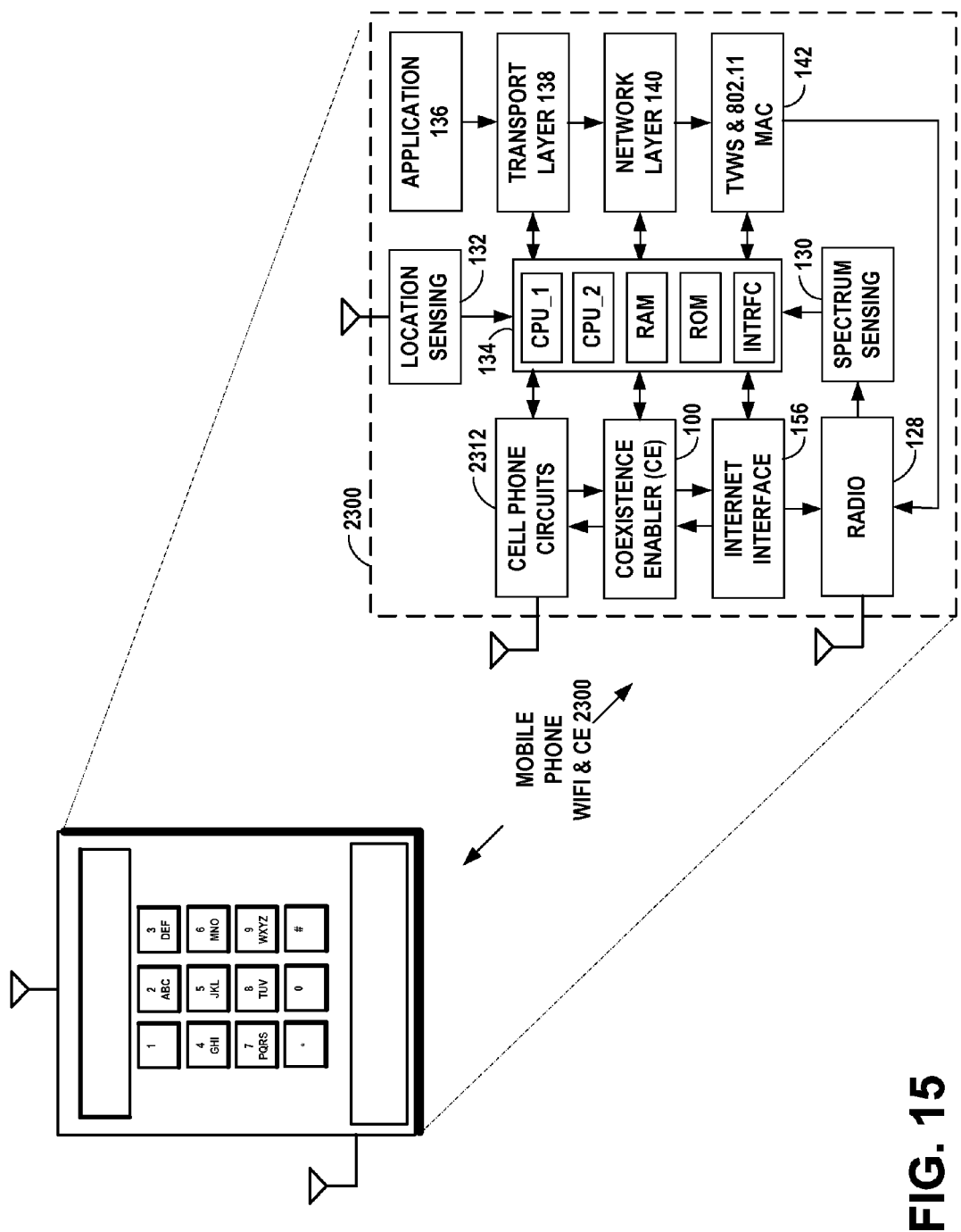
FIG. 15 is an example functional block diagram according to an alternate embodiment of the present invention, illustrating an example mobile phone and Wi-Fi device that includes a control node or coexistence enabler, the mobile device having the capability to function as a TV white space wireless device, the mobile phone circuits in the device communicating via a cellular base station to a mobile switching center that, in turn, communicates with the network controller or coexistence manager and the coexistence discovery and information server, to interact with the territory domain system in identifying wireless networks neighboring the mobile device in a city block, which potentially interfere with or are potentially interfered by the mobile device, according to an embodiment of the present invention.

FIG. 15 is an example functional block diagram according to an alternate embodiment of the present invention, illustrating the example mobile phone and Wi-Fi device 2300 that includes a control node or coexistence enabler (CE) 100, the mobile device 2300 having the capability to function as a TV white space wireless device. The mobile phone circuits 2312 in the mobile device 2300 wirelessly communicate via a cellular base station 2310 to a mobile switching center (MSC) 2302, a visitor location register (VLR) 2306 and a home location register (HLR) 2304. The MSC 2302, in turn, communicates with the network controller or coexistence manager (CM) 2308 and the coexistence discovery and information server (CDIS) 107, as previously described, to interact with the territory domain system (TDS) 170. The CDIS 107 and the TDS 170 identify wireless networks neighboring the mobile device 2300 that are near its current location near the base station 2310, which potentially interfere with or are potentially interfered by the mobile device 2300, according to an embodiment of the present invention.

The example mobile phone and Wi-Fi device 2300 includes a protocol stack, including the radio 128 and the IEEE 802.11 MAC 142, which may be based, for example, on the IEEE 802.11 WLAN standard. The MAC 142 includes integrated TV white space features. The protocol stack may also include a network layer 140, a transport layer 138, and an application program 136. The example mobile phone and Wi-Fi device 2300 includes a processor 134 that includes a dual or multi-core central processing unit CPU_1 and CPU_2, a RAM memory, a ROM memory, and an interface for a keypad, display, and other input/output devices. A location sensor 134, such as a GPS is included to establish the geographic location of the mobile phone and Wi-Fi device 2300, and the location of the mobile phone and Wi-Fi device 2300 is reported to the network controller or coexistence manager 2308. The coexistence enabler 100 sends resource requests to the coexistence manager 2308. The MAC 142 includes integrated TV white space features to communicate using the radio 128 in channels in the TV white spaces band reallocated by the coexistence manager 2308, without mutual interference. The spectrum sensor 130 senses the electromagnetic environment of the mobile phone and Wi-Fi device 2300 and reports it to the coexistence manager 2308. The network controller or coexistence manager (CM) 2308 and the coexistence discovery and information server (CDIS) 107 interact with the territory domain system (TDS) 170, as previously described. The CDIS 107 and the TDS 170 identify wireless networks neighboring the mobile device 2300 that are near its current location near the base station 2310, which potentially interfere with or are potentially interfered by the mobile device 2300, according to an embodiment of the present invention.

Figure 16:
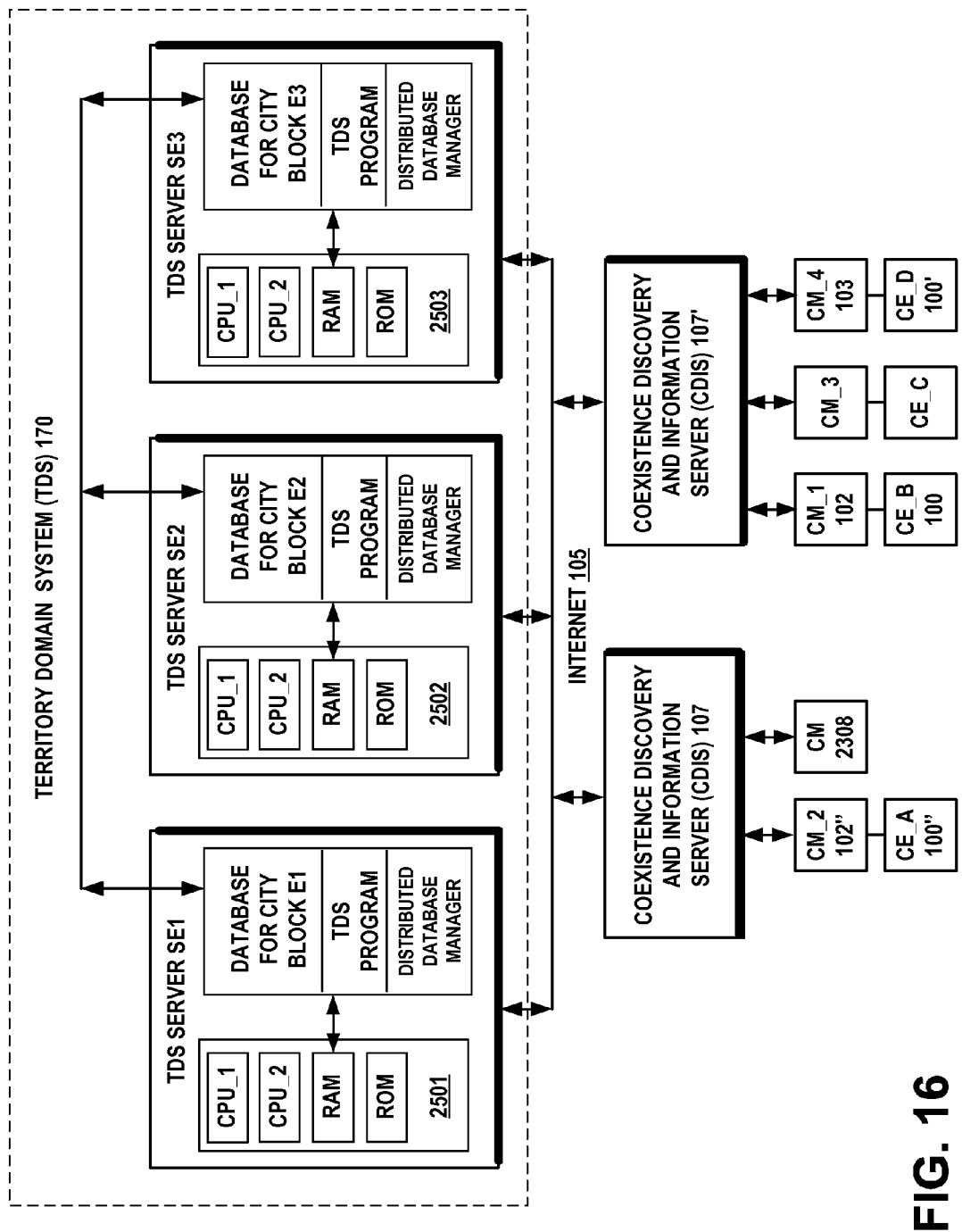
FIG. 16 is a functional block diagram of the territory domain system (TDS), in accordance with an example embodiment of the invention, which includes the respective server SE1 associated with city block E1, server SE2 associated with city block E2, and server SE3 associated with city block E3, in a hierarchical system built on a distributed database that may appear to applications as a single data source.

FIG. 16 is a functional block diagram of the territory domain system (TDS) 170, in accordance with an example embodiment of the invention. The territory domain system (TDS) 170 includes the respective TDS server SE1 associated with city block E1, TDS server SE2 associated with city block E2, and TDS server SE3 associated with city block E3. The territory domain system (TDS) is a hierarchical system built on a distributed database that may be a set of databases in the TDS servers SE1, SE2, and SE3 that may appear to applications as a single data source. Each of the TDS servers SE1, SE2, and SE3 includes a processor 2501, 2502, or 2503, respectively. Each of the TDS servers SE1, SE2, and SE3 includes a database associated with the respective city block E1, E2, and E3. Each of the TDS servers SE1, SE2, and SE3 includes a TDS application program that is a sequence of executable instructions which, when executed by the respective processor, performs the functions of the territory domain system (TDS) 170. Each of the TDS servers SE1, SE2, and SE3 includes a distributed database management program to operate the databases in the TDS servers SE1, SE2, and SE3 so that they appear to applications as a single data source. Each of the TDS servers SE1, SE2, and SE3 includes an internet interface to internet 105 that provides the interface to the CDIS 107 and CDIS 107'.

Each of the TDS servers SE1, SE2, and SE3 includes a processor 2501, 2502, or 2503 that includes a dual or multi-core central processing unit CPU_1 and CPU_2, a RAM memory, a ROM memory, and an interface for input/output devices. The RAM and ROM may be removable memory devices such as smart cards, SIMs, WIMs, semiconductor memories such as RAM, ROM, PROMS, flash memory devices, etc. The distributed database management program and/or the TDS application program may be embodied as program logic stored in the RAM and/or ROM in the form of sequences of programmed instructions which, when executed in the CPU, carry out the functions of an example embodiment of the invention. The program logic may be delivered to the writeable RAM, PROMS, flash memory devices, etc. from a computer program product or article of manufacture in the form of non-transitory computer-usable media such as resident memory devices, smart cards or other removable memory devices. Alternately, they may be embodied as integrated circuit logic in the form of programmed logic arrays or custom designed application specific integrated circuits (ASIC).

Figure 17:
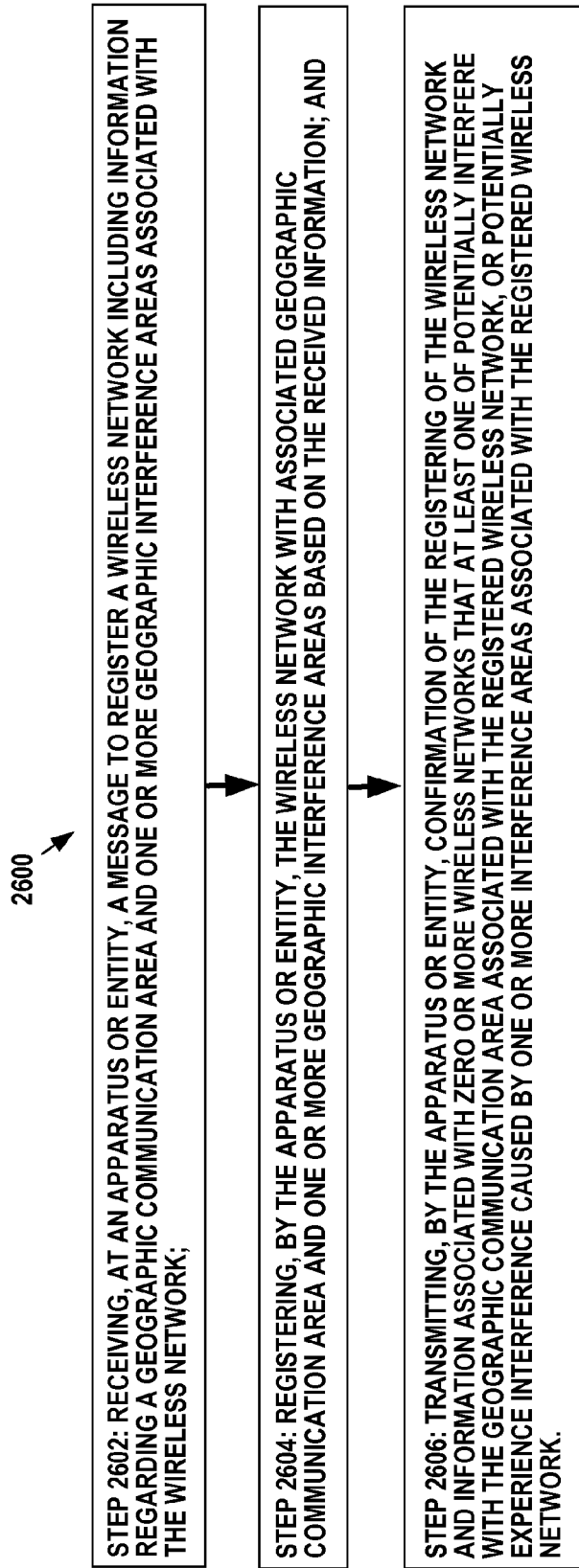
FIG. 17 is an example flow diagram of operational steps in the TDS of FIG. 16, for registering services and responding to queries from CDIS entities requesting information on services based on a territory, such as a geographical area for heterogeneous wireless networks to enable coexistence in a TV band white space, according to an embodiment of the present invention.

FIG. 17 is an example flow diagram of operational steps in the TDS application program of the territory domain system (TDS) 170 of FIG. 16, for registering services and responding to queries from CDIS entities requesting information on services based on a territory, such as a geographical area for heterogeneous wireless networks to enable coexistence in a TV band white space, according to an embodiment of the present invention. The steps of the flow diagram 2600 of FIG. 17 may represent computer code instructions stored in the RAM and/or ROM memory of the TDS 170 of FIG. 16, which when executed by the central processing units (CPU), carry out the functions of an example embodiment of the invention. The steps may be carried out in another order than shown and individual steps may be combined or separated into component steps.

Step 2602: receiving, at an apparatus or entity, a message to register a wireless network including information regarding a geographic communication area and one or more geographic interference areas associated with the wireless network;

Step 2604: registering, by the apparatus or entity, the wireless network with associated geographic communication area and one or more geographic interference areas based on the received information; and Step 2606: transmitting, by the apparatus or entity, confirmation of the registering of the wireless network and information associated with zero or more wireless networks that at least one of potentially interfere with the geographic communication area associated with the registered wireless network, or potentially experience interference caused by one or more interference areas associated with the registered wireless network.

Figure 18:
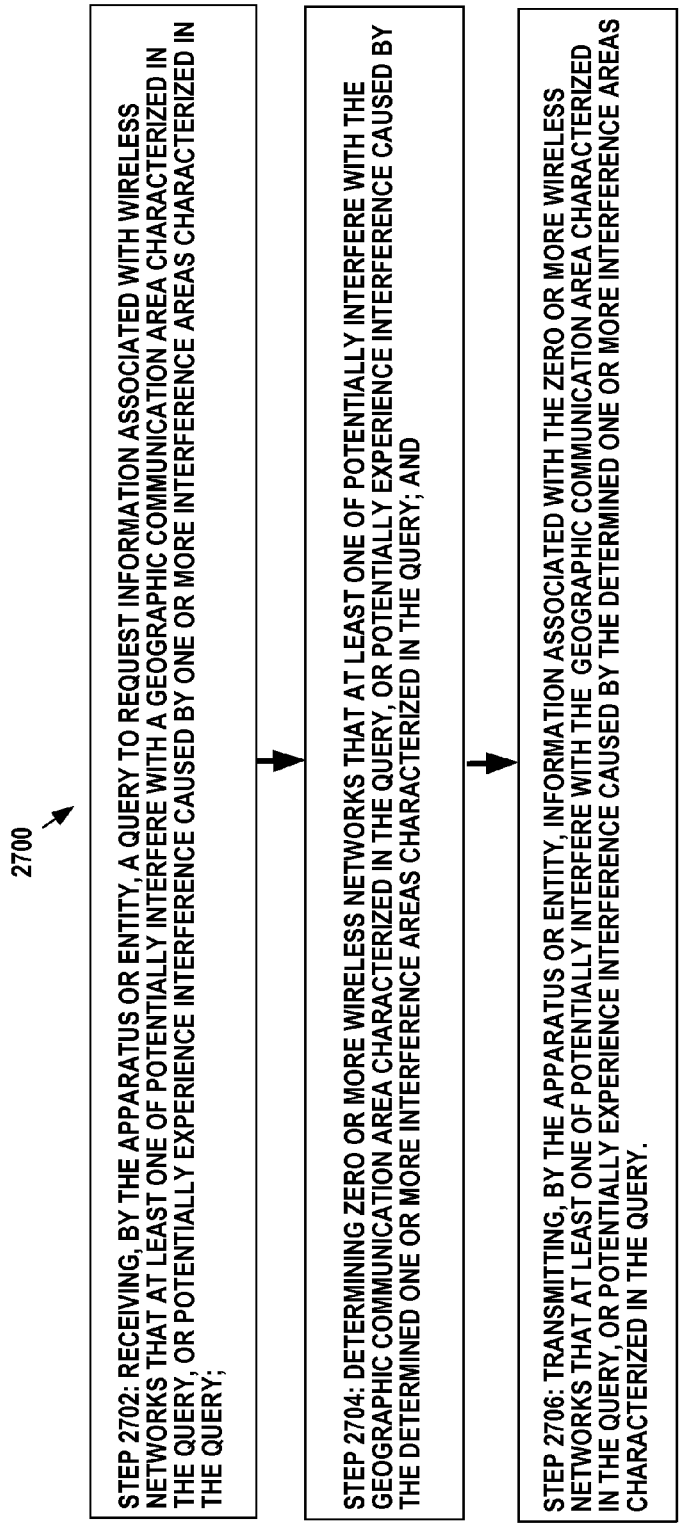
FIG. 18 is an example flow diagram of operational steps in the TDS application program of the territory domain system (TDS) of FIG. 16, for responding to queries from CDIS entities requesting information on services based on a territory, such as a geographical area for heterogeneous wireless networks to enable coexistence in a TV band white space, according to an embodiment of the present invention.

FIG. 18 is an example flow diagram of operational steps in the TDS application program of the territory domain system (TDS) 170 of FIG. 16, for responding to queries from CDIS entities requesting information on services based on a territory, such as a geographical area for heterogeneous wireless networks to enable coexistence in a TV band white space, according to an embodiment of the present invention. The steps of the flow diagram 2700 of FIG. 18 may represent computer code instructions stored in the RAM and/or ROM memory of the TDS 170 of FIG. 16, which when executed by the central processing units (CPU), carry out the functions of an example embodiment of the invention. The steps may be carried out in another order than shown and individual steps may be combined or separated into component steps.

Step 2702: receiving, by the apparatus or entity, a query to request information associated with wireless networks that at least one of potentially interfere with a geographic communication area characterized in the query, or potentially experience interference caused by one or more interference areas characterized in the query;

Step 2704: determining zero or more wireless networks that at least one of potentially interfere with the geographic communication area characterized in the query, or potentially experience interference caused by the determined one or more interference areas characterized in the query; and Step 2706: transmitting, by the apparatus or entity, information associated with the zero or more wireless networks that at least one of potentially interfere with the geographic communication area characterized in the query, or potentially experience interference caused by the determined one or more interference areas characterized in the query.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hardwired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   receiving, at an apparatus or entity, information associated with a wireless network;
   determining, by the apparatus or entity, a geographic-communication area associated with a geographic area, within which communication may be conducted between devices belonging to the wireless network, and one or more geographic interference areas associated with the geographic area, within which transmissions from any one of the devices belonging to the wireless network are higher than or equal to a given signal level, associated with the wireless network based on the received information;
   transmitting, by the apparatus or entity, a message to a destination to register the wireless network and the determined geographic communication area and one or more geographic interference areas associated with the wireless network; and
   receiving, by the apparatus or entity, confirmation of the registering of the wireless network at the destination and information associated with zero or more wireless networks that at least one of potentially interfere with the determined geographic communication area associated with the wireless network, or potentially experience interference caused by the determined one or more geographic interference areas associated with the wireless network.

2. The method of claim 1, further comprising:
   transmitting, by the apparatus or entity, a query to the destination, to request information associated with wireless networks that at least one of potentially interfere with the determined geographic communication area associated with the wireless network, or potentially experience interference caused by the determined one or more geographic interference areas associated with the wireless network; and
   receiving, by the apparatus or entity, information associated with the zero or more wireless networks that at least one of potentially interfere with the determined geographic communication area associated with the wireless network, or potentially experience interference caused by the determined one or more geographic interference areas associated with the wireless network.

3. The method of claim 1, further comprising:
   when receiving information associated with one or more wireless networks that at least one of potentially interfere with the determined geographic communication area associated with the wireless network, or potentially experience interference caused by the determined one or more geographic interference areas associated with the wireless network, selecting, by the apparatus or entity, at least one of the one or more wireless networks that at least one of potentially interfere with the determined geographic communication area associated with the wireless network, or potentially experience interference caused by the determined one or more geographic interference areas associated with the wireless network; and
   transmitting, by the apparatus or entity, a request for information characterizing the at least one selected wireless networks that at least one of potentially interfere with the determined geographic communication area associated with the wireless network, or potentially experience interference caused by the determined one or more geographic interference areas associated with the wireless network.

4. An apparatus, comprising:
   at least one processor;
   at least one memory including computer program code;
   the at least one memory and the computer program code configured to, with the at least one processor, cause the apparatus at least to:
   receive information associated with a wireless network;
   determine a geographic-communication area associated with a geographic area, within which communication may be conducted between devices belonging to the wireless network, and one or more geographic interference areas associated with the geographic area, within which transmissions from any one of the devices belonging to the wireless network are higher than or equal to a given signal level, with the wireless network based on the received information;
   transmit a message to a destination to register the wireless network and the determined geographic communication area and one or more geographic interference areas associated with the wireless network; and
   receive confirmation of the registering of the wireless network at the destination and information associated with zero or more wireless networks that at least one of potentially interfere with the determined geographic communication area associated with the wireless network, or potentially experience interference caused by the determined one or more geographic interference areas associated with the wireless network.

5. The apparatus of claim 4, wherein the destination is an apparatus or entity within a territory domain system that is a hierarchical, distributed database comprising a server associated with the geographic communication area and one or more other servers respectively associated with other geographic communication areas proximate to the geographic communication area.

6. The apparatus of claim 4, wherein the destination is an apparatus or entity within a territory domain system comprising a hierarchical, distributed database that includes information associated with a territory identifier and a description of services associated with the geographic communication area and other geographic communication areas proximate to the geographic communication area.

7. The apparatus of claim 4, further comprising:
   the at least one memory and the computer program code configured to, with the at least one processor, cause the apparatus at least to:
   transmit a query to the destination, to request information associated with wireless networks that at least one of potentially interfere with the determined geographic communication area associated with the wireless network, or potentially experience interference caused by the determined one or more geographic interference areas associated with the wireless network; and
   receive information associated with zero or more wireless networks that at least one of potentially interfere with the determined geographic communication area associated with the wireless network, or potentially experience interference caused by the determined one or more geographic interference areas associated with the wireless network.

8. The apparatus of claim 4, further comprising:
the at least one memory and the computer program code configured to, with the at least one processor, cause the apparatus at least to:
when receiving information associated with one or more wireless networks that at least one of potentially interfere with the determined geographic communication area associated with the wireless network, or potentially experience interference caused by the determined one or more geographic interference areas associated with the wireless network, select at least one of the one or more wireless networks that at least one of potentially interfere with the determined geographic communication area associated with the wireless network, or potentially experience interference caused by the determined one or more geographic interference areas associated with the wireless network; and
transmit a request for information characterizing the at least one selected wireless networks that at least one of potentially interfere with the determined geographic communication area associated with the wireless network, or potentially experience interference caused by the determined one or more geographic interference areas associated with the wireless network.

9. The apparatus of claim 4, wherein the apparatus comprises a coexistence discovery server.

10. A computer program product comprising computer executable program code recorded on a computer readable, non-transitory storage medium, the computer executable program code comprising:
code for receiving, at an apparatus or entity, information associated with a wireless network;
code for determining, by the apparatus or entity, a geographic-communication area associated with a geographic area, within which communication may be conducted between devices belonging to the wireless network, and one or more geographic interference areas associated with the geographic area, within which transmissions from any one of the devices belonging to the wireless network are higher than or equal to a given signal level, associated with the wireless network based on the received information;
code for transmitting, by the apparatus or entity, a message to a destination to register the wireless network and the determined geographic communication area and one or more geographic interference areas associated with the wireless network; and
code for receiving, by the apparatus or entity, confirmation of the registering of the wireless network at the destination and information associated with zero or more wireless networks that at least one of potentially interfere with the determined geographic communication area associated with the wireless network, or potentially experience interference caused by the determined one or more geographic interference areas associated with the wireless network.

11. A method, comprising:
transmitting, by an apparatus or entity, a query to a destination to request information associated with wireless networks that at least one of potentially interfere with a geographic communication area associated with a geographic area, within which communication may be conducted between devices associated with a wireless network served by the apparatus or entity, or potentially experience interference caused by one or more geographic interference areas associated with the geographic area, within which transmissions from any one of the devices belonging to the wireless network are higher than or equal to a given signal level; and
receiving, by the apparatus or entity, information associated with zero or more wireless networks that at least one of potentially interfere with the geographic communication area associated with the wireless network served by the apparatus or entity, or potentially experience interference caused by the one or more geographic interference areas associated with the wireless network served by the apparatus or entity.

12. The method of claim 11, further comprising:
when receiving information associated with one or more wireless networks that at least one of potentially interfere with the geographic communication area associated with the wireless network served by the apparatus or entity, or potentially experience interference caused by the one or more geographic interference areas associated with the wireless network served by the apparatus or entity, selecting, by the apparatus or entity, at least one of the one or more wireless networks that at least one of potentially interfere with the geographic communication area associated with the wireless network served by the apparatus or entity, or potentially experience interference caused by the one or more geographic interference areas associated with the wireless network served by the apparatus or entity; and
transmitting, by the apparatus or entity, a request for information characterizing the at least one selected wireless networks that at least one of potentially interfere with the geographic communication area associated with the wireless network served by the apparatus or entity, or potentially experience interference caused by the one or more geographic interference areas associated with the wireless network served by the apparatus or entity.

13. An apparatus, comprising:
at least one processor;
at least one memory including computer program code;
the at least one memory and the computer program code configured to, with the at least one processor, cause the apparatus at least to:
transmit a query to a destination to request information associated with wireless networks that at least one of potentially interfere with a geographic-communication area associated with a geographic area, within which communication may be conducted between devices associated with a wireless network served by the apparatus or entity, or potentially experience interference caused by one or more geographic interference areas associated with the geographic area, within which transmissions from any one of the devices belonging to the wireless network are higher than or equal to a given signal level; and
receive information associated with zero or more wireless networks that at least one of potentially interfere with the geographic communication area associated with the wireless network served by the apparatus or entity, or potentially experience interference caused by the one or more geographic interference areas associated with the wireless network served by the apparatus or entity.

14. The apparatus of claim 13, further comprising:
the at least one memory and the computer program code configured to, with the at least one processor, cause the apparatus at least to:
when receiving information associated with one or more wireless networks that at least one of potentially interfere with the geographic communication area associated with the wireless network served by the apparatus or entity, or potentially experience interference caused by the one or more geographic interference areas associated with the wireless network served by the apparatus or entity, select at least one of the one or more wireless networks that at least one of potentially interfere with the geographic communication area associated with the wireless network served by the apparatus or entity, or potentially experience interference caused by the one or more geographic interference areas associated with the wireless network served by the apparatus or entity; and transmit a request for information characterizing the at least one selected wireless networks that at least one of potentially interfere with the geographic communication area associated with the wireless network served by the apparatus or entity, or potentially experience interference caused by the one or more geographic interference areas associated with the wireless network served by the apparatus or entity.

15. The apparatus of claim 13, wherein the apparatus comprises a coexistence discovery server.

16. A computer program product comprising computer executable program code recorded on a computer readable, non-transitory storage medium, the computer executable program code comprising:

code for transmitting, by an apparatus or entity, a query to a destination to request information associated with wireless networks that at least one of potentially interfere with a geographic-communication area associated with a geographic area, within which communication may be conducted between devices associated with a wireless network served by the apparatus or entity, or potentially experience interference caused by one or more geographic interference areas associated with the geographic area, within which transmissions from any one of the devices belonging to the wireless network are higher than or equal to a given signal level; and code for receiving, by the apparatus or entity, information associated with zero or more wireless networks that at least one of potentially interfere with the geographic communication area associated with the wireless network served by the apparatus or entity, or potentially experience interference caused by the one or more geographic interference areas associated with the wireless network served by the apparatus or entity.

17. A method, comprising:

receiving, at an apparatus or entity, a message to register a wireless network including information regarding a geographic-communication area associated with a geographic area, within which communication may be conducted between devices belonging to the wireless network, and one or more geographic interference areas associated with the geographic area, within which transmissions from any one of the devices belonging to the wireless network are higher than or equal to a given signal level, associated with the wireless network;

registering, by the apparatus or entity, the wireless network with associated geographic communication area and one or more geographic interference areas based on the received information; and transmitting, by the apparatus or entity, confirmation of the registering of the wireless network and information associated with zero or more wireless networks that at least one of potentially interfere with the geographic communication area associated with the registered wireless network, or potentially experience interference caused by the one or more geographic interference areas associated with the registered wireless network.

18. The method of claim 17, further comprising:

receiving, by the apparatus or entity, a query from a source entity, to request information associated with wireless networks that at least one of potentially interfere with the geographic communication area associated with the wireless network, or potentially experience interference caused by the one or more geographic interference areas associated with the wireless network; and transmitting, by the apparatus or entity, to the source entity, information associated with zero or more wireless networks that at least one of potentially interfere with the determined geographic communication area associated with the wireless network, or potentially experience interference caused by the determined one or more geographic interference areas associated with the wireless network.

19. An apparatus, comprising:

at least one processor;

at least one memory including computer program code;

the at least one memory and the computer program code configured to, with the at least one processor, cause the apparatus at least to:

receive a message to register a wireless network including information regarding a geographic-communication area associated with a geographic area, within which communication may be conducted between devices belonging to the wireless network, and one or more geographic interference areas associated with the geographic area, within which transmissions from any one of the devices belonging to the wireless network are higher than or equal to a given signal level, associated with the wireless network;

register the wireless network with associated geographic communication area and one or more geographic interference areas based on the received information; and transmit confirmation of the registering of the wireless network and information associated with zero or more wireless networks that at least one of potentially interfere with the geographic communication area associated with the registered wireless network, or potentially experience interference caused by the one or more geographic interference areas associated with the registered wireless network.

20. The apparatus of claim 19, further comprising:

the at least one memory and the computer program code configured to, with the at least one processor, cause the apparatus at least to:

receive a query from a source entity, to request information associated with wireless networks that at least one of potentially interfere with the geographic communication area associated with the wireless network, or potentially experience interference caused by the one or more geographic interference areas associated with the wireless network; and transmit to the source entity, information associated with zero or more wireless networks that at least one of potentially interfere with the determined geographic communication area associated with the wireless network, or potentially experience interference caused by the determined one or more geographic interference areas associated with the wireless network.

21. The apparatus of claim 19, wherein the apparatus is a territory domain system that is a hierarchical, distributed database that includes a server associated with the geographic communication area and one or more other servers respectively associated with other geographic communication areas proximate to the geographic communication area.

22. The apparatus of claim 19, wherein the apparatus is a territory domain system comprising a hierarchical, distributed database that includes information associated with a territory identifier and a description of services associated with the geographic communication area and other geographic communication areas proximate to the geographic communication area.

23. A computer program product comprising computer executable program code recorded on a computer readable, non-transitory storage medium, the computer executable program code comprising:
   code for receiving, at an apparatus or entity, a message to register a wireless network including information regarding a geographic-communication area associated with a geographic area, within which communication may be conducted between devices belonging to the wireless network, and one or more geographic interference areas associated with the geographic area, within which transmissions from any one of the devices belonging to the wireless network are higher than or equal to a given signal level, associated with the wireless network;
   code for registering, by the apparatus or entity, the wireless network with associated geographic communication area and one or more geographic interference areas based on the received information; and
   code for transmitting, by the apparatus or entity, confirmation of the registering of the wireless network and information associated with zero or more wireless networks that at least one of potentially interfere with the geographic communication area associated with the registered wireless network, or potentially experience interference caused by the one or more geographic interference areas associated with the registered wireless network.

* * * * *